(12) United States Patent  (10) Patent No.: US 7,984,733 B2
Noonan  (45) Date of Patent: Jul. 26, 2011

(54) DEVICES AND METHODS RELATING TO THE CLEANUP OF LEAVES, TO POURING OR FILLING NON-LIQUIDS, AND/OR TO RECONFIGURABLE FUNNELING APPARATUS

(75) Inventor: Mark Noonan, New Canaan, CT (US)

(73) Assignee: Mark Noonan, New Canaan, CT (US)

( * ) Notice: Subject to any disclaimer, the term of this patent is extended or adjusted under 35 U.S.C. 154(b) by 0 days.

(21) Appl. No.: 12/916,151

(22) Filed: Oct. 29, 2010

(65) Prior Publication Data

US 2011/0041954 A1    Feb. 24, 2011

Related U.S. Application Data

(63) Continuation-in-part of application No. PCT/US2009/063500, filed on Nov. 6, 2009.

(60) Provisional application No. 61/198,442, filed on Nov. 6, 2008, provisional application No. 61/217,174, filed on May 28, 2009.

(51) Int. Cl.
    *B67C 11/04* (2006.01)
(52) U.S. Cl. ....................................................... 141/337
(58) Field of Classification Search .............. 383/4, 473; 141/297, 331–334, 337, 338
    See application file for complete search history.

(56) References Cited

U.S. PATENT DOCUMENTS

| 2,073,914 | A |   | 3/1937  | Wilfley |
| 3,480,059 | A |   | 11/1969 | Schoening |
| 3,692,072 | A |   | 9/1972  | Kohls |
| 4,209,116 | A | * | 6/1980  | Hendricks ..................... 294/152 |
| 4,561,480 | A | * | 12/1985 | Underwood et al. ........... 383/34 |
| D291,133  | S | * | 7/1987  | Disanza .......................... D34/1 |

(Continued)

FOREIGN PATENT DOCUMENTS

JP  2003-237904  8/2003

(Continued)

OTHER PUBLICATIONS

International Search Report and Written Opinion for PCT/US2009/063500 (published as WO 2010/054157) to which the instant application claims priority; dated May 31, 2010, 9 pages.

(Continued)

*Primary Examiner* — Gregory Huson
*Assistant Examiner* — Jason Niesz
(74) *Attorney, Agent, or Firm* — Harness, Dickey & Pierce, P.L.C.

(57) ABSTRACT

Exemplary embodiments are disclosed of devices and methods, which may aid in leaf and debris (or other particles) cleanup or transport sometimes used in conjunction with tarps and/or filling of garbage cans and garbage/leaf bags, etc. In an exemplary embodiment, a funneling apparatus generally includes a sheet having edges defining a perimeter. A stay may be disposed along at least one of the edges and at least partially along the perimeter of the sheet. The funneling apparatus may be reconfigurable between a first configuration in which the sheet is substantially flat and a second configuration in which the sheet is rolled into at least one funnel-like configuration. The stay may be operable for helping the sheet remain substantially flat for the first configuration of the funneling apparatus and/or for helping retain the funnel-like configuration for the second configuration of the funneling apparatus.

33 Claims, 34 Drawing Sheets

U.S. PATENT DOCUMENTS

| | | | | |
|---|---|---|---|---|
| 4,709,430 A * | 12/1987 | Nicoll | | 5/417 |
| 5,058,839 A | 10/1991 | Stevens | | |
| 5,147,102 A * | 9/1992 | Dyer, Jr. | | 294/152 |
| 5,189,746 A * | 3/1993 | Horie | | 5/627 |
| 5,393,023 A | 2/1995 | Callan | | |
| 5,451,107 A * | 9/1995 | Ricker | | 383/10 |
| 5,570,862 A | 11/1996 | Nugent | | |
| 5,593,117 A | 1/1997 | Alexander, III | | |
| D394,929 S * | 6/1998 | Ahumada | | D34/1 |
| 5,871,037 A | 2/1999 | Feldt | | |
| 6,315,143 B1 | 11/2001 | Dotts | | |
| 6,554,810 B1 | 4/2003 | Wilk et al. | | |
| 6,994,302 B1 | 2/2006 | Simmons | | |
| 7,018,267 B2 * | 3/2006 | Delaney et al. | | 446/487 |
| 7,127,754 B2 * | 10/2006 | Le Gette et al. | | 5/417 |
| 7,237,753 B2 * | 7/2007 | Metcalfe | | 248/99 |
| 7,249,792 B1 | 7/2007 | Bunten | | |
| 7,552,956 B1 * | 6/2009 | Holloway | | 294/1.1 |
| 7,594,754 B2 * | 9/2009 | Costello | | 383/4 |
| 2004/0195468 A1 * | 10/2004 | Singleton | | 248/99 |
| 2006/0141896 A1 * | 6/2006 | Owens | | 446/48 |
| 2007/0089803 A1 * | 4/2007 | Wallek | | 141/337 |
| 2008/0113582 A1 * | 5/2008 | Campbell | | 446/236 |

FOREIGN PATENT DOCUMENTS

| | | |
|---|---|---|
| KR | 200187935 | 7/2000 |
| KR | 20-0437964 | 1/2008 |
| WO | WO 2005/106128 | 11/2005 |

OTHER PUBLICATIONS http:www.shopmemphispool.com/GUZZLER-LEAF-RAKE-NET-p/3159.htm; accessed Nov. 3, 2009; 2 pages.
http://www.leafreaper.com; accessed Oct. 30, 2009; 2 pages.

* cited by examiner

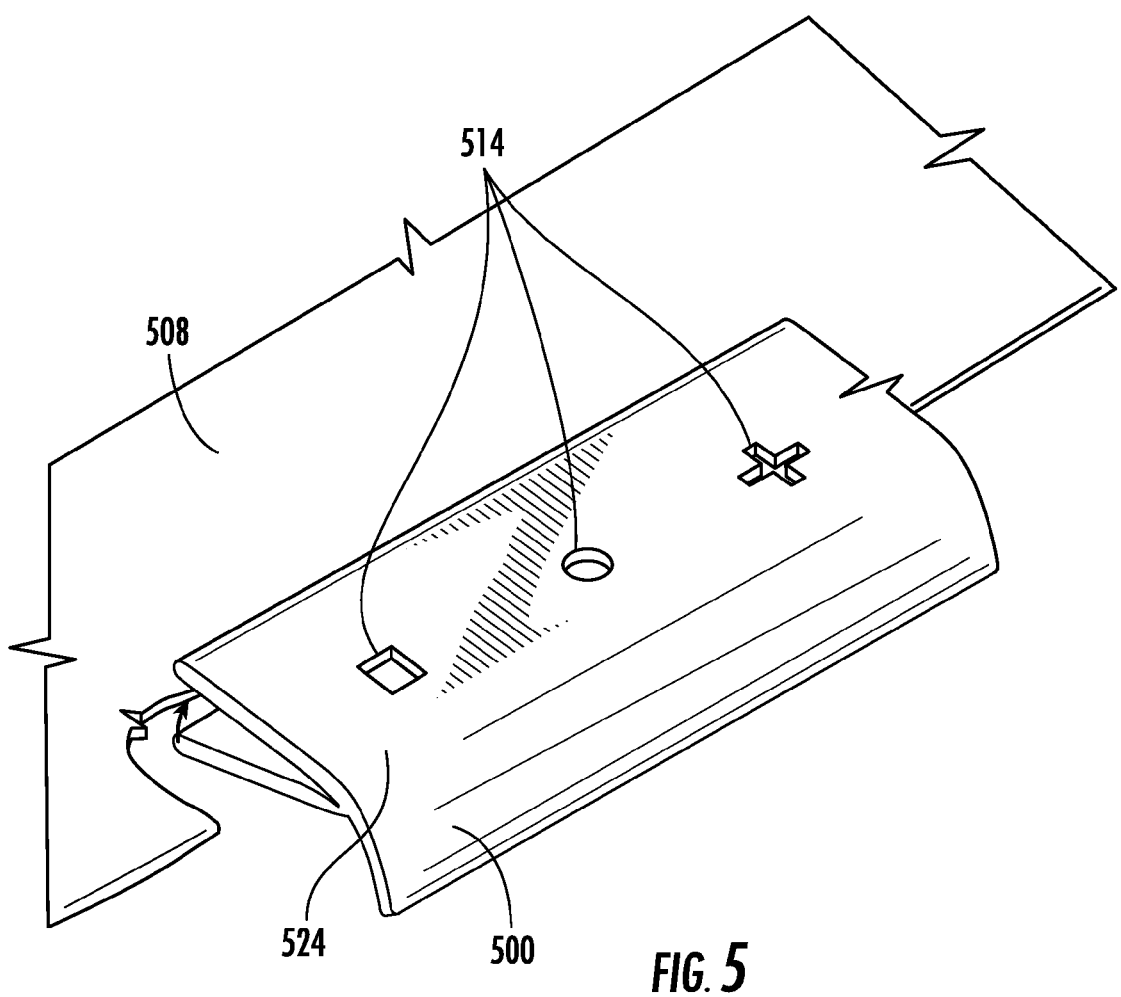

DEVICES AND METHODS RELATING TO THE CLEANUP OF LEAVES, TO POURING OR FILLING NON-LIQUIDS, AND/OR TO RECONFIGURABLE FUNNELING APPARATUS

CROSS-REFERENCE TO RELATED APPLICATIONS

This application is a continuation-in-part of International Application No. PCT/US2009/063500 filed Nov. 6, 2009 (published as WO 2010/054157 on May 14, 2010), which, in turn, claimed the benefit of U.S. Provisional Application No. 61/198,442 filed Nov. 6, 2008 and U.S. Provisional Patent Application No. 61/217,174 filed May 28, 2009. The entire disclosures of the above applications are incorporated herein by reference.

FIELD

The present disclosure generally relates (but not exclusively) to devices and methods associated with or relating to the pick-up or cleanup of leaves, debris, other materials, etc., to pouring or filling non-liquids, and/or to reconfigurable funneling apparatus that are reconfigurable into a funnel-like configuration or a substantially flat configuration, and vice versa.

BACKGROUND

This section provides background information related to the present disclosure which is not necessarily prior art. For example, set forth in this section are various drawbacks associated with existing methods for cleaning up leaves that the inventor hereof has recognized.

There are various types rakes, leaf and debris cleanup or pickup systems, which apply to many different types of materials to be cleaned or cleared. As used herein, the terms "leaf," "leaves," "debris," and other like terms are intended to broadly or generically refer to and include any of the wide range of various types of debris or materials that may be cleared. Similarly, the terms "cleanup," "pickup," and other like terms are also intended to broadly or generically refer to and include raking, scooping, grabbing, or otherwise cleaning up debris or materials.

There are various ways for cleaning or picking up leaves. For example, two-sided rakes that work like a large clamshell may be used to grab, pickup, and release leaves. Similarly, claw-like gloves may be worn over a user's hands to create tines similar to small rakes to also grab and pickup more leaves or debris than naked hands alone. Fixed-sized funnels, hoops or other types of collars may also be used to hold open garbage or leaf bags while filling. As another option, a net may be used to scoop up leaves. Or, a leaf blower may be used to blow and/or direct leaves into a bag, such as a bag constructed of netting, etc.

Of course, someone may take a more traditional approach, such as using a standard yard rake, garbage can, and/or tarp for collecting, moving, dragging, or otherwise disposing of leaves and debris. Large leaf rakes, often used in conjunction with tarps, are generally one of the most expedient ways to clear or clean up leaves when the leaves or debris only need to be moved to a curb or piled up without any bagging or placing in garbage cans, etc. In which case, leaves may be raked/loaded onto a tarp and then moved in bulk (after loading the tarp with leaves) by dragging or carrying the tarp. For example, the tarp may be moved close to the leaves to be raked such that the leaves only have to be raked short distances. The leaves may then be raked or otherwise moved or piled onto the tarp. After which, the tarp may be moved (e.g., dragged, carried, etc.) to a specified location, such as the curb or leaf pile and emptied there in a variety of manners. For example, the tarp may be emptied by folding and pulling one edge of the tarp over itself and over the debris—continuing to pull the tarp until free of debris (effectively flipping the tarp over in the process).

In short, bulk leaf collection and transfer with tarps—using rakes in their traditional function—is often the most efficient and fastest means (as compared to existing methods) to clear and move large quantities of leaves, such as by transferring smaller collected piles of leaves onto a tarp, then dragging the much larger quantity after it is loaded onto the tarp (e.g., from the collected pile to the desired location such as the curb or compost pile, etc.). Typically, picking up a pile of leaves in scoop or otherwise is generally not as efficient as raking them onto a tarp and dragging the tarp full of leaves. But a scoop is often required or necessary for disposal. Also, in cases where there may not be as large of a quantity of leaves or debris, loading bags or cans may be efficient or otherwise employed.

Raking (along with leaf blowing) is typically the most efficient and fastest means (as compared to existing methods) to gather and collect leaves into a pile. The combination with raking them onto a tarp then dragging the tarp is generally the most efficient means of moving leaves longer distances (such as moving leaves to the curb for seasonal collection, as done by many towns in the United States (generally being collected for mass composting). But for filling garbage cans and bags, it is generally more time consuming to lift (and then compress/compact) numerous batches of leaves of debris than to rake directly into a garbage can or bag. Raking directly into bags tends to be difficult even with rings or other devices that can keep the aperture open. And, the inventor hereof has recognized that the aperture is generally not wide enough for convenient filling of cans or bags by traditional raking directly into the can or bag (especially with round garbage cans and leaf bag openings) as the leaves and similar debris needs to be compressed frequently. For example, a bag or can laying on its side will accept fewer and fewer leaves as the bag or can is being filled by raking leaves into it. Thus, the user may compress or push down the leaves in the bag or can before new leaves may be raked into the bag or can. This is often done by repeatedly up-righting the can to compress the leaves or debris and laying it on its side again.

As noted above, the inventor hereof has recognized various drawbacks associated with existing methods for cleaning up leaves, etc. In addition to the above noted drawbacks, the inventor hereof has also recognized that one of the difficulties with transferring leaves onto tarps is that the tarp may not stay on the ground fully, either from wind or the force of leaves or the rake hitting the tarp's leading edge. This, in turn, may cause the tarp to fold back on itself, where the leaves are pushed under the tarp or under where the tarp had been before folding back on itself. Thus, the tarp would then need to be dragged back and moved to clear those additional leaves not initially properly loaded onto the tarp. Generally, to address this problem, a user may sometimes find it useful to stand on the tarp edge to keep it flat and sealed against the ground while raking, such as by standing with feet spread apart and then raking back onto the tarp between the user's feet where the tarp is held taut. This combination of steps, however, slows down the work progress and can be awkward, as it: 1) requires the tarp to be moved more frequently to fully clear an area or load a pile and move it onto the tarp, or 2) encumbers work by requiring the user to hold the tarp edge down simultaneously while raking (reducing the range or area that can be reached by the user to rake leaves while simultaneously holding the tarp edge against the ground with feet, other weighted objects or even additional persons).

There are also a variety of nets, scoops, clam-shell type rakes to facilitate picking up more leaves than by hand or combination of a hand held against a rake. Yet even these existing methods, require raking followed by scooping/lifting then frequent compression of the leaves or debris until the can or bag is sufficiently filled and compressed (where the compression requires the additional step of putting down the rake, "claws", or scoop to compress then picking back up the device to rake and/or load another batch).

Devices to keep garbage bags open for use in yard work or garden are available in a variety of fixed sizes. In general, the size (e.g., diameter) of these rims or collars and even funnels is normally fixed and cannot be tailored for a particular use or characteristics of the container being filled. The inventor hereof has recognized that many standard household funnels are not wide enough to use with larger sized particles, such as granules or granular particles, pebbles/stones, and especially, leaf and other garden debris and are not designed to adjust the aperture of the funnel or otherwise size the funnel to fit varying size of containers being filled or type of materials being "funneled."

Funnels tend to have a fixed diameter, which tends to make smaller funnels incompatible with larger sized particles. For example, funneling large particles by using a relatively small funnel tends to be a slow, time consuming, and difficult (or even unworkable) process. And, often in the case of funnels, the funnel size is not readily available that is appropriate for the materials and the size of the container into which the particles are being funneled, where the containers and particles are larger than what is typical for household liquid funnels. In the case of lawn and garden funnels, they have a fixed aperture/size and are sized only wide enough to pour leaves or debris into the can or bag, such that the funnel size is not nearly wide enough to allow leaves or debris to be raked directly onto the funnel without leaves being raked outside the funnel's opening.

SUMMARY

This section provides a general summary of the disclosure, and is not a comprehensive disclosure of its full scope or all of its features.

Disclosed herein are exemplary embodiments of devices and methods, which may aid in leaf and debris (or other particles) cleanup or transport sometimes used in conjunction with tarps and/or filling of garbage cans and garbage/leaf bags, etc.

In an exemplary embodiment, a funneling apparatus generally includes a sheet having edges defining a perimeter. A stay may be disposed along at least one of the edges and at least partially along the perimeter of the sheet. The funneling apparatus may be reconfigurable between a first configuration in which the sheet is substantially flat and a second configuration in which the sheet is rolled into at least one funnel-like configuration having a funnel size that is selectively variable as defined by the relative rolled positioning of the generally opposing edges of the sheet. The stay may be operable for helping the sheet remain substantially flat for the first configuration of the funneling apparatus and/or for helping retain the funnel-like configuration for the second configuration of the funneling apparatus by applying outward pressure against an interior portion of a container.

An exemplary embodiment includes an apparatus attachable along an edge portion of a sheet of material for adding rigidity to the edge portion and/or for securing the edge portion to the ground. The apparatus generally includes an edge device with resilient upper and lower portions. The upper and lower portions may be configured for receiving and compressively clamping onto the edge portion of the sheet of material to releasably attach the edge device to the sheet of material.

An exemplary embodiment of a funneling apparatus generally includes a sheet of material having a first edge portion and a second edge portion. At least one attachment device may be provided for removably attaching the first edge portion to the second edge portion. The funneling apparatus may be configurable between at least a first configuration in which the sheet is rolled into a funnel-like configuration with the attachment device attaching the first edge portion to the second edge portion, and a second configuration in which the sheet is substantially flat with the first and second edge portion detached from one another.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a perspective view of an edge device according to an exemplary embodiment, and illustrating possible alternate hole patterns and shapes for the spikes or anchors to pass through to engage or secure the edge device to the ground and to an edge portion of a tarp;

Figure 6A:
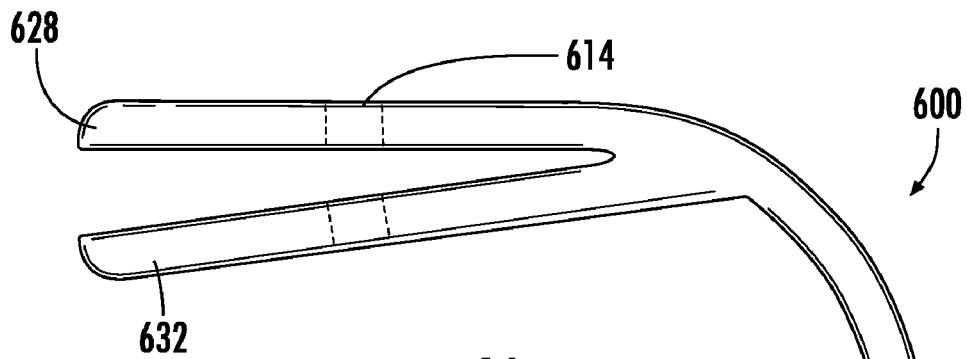
Figure 6B:
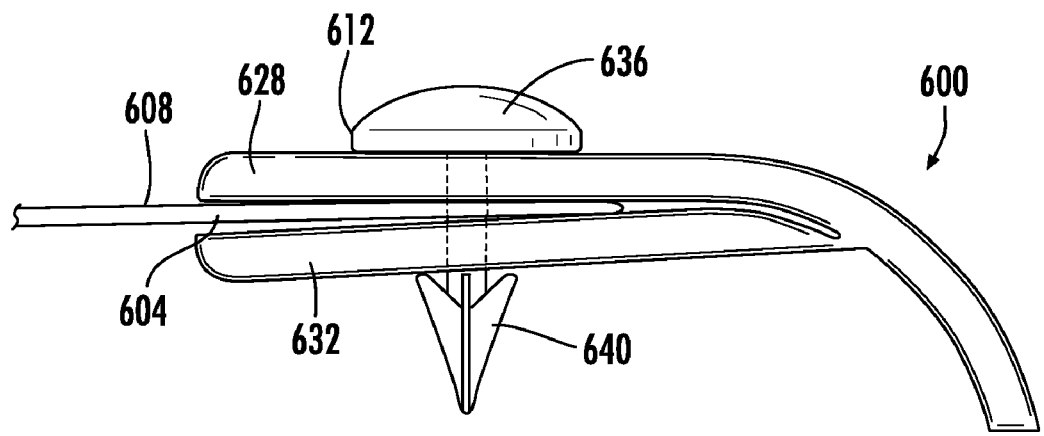
Figure 7:
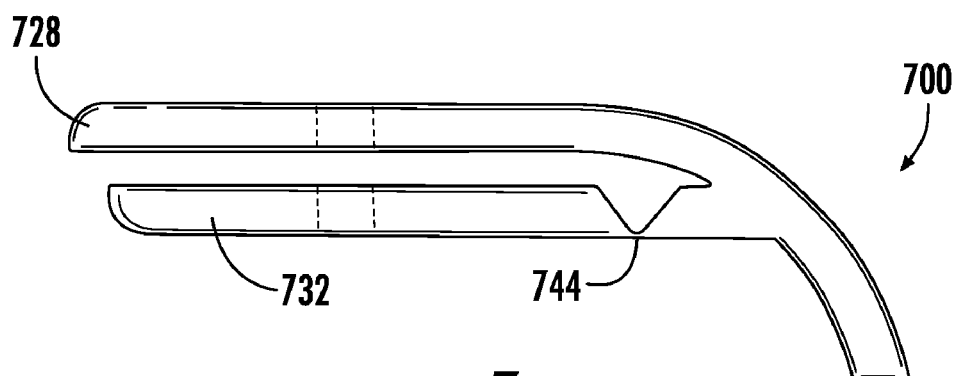
Figure 8:
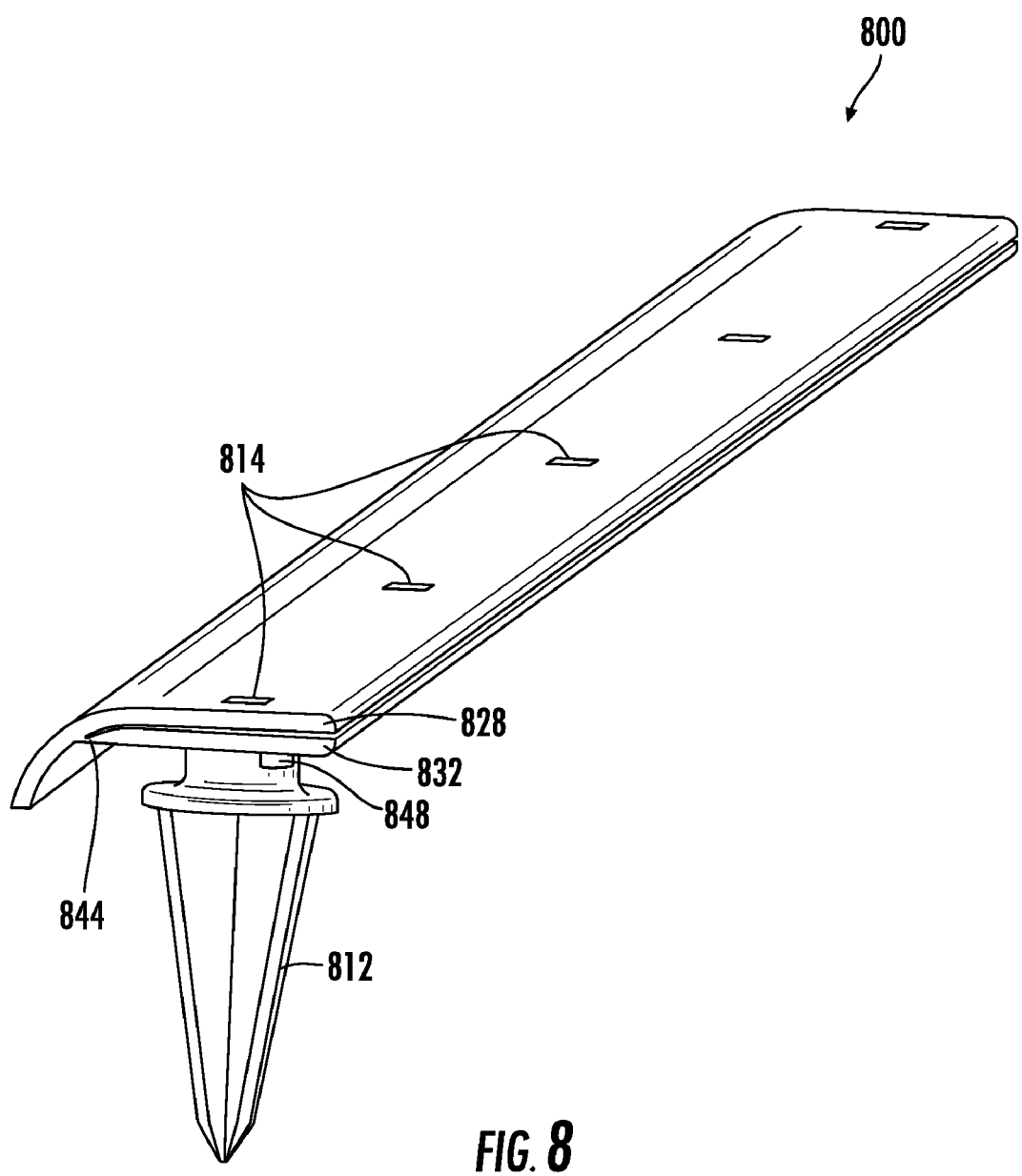
Figure 9:
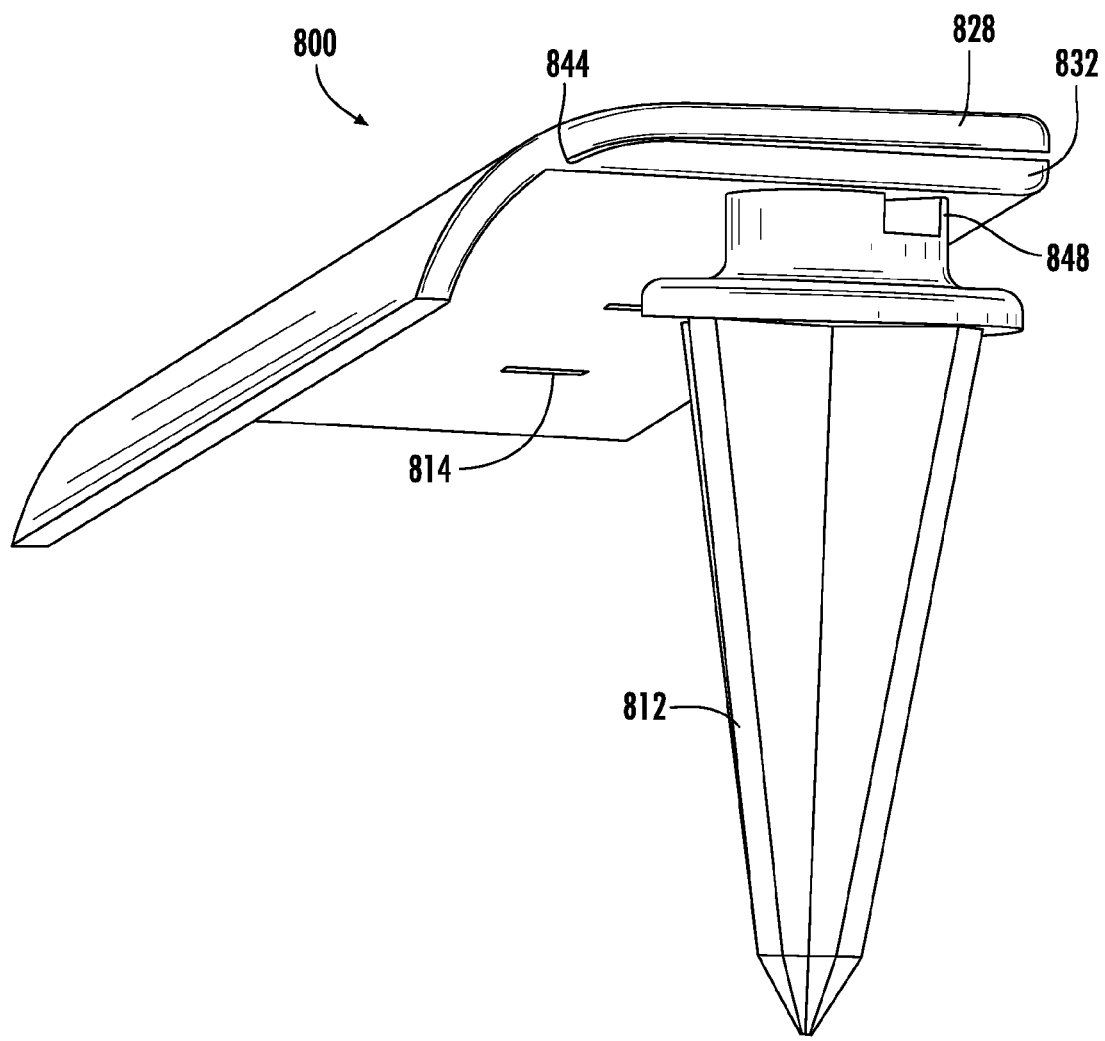
Figure 10:
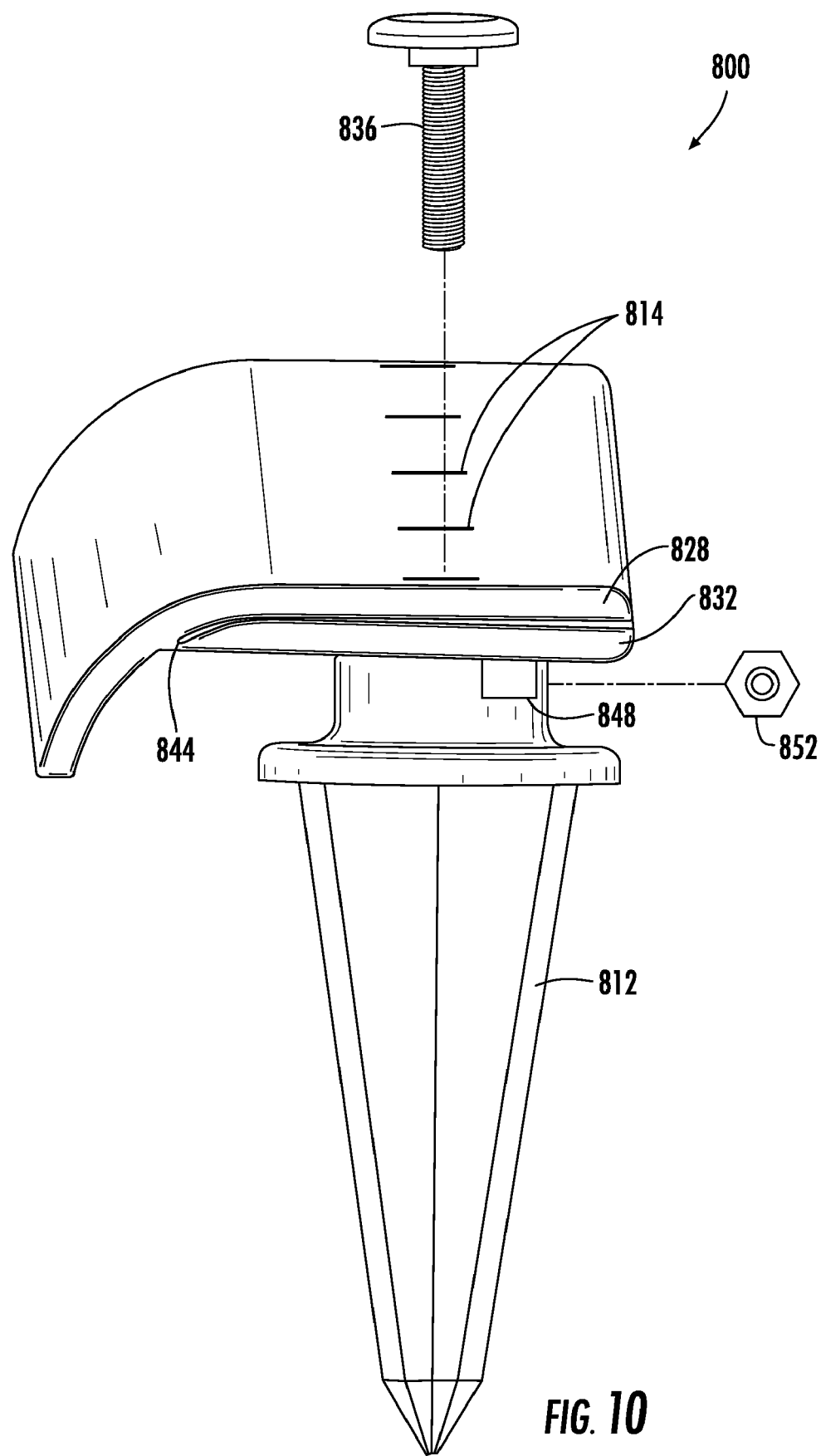
Figure 11:
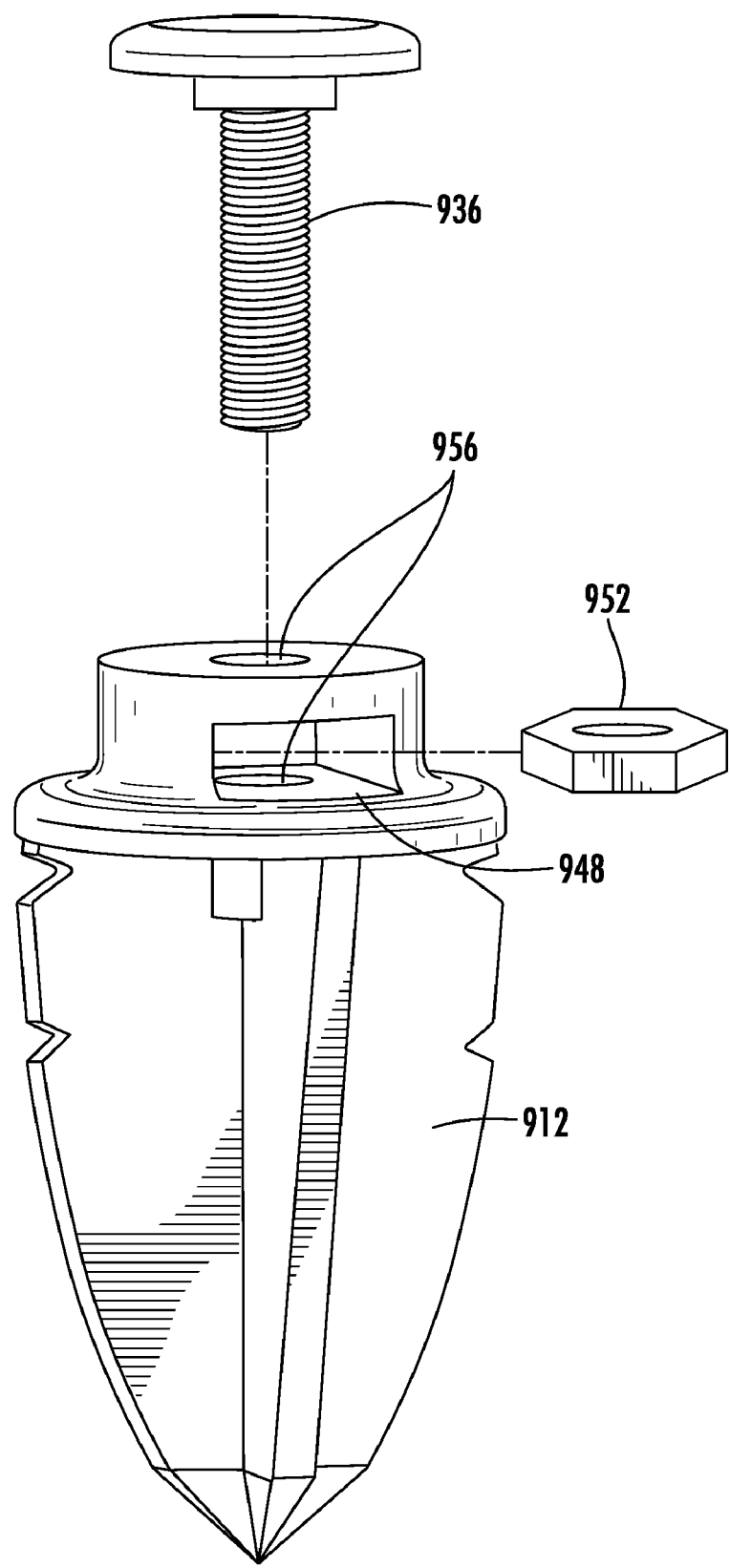
Figure 12:
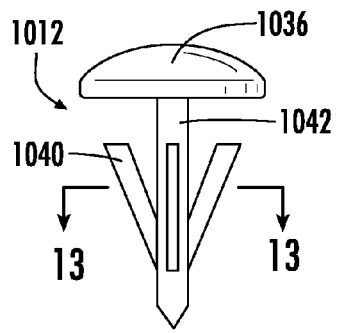
Figure 13:
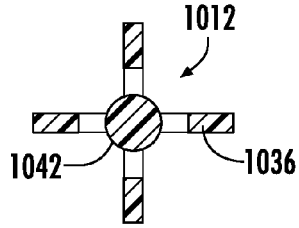
Figure 14:
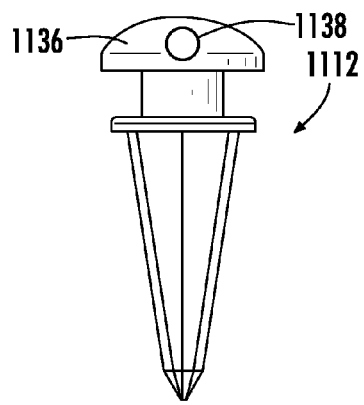
Figure 15A:
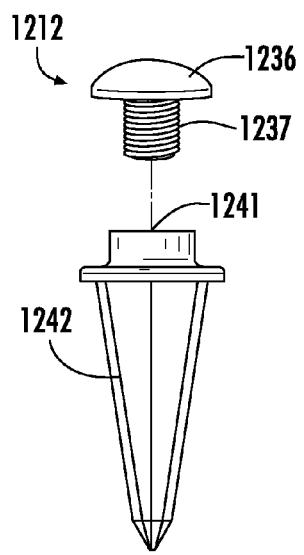
Figure 15B:
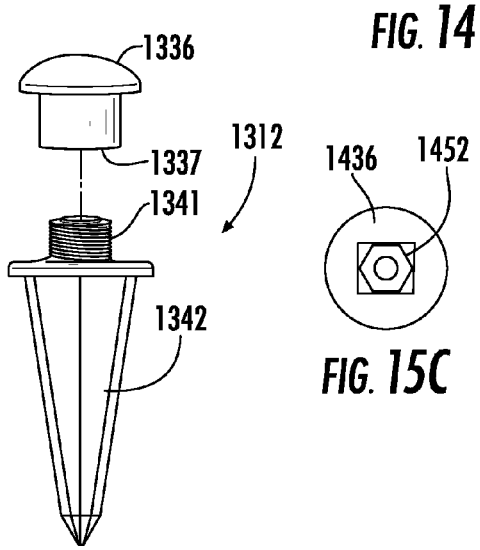
Figure 15C:
Figure 15D:
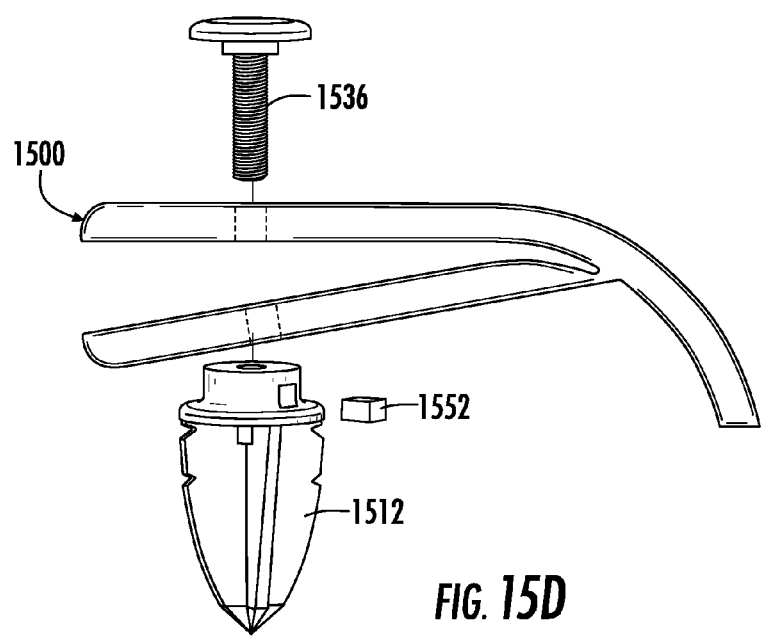
Figure 16:
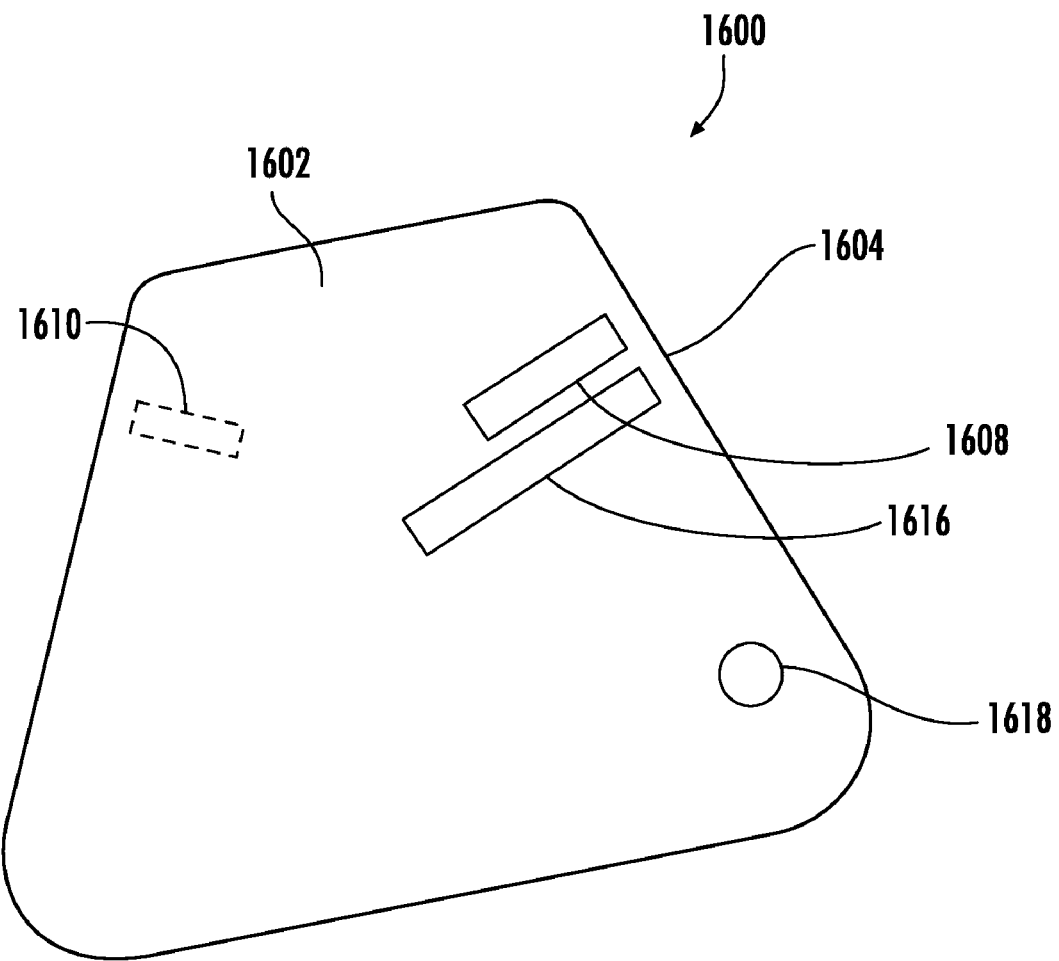
Figure 17:
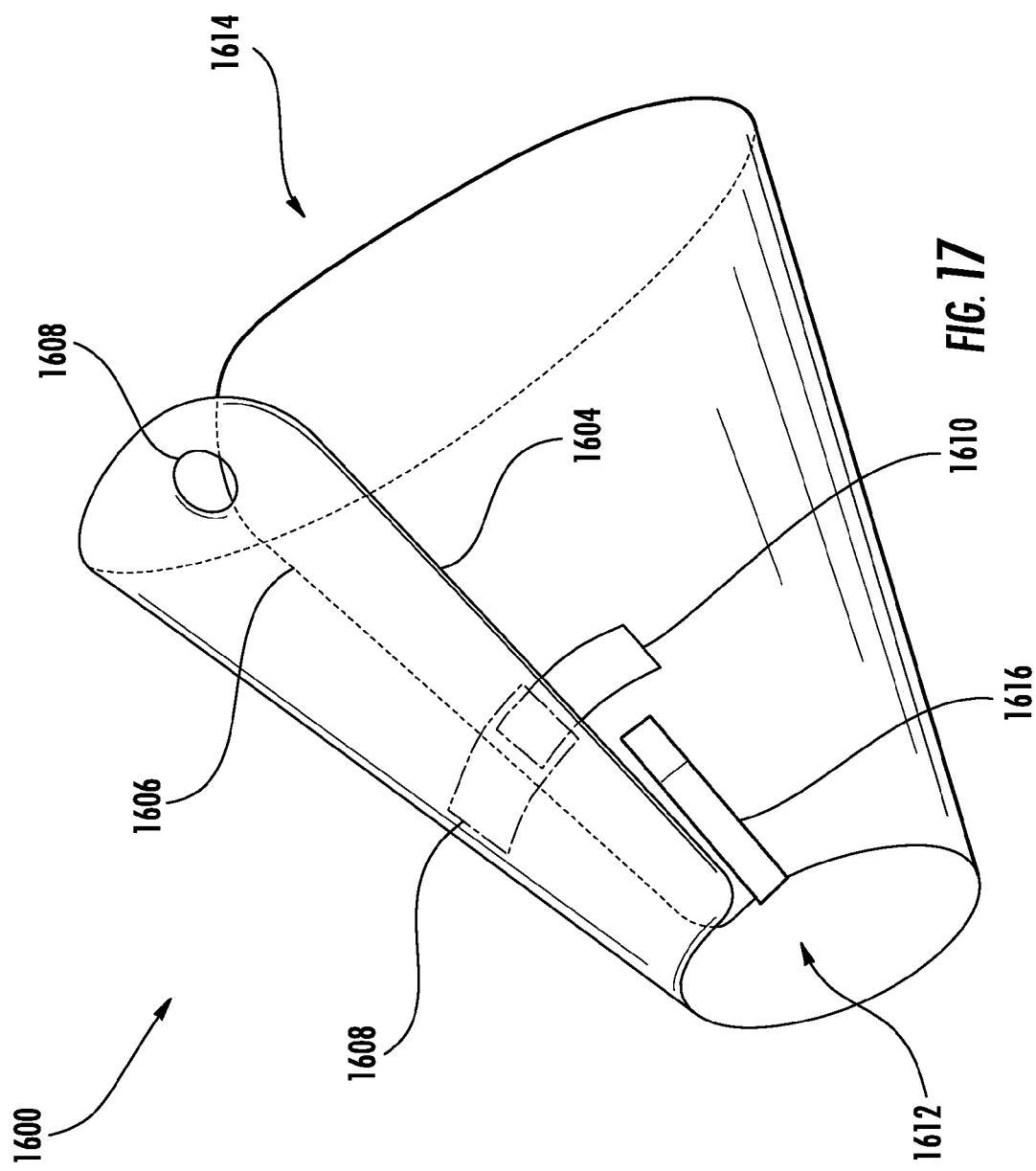
Figure 18:
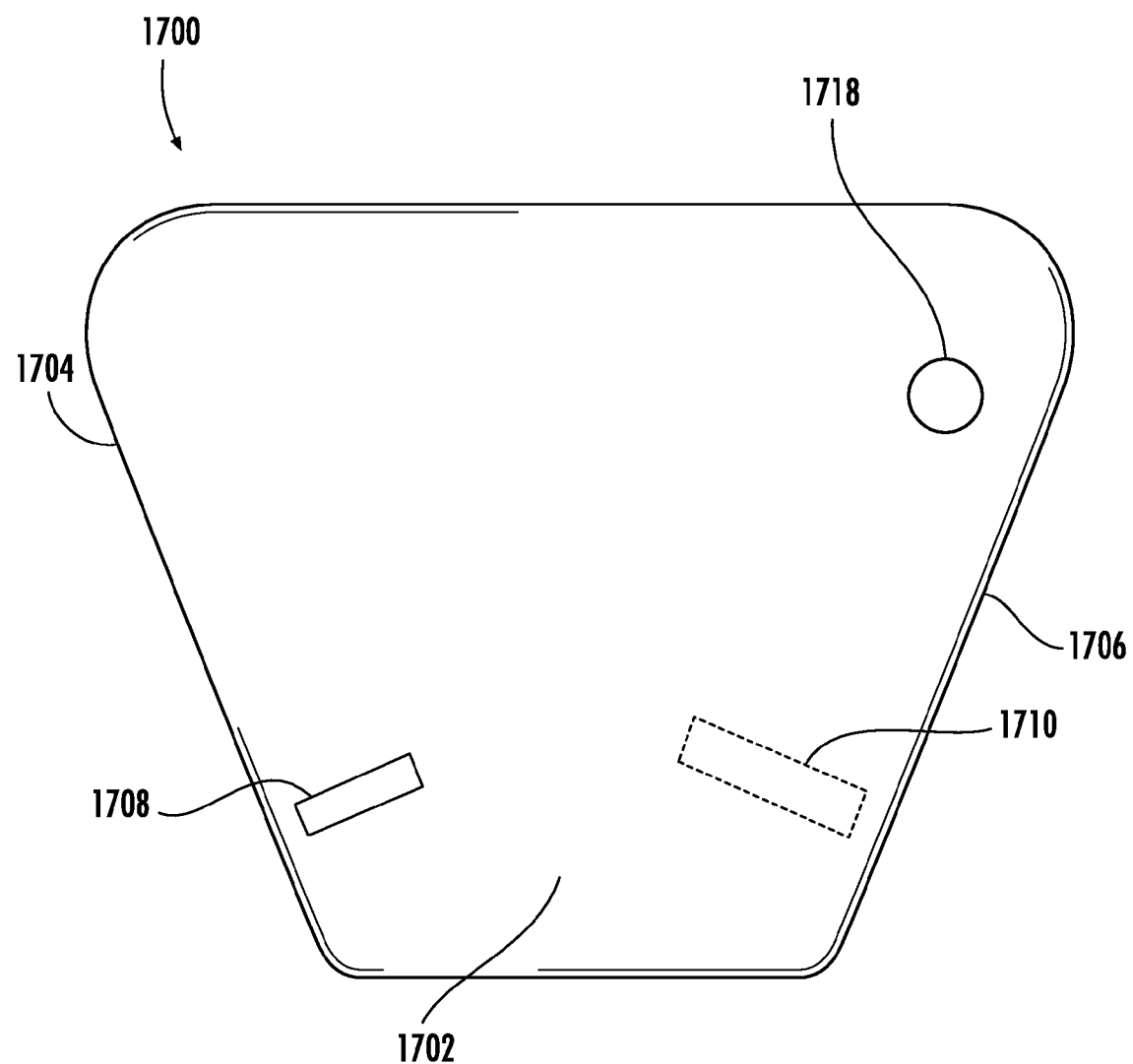
Figure 19:
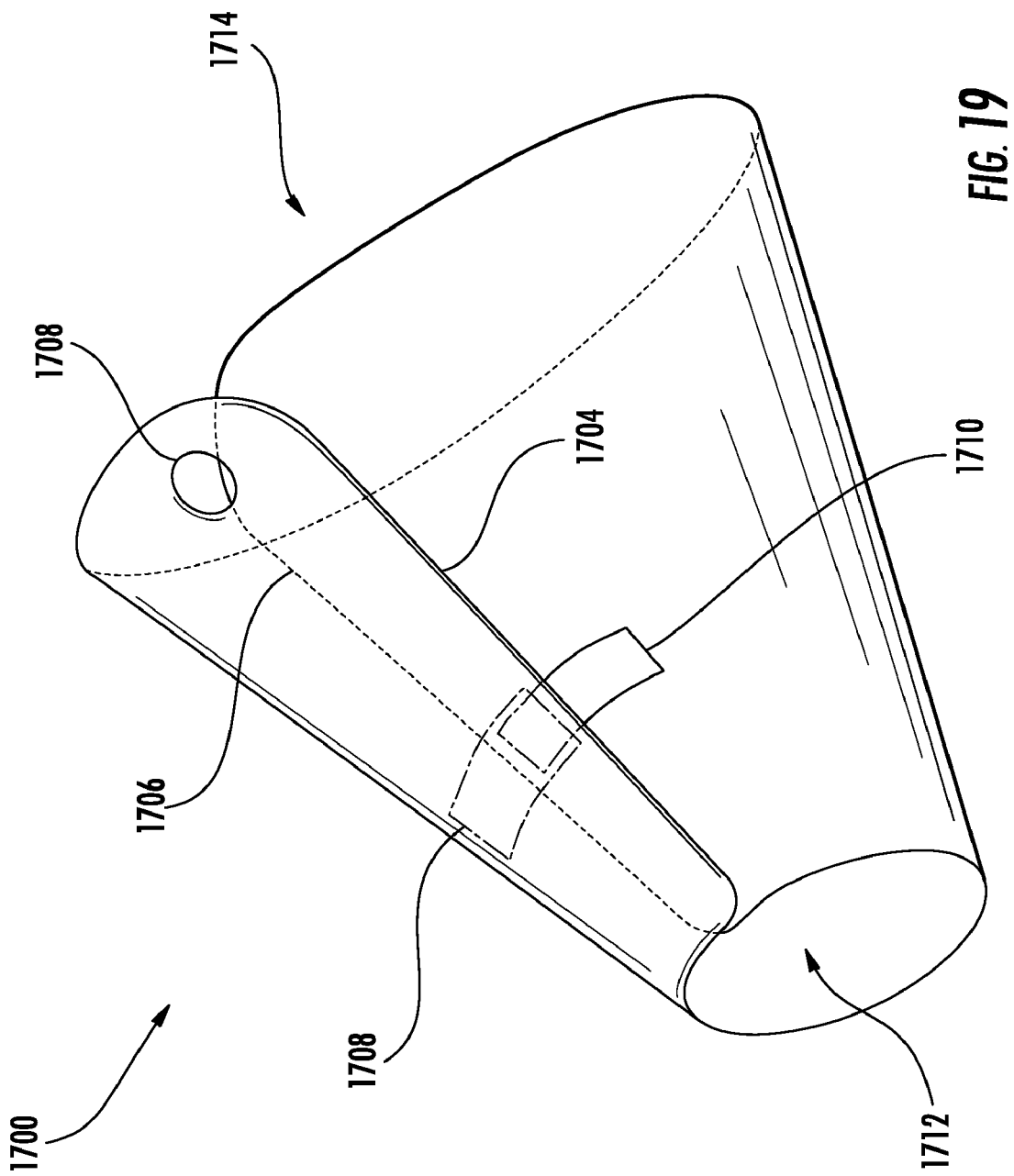
Figure 20:
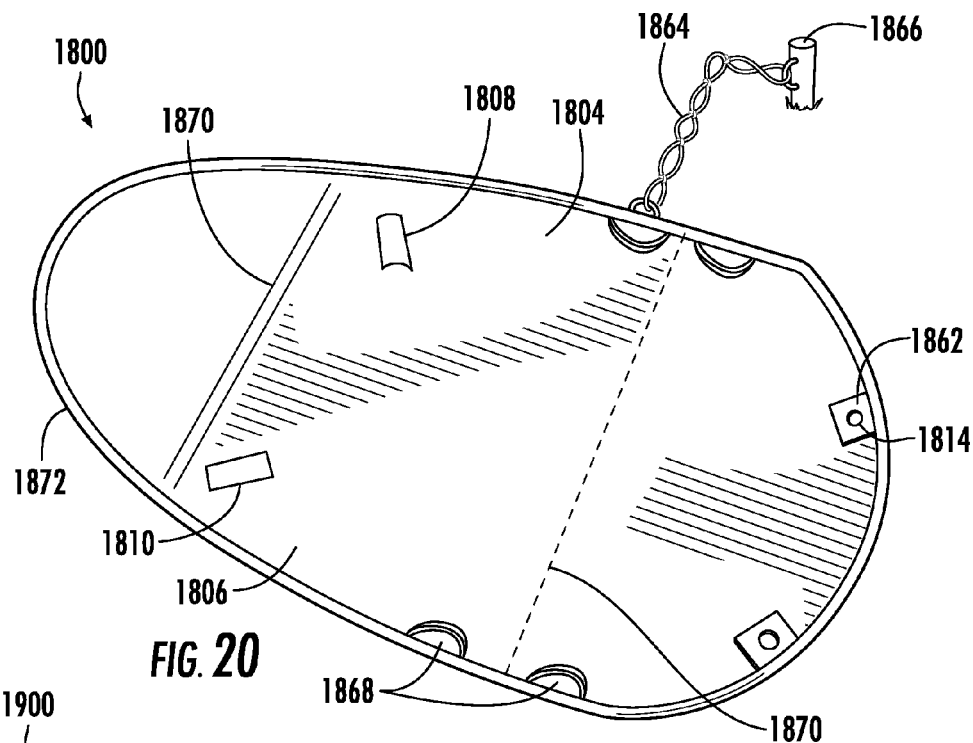
Figures 21A, 21B, 21C:
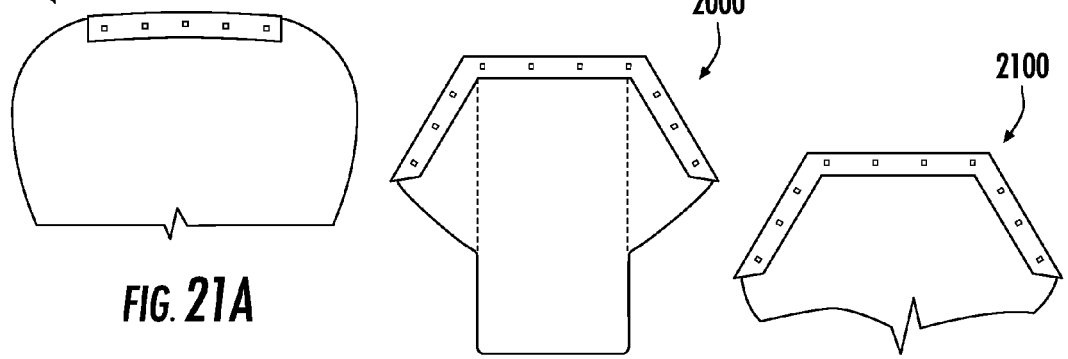
Figure 21D:
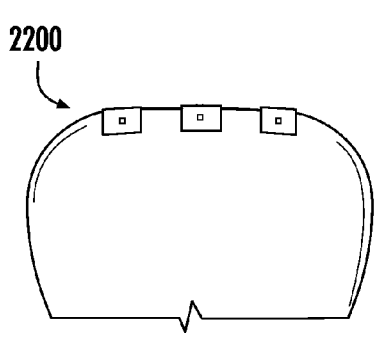
Figure 21E:
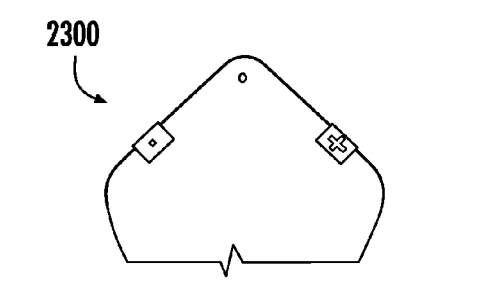
Figure 22:
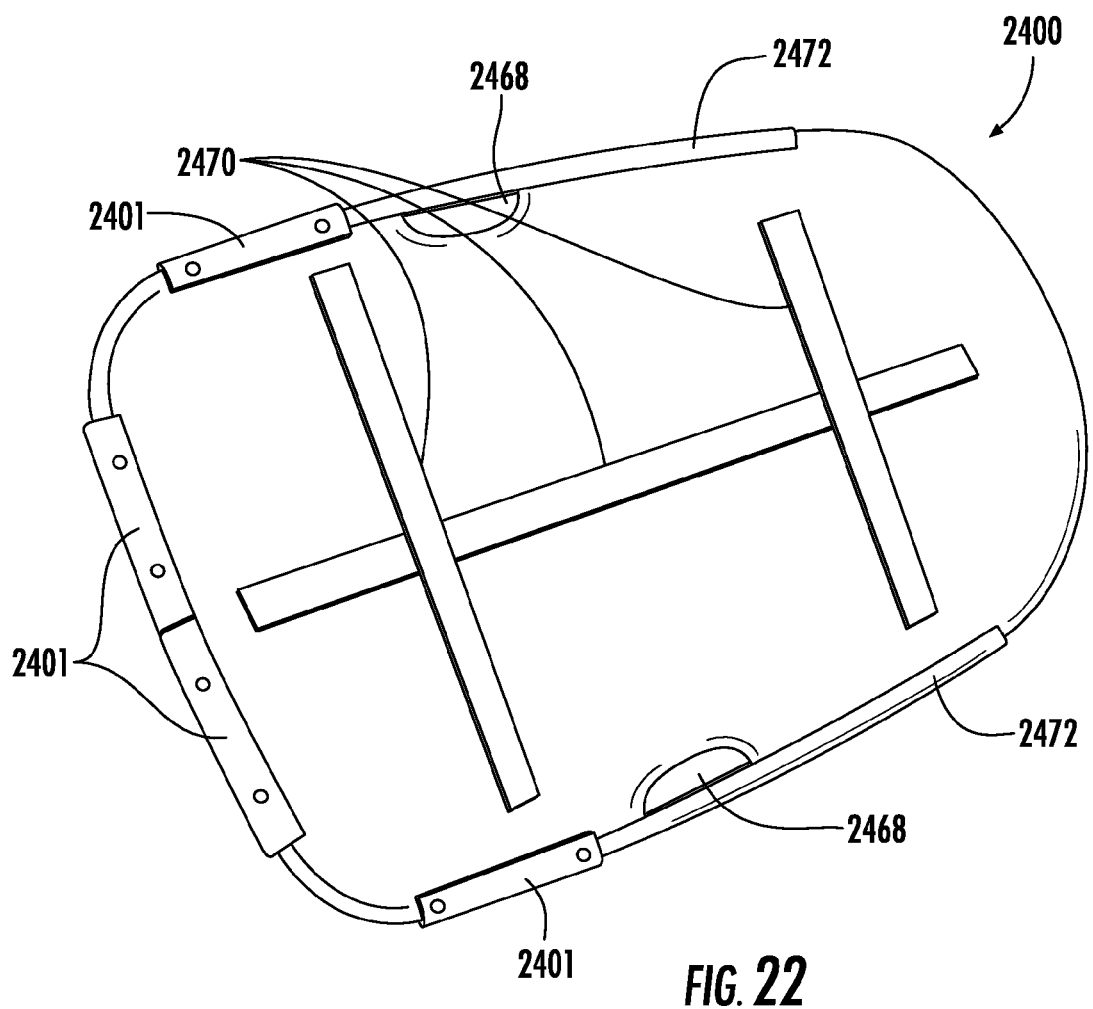
Figure 23:
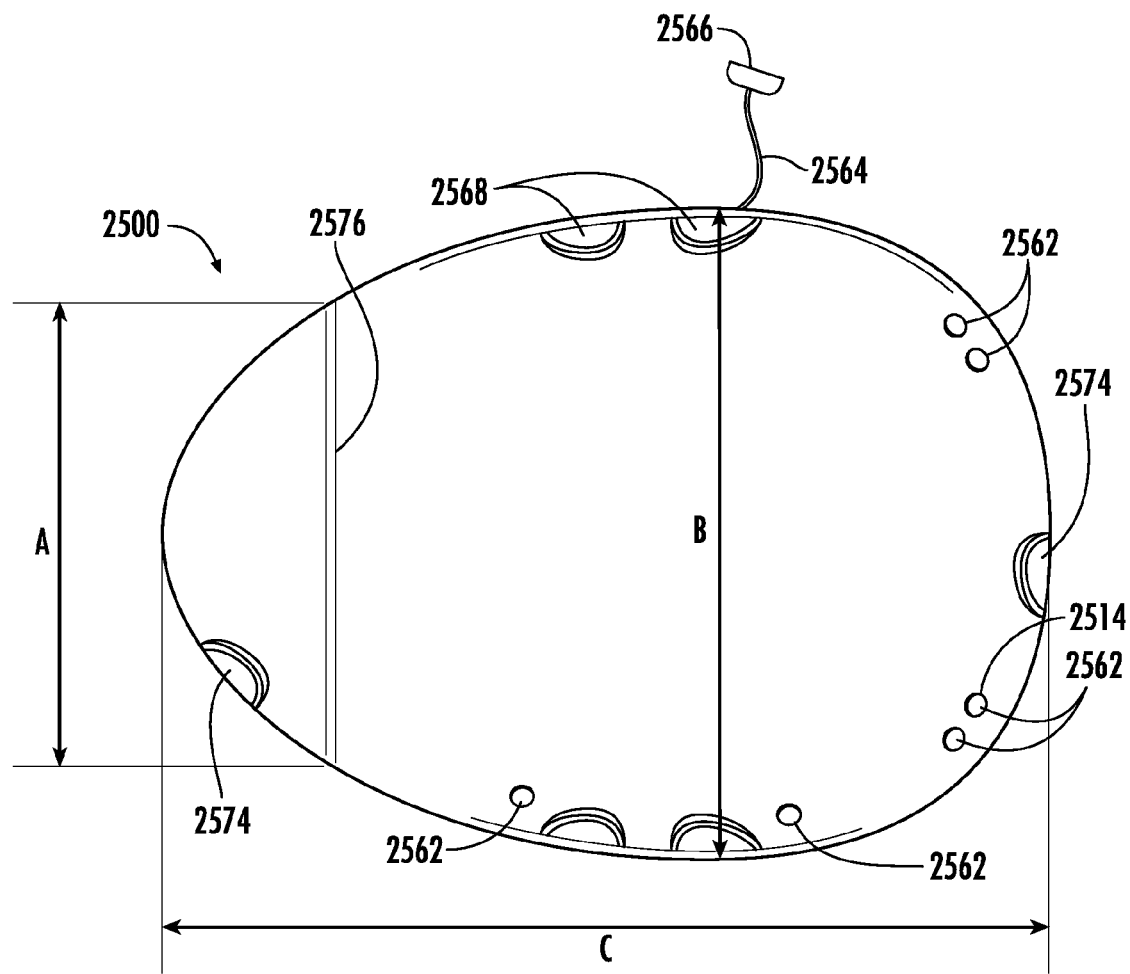
Figure 24:
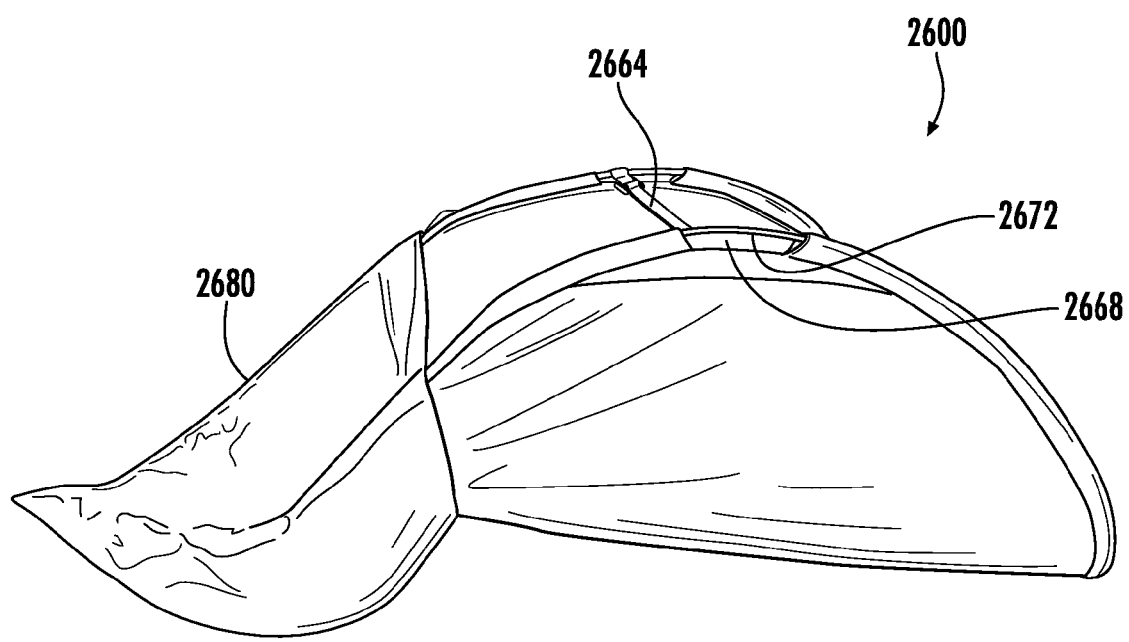
Figure 25:
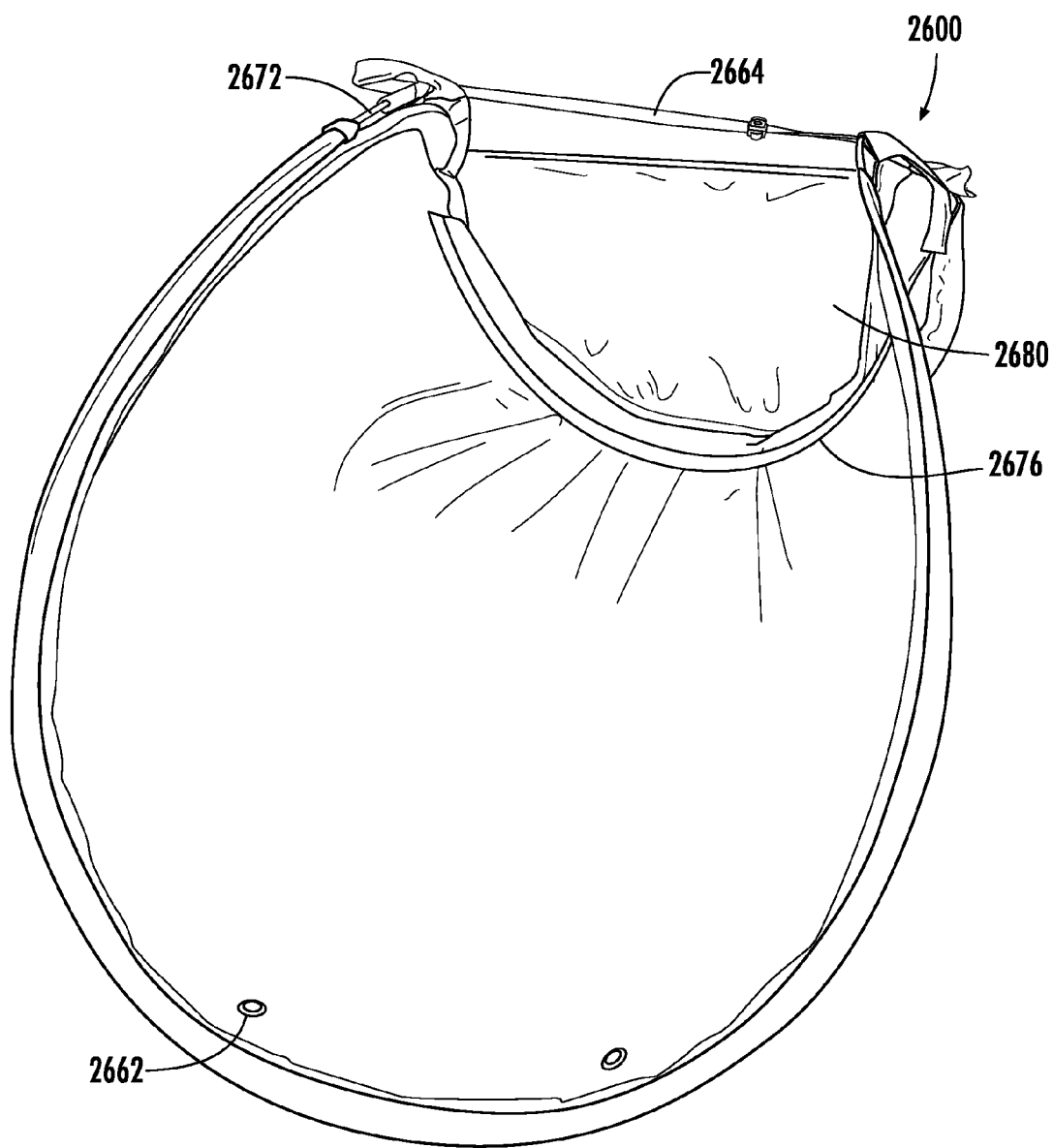
Figure 26:
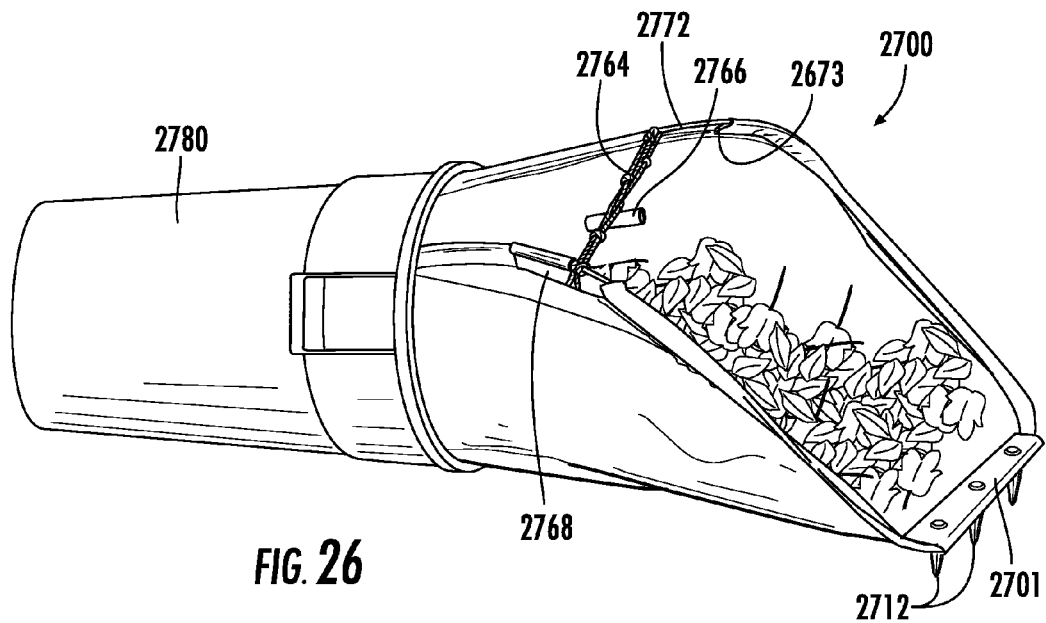
Figure 27:
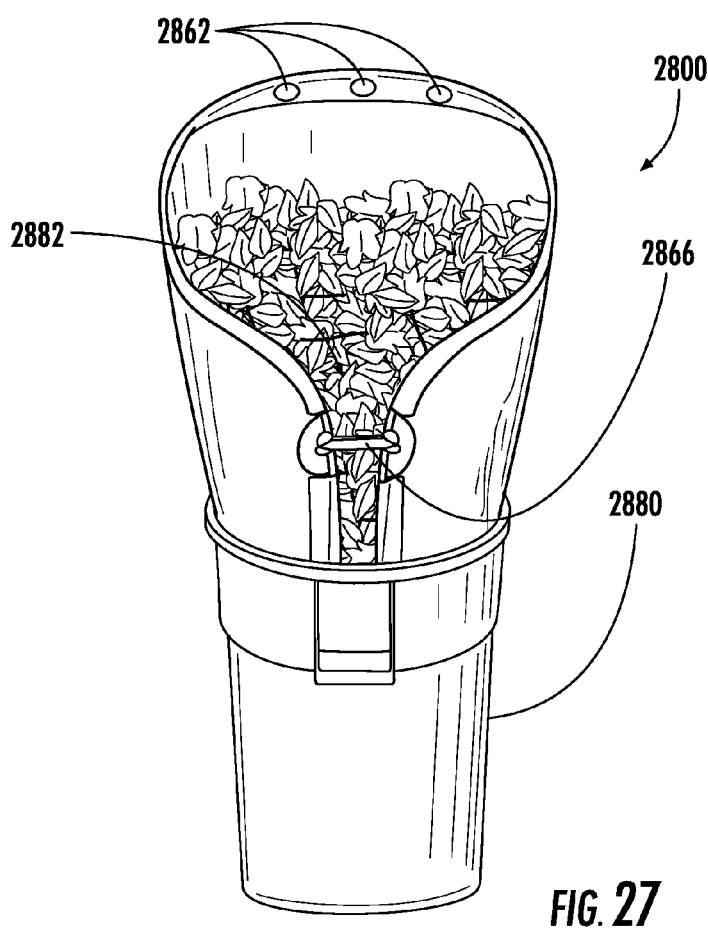
Figure 28:
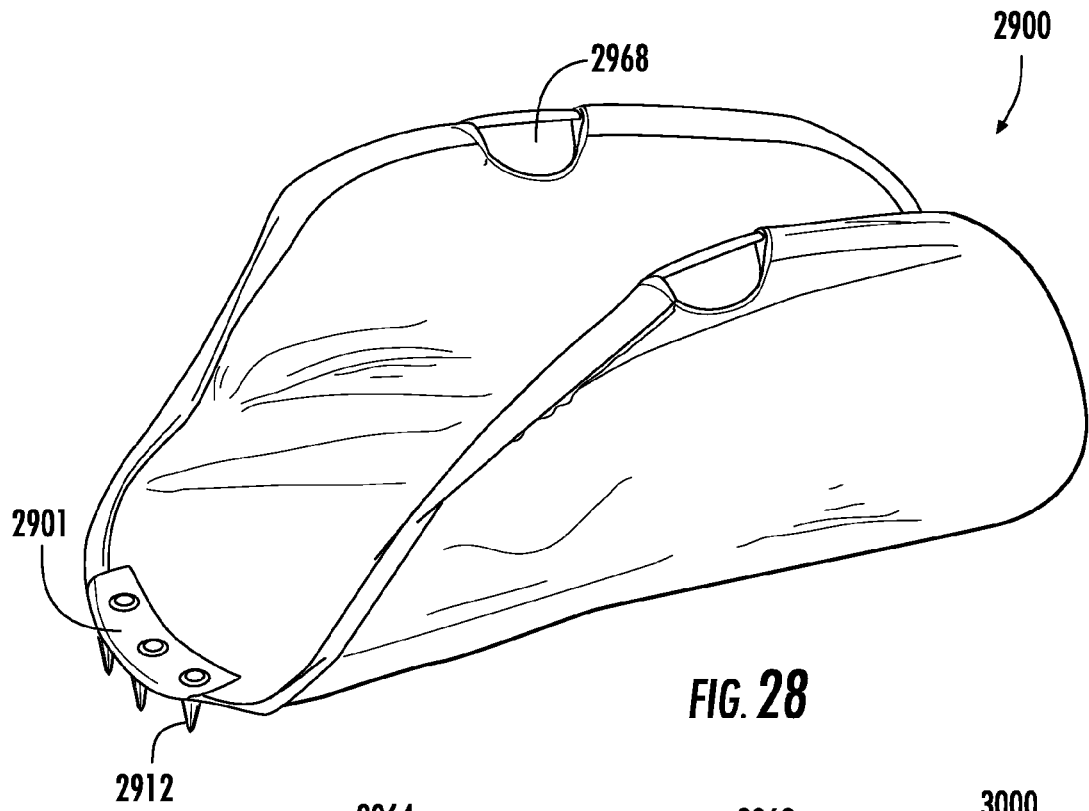
Figure 29:
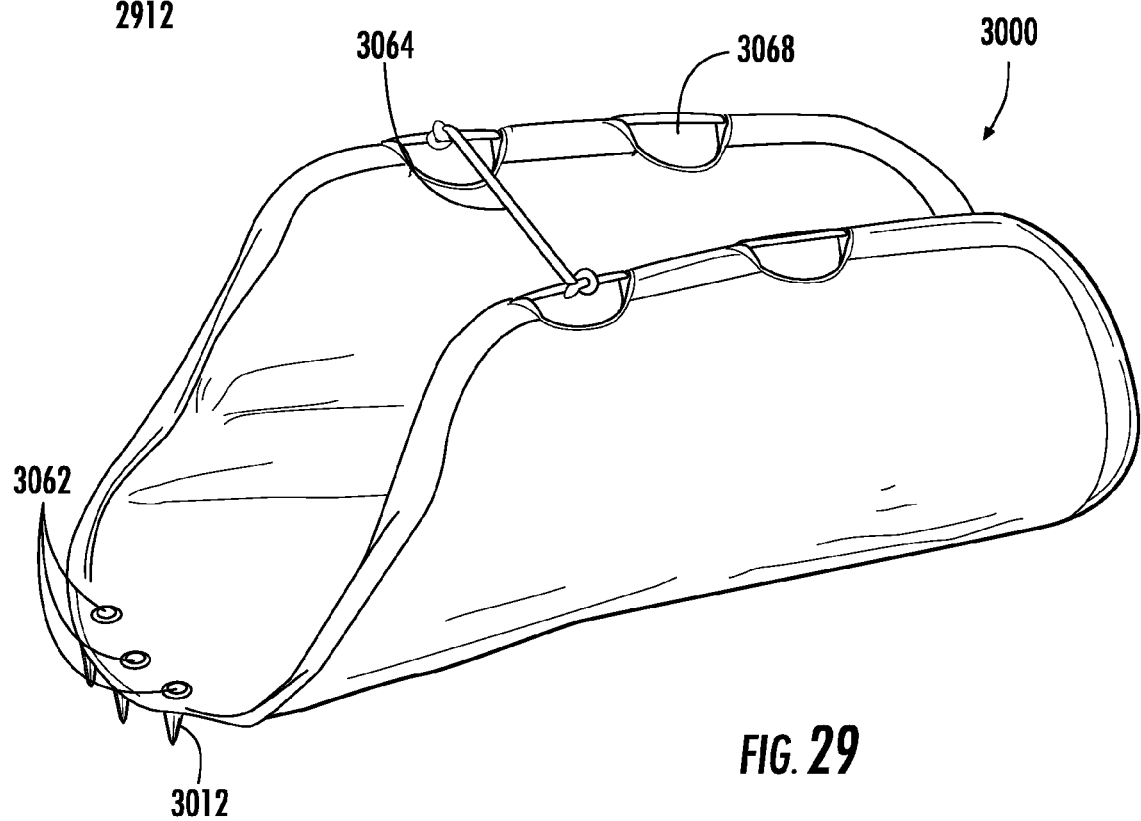
Figure 30:
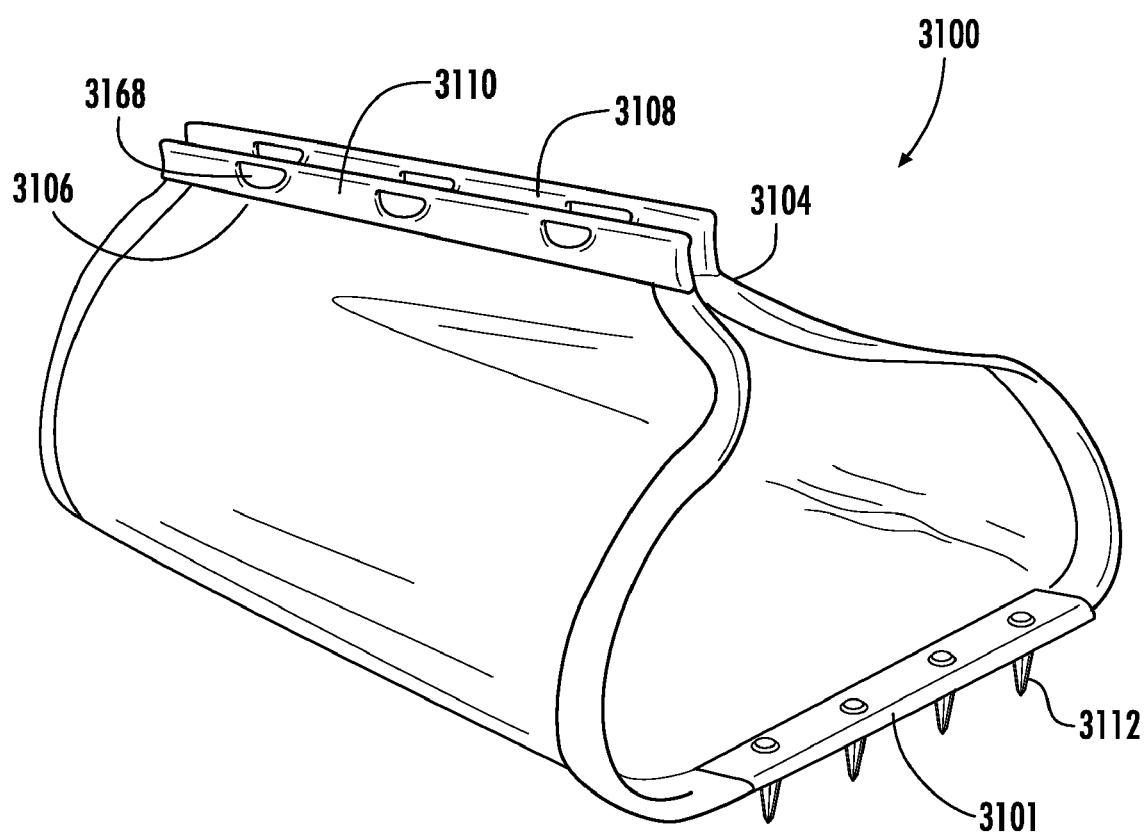
Figure 31:
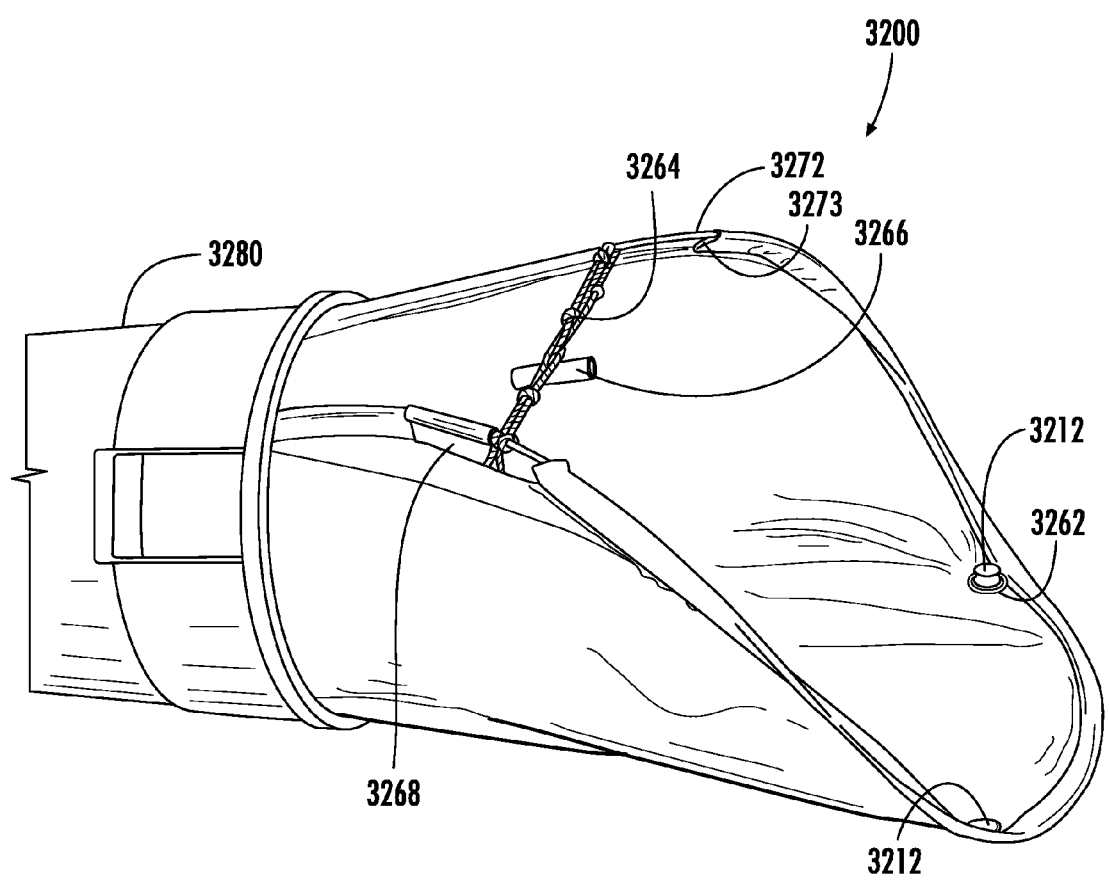
Figure 32:
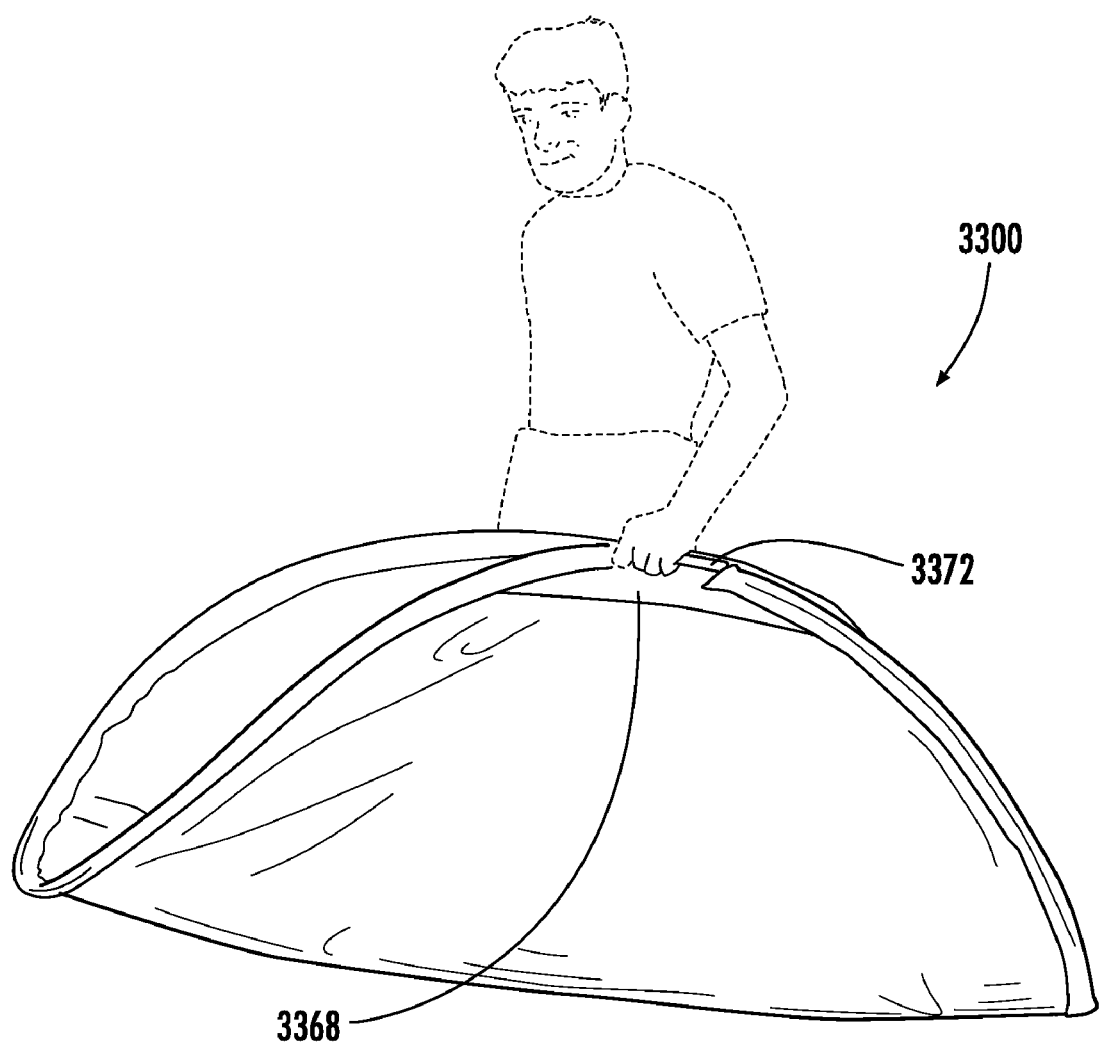
Figure 33:
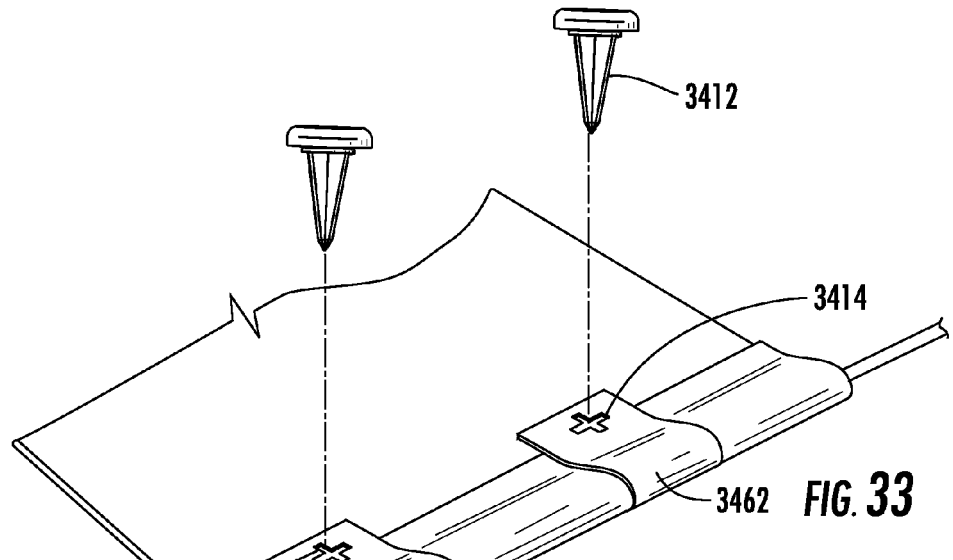
Figure 34:
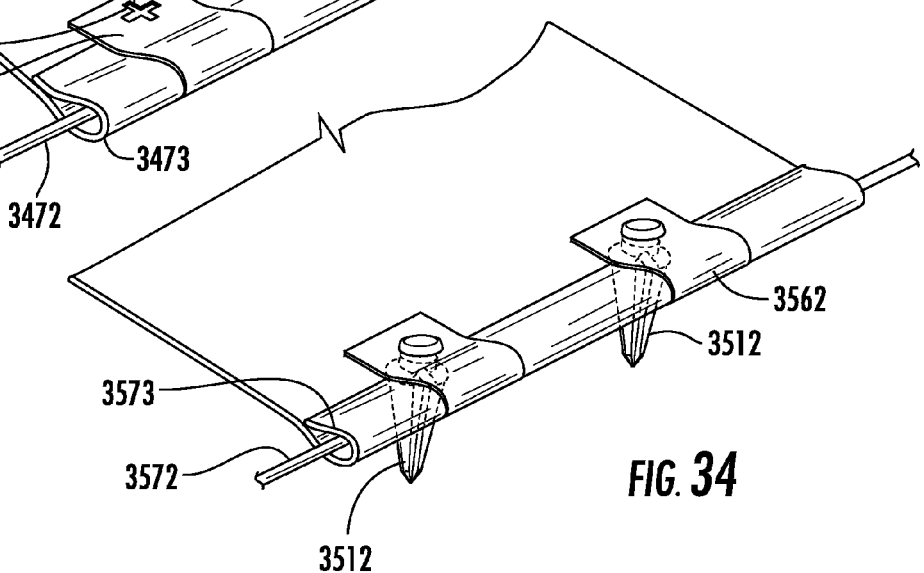
Figure 35:
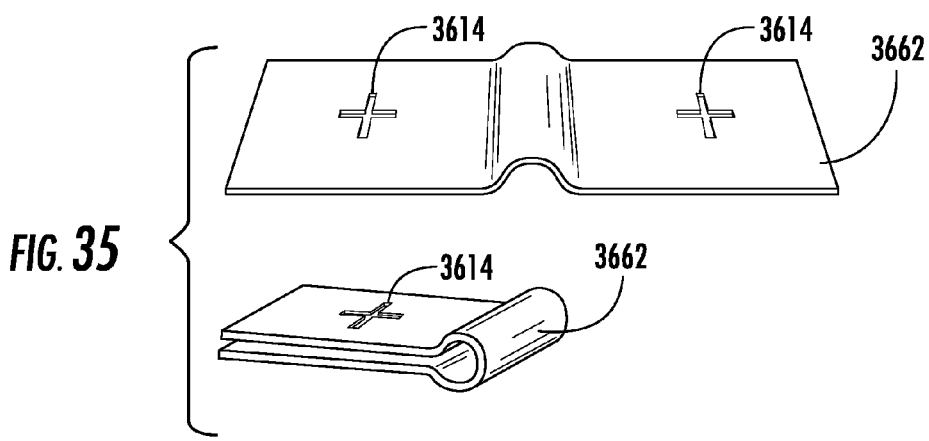
Figure 36:
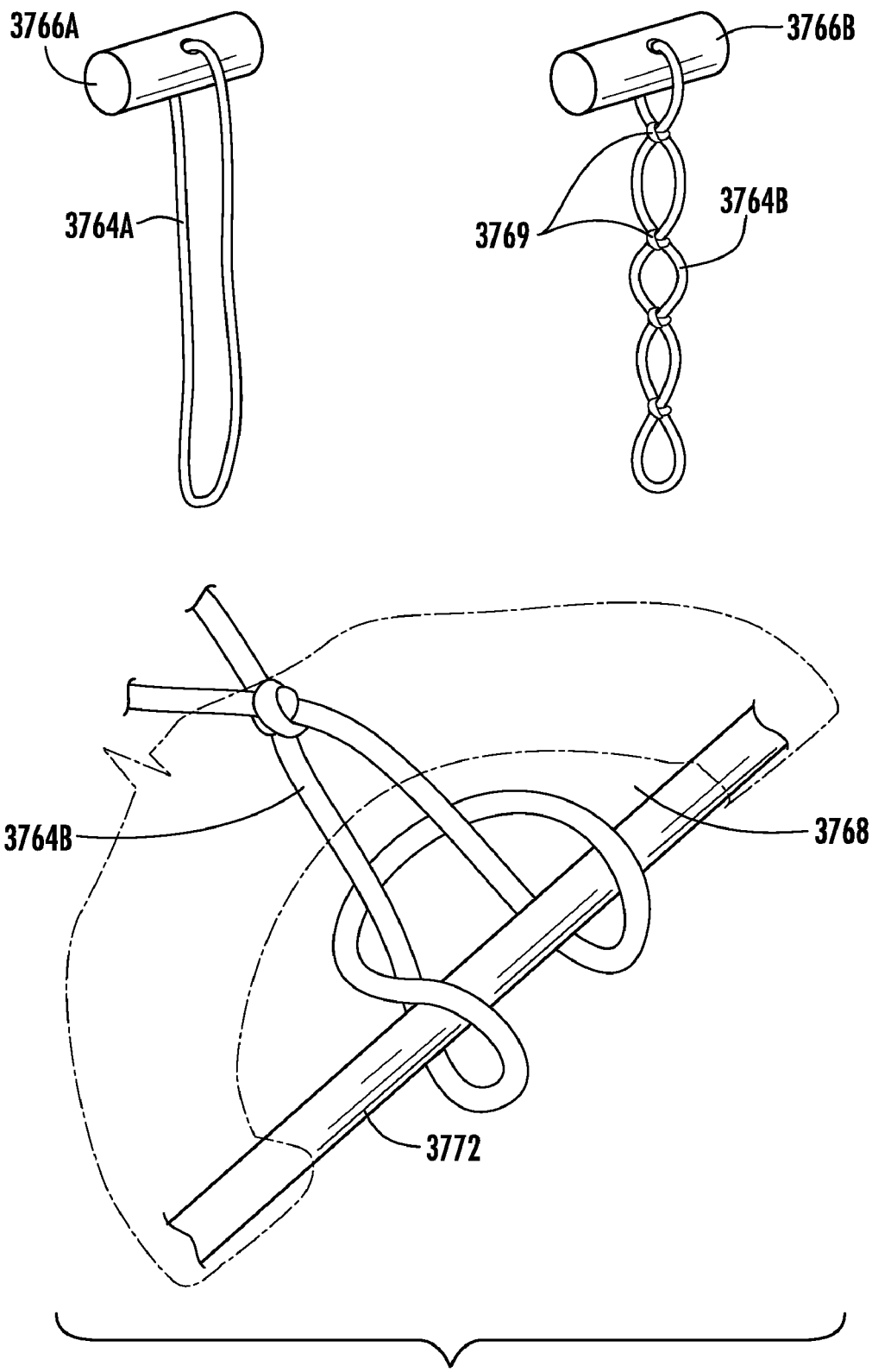
Figure 37:
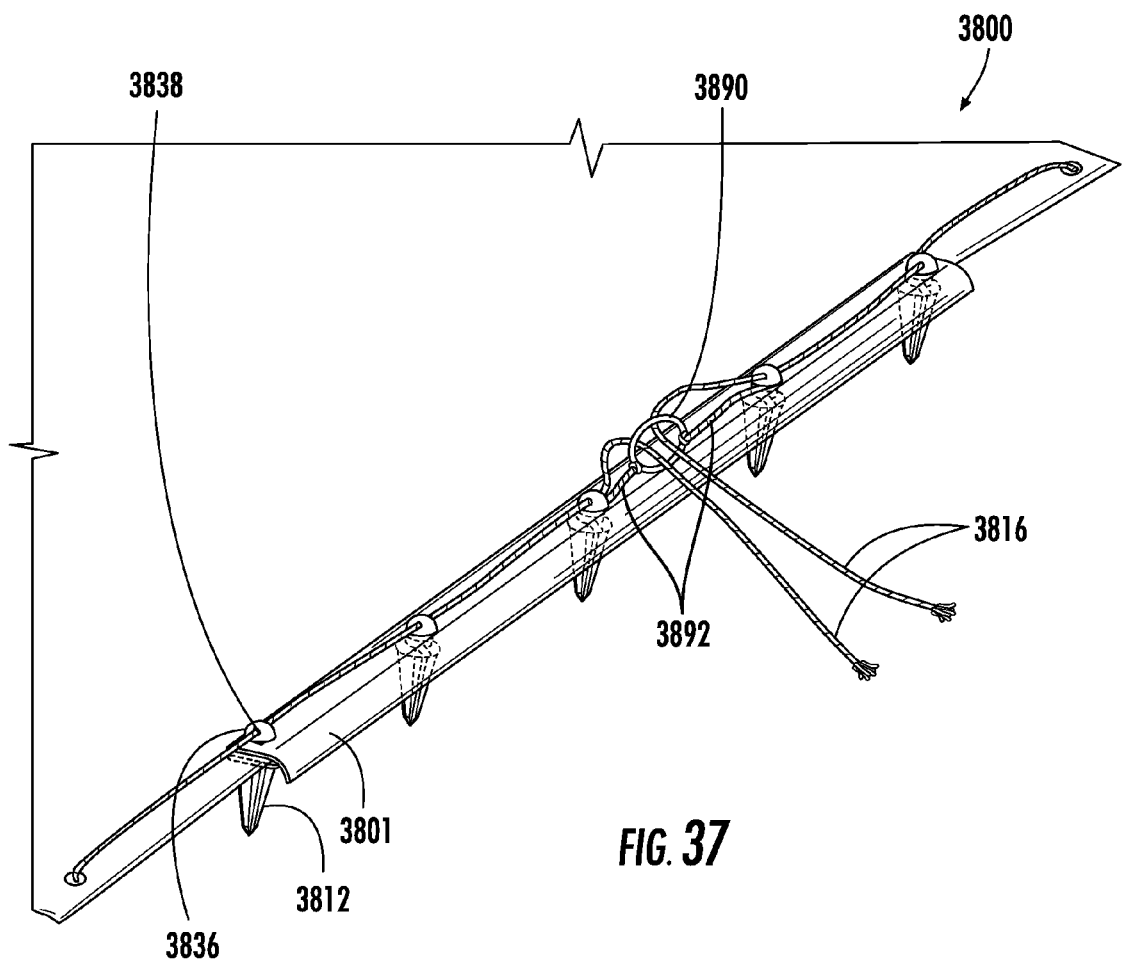
Figure 38:
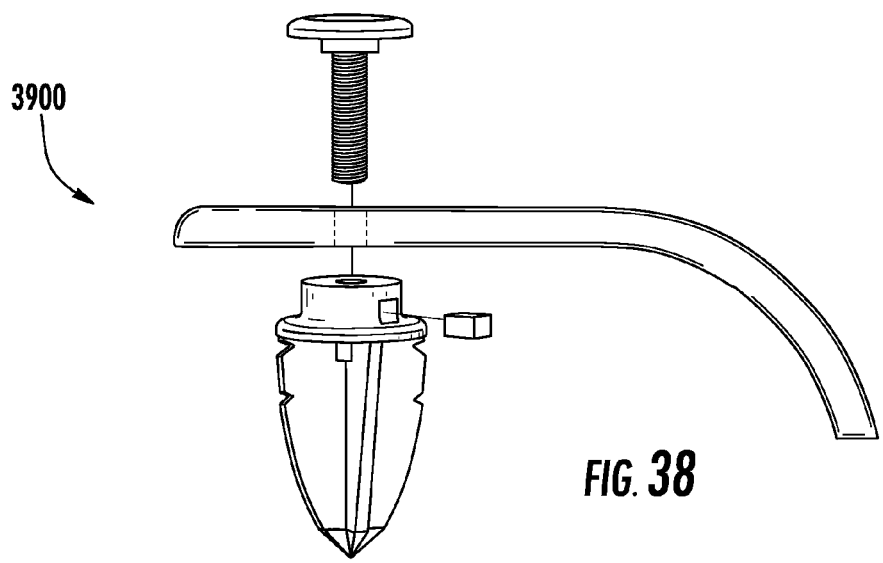
Figure 39A:
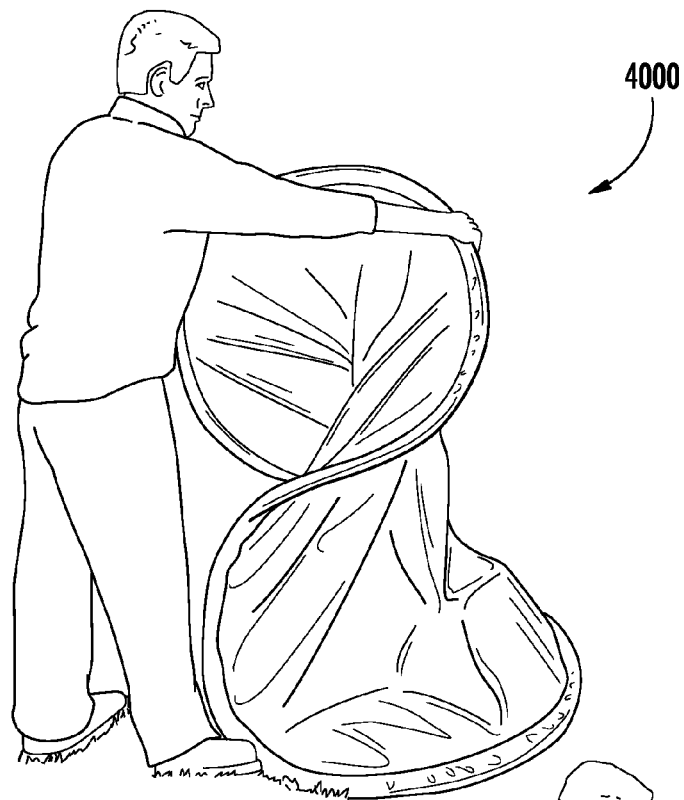
Figure 39B:
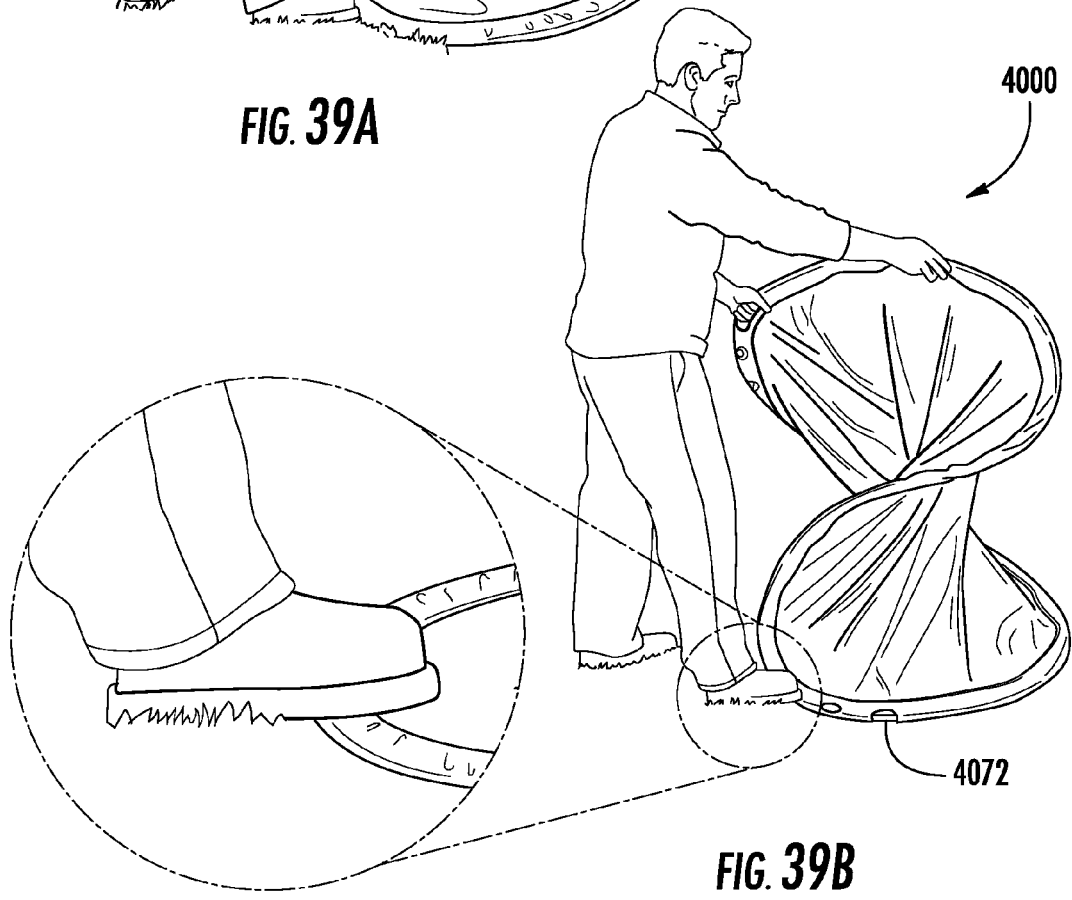
Figure 39C:
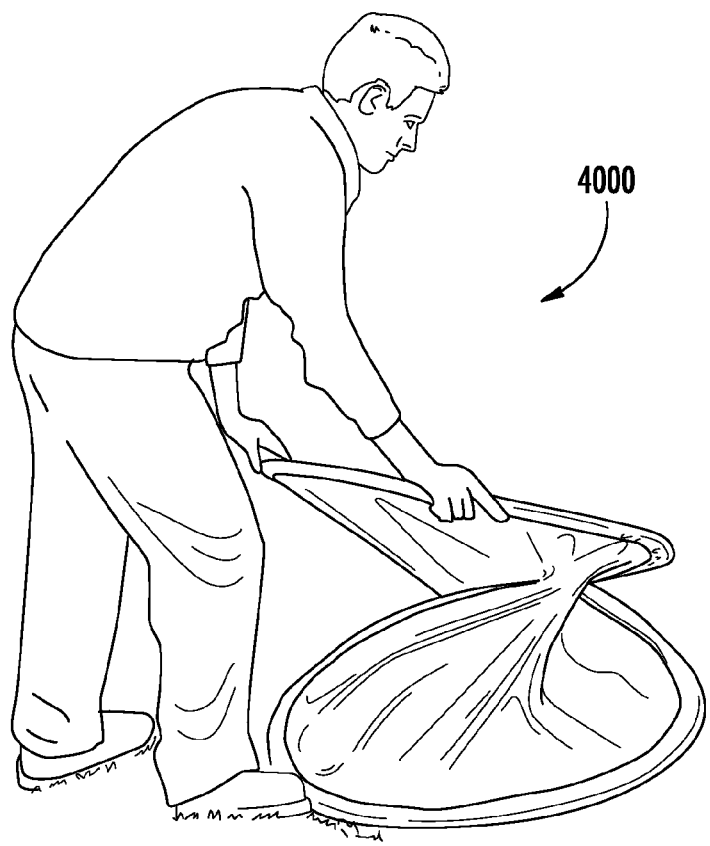
Figure 39D:
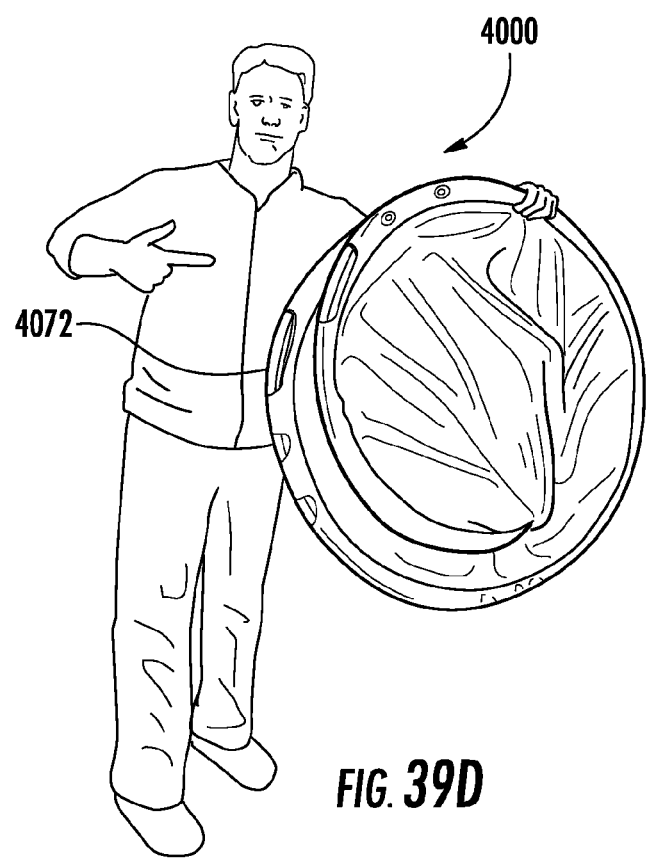
Figure 39E:
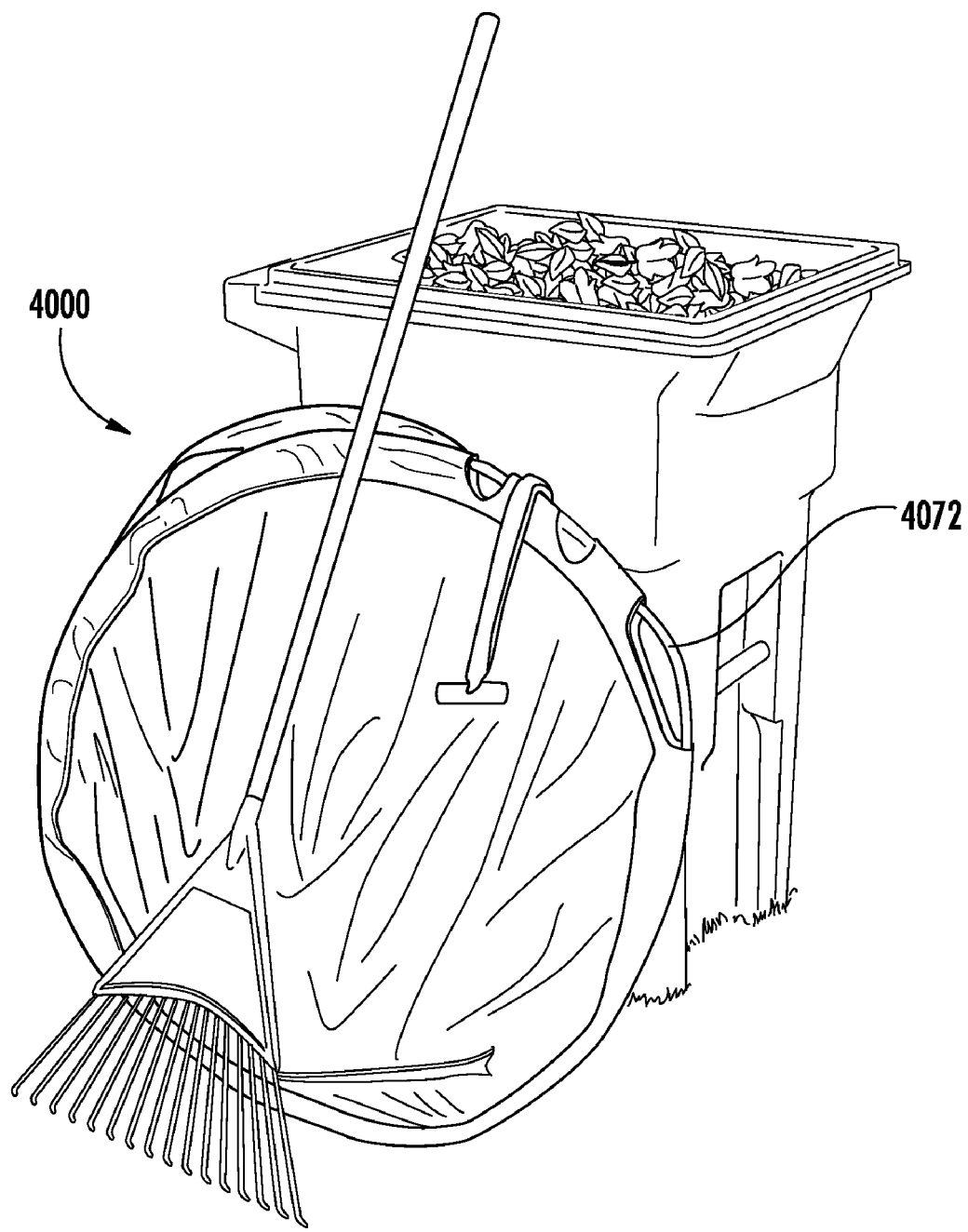
Figure 40A:
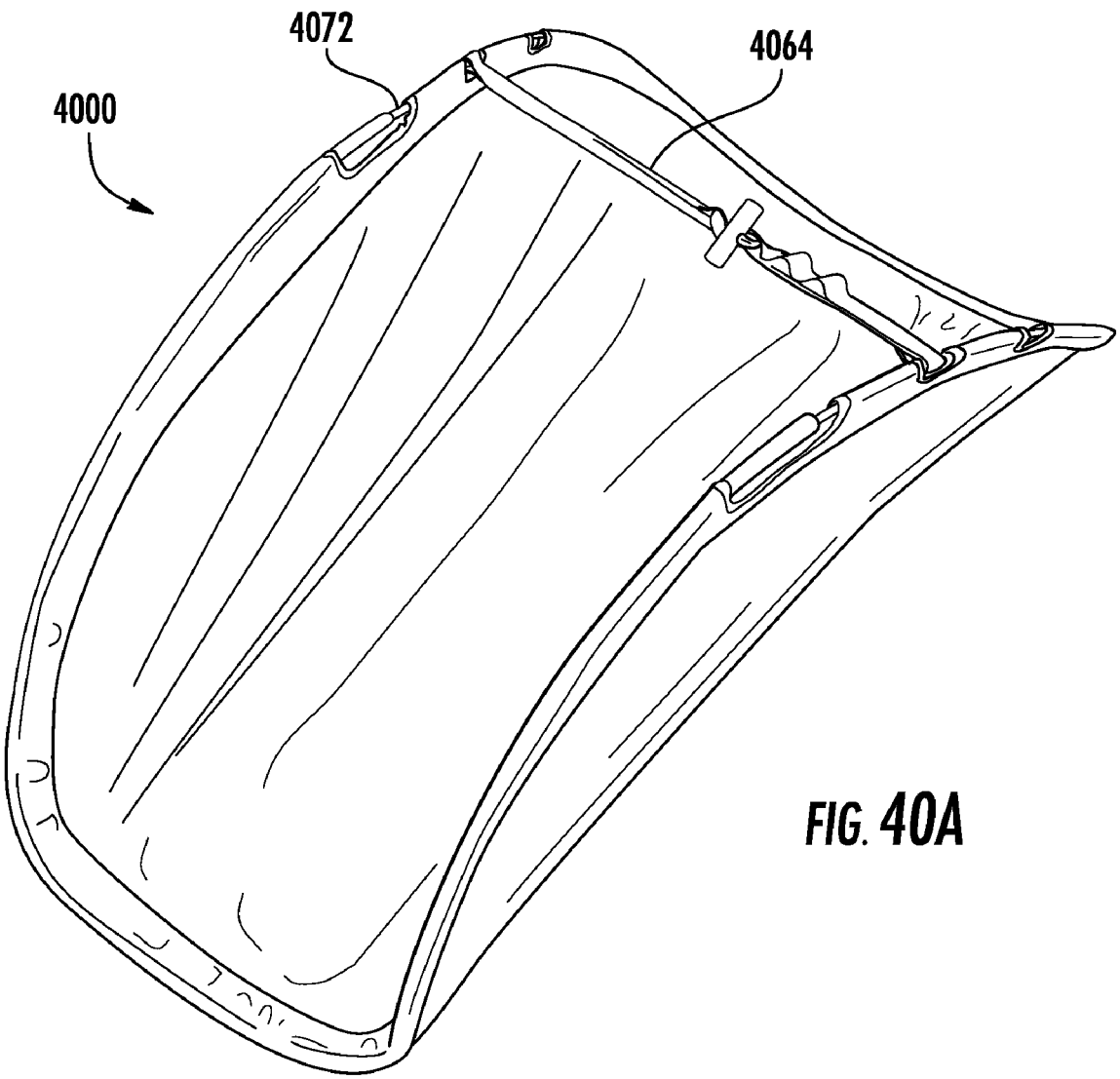
Figure 40B:
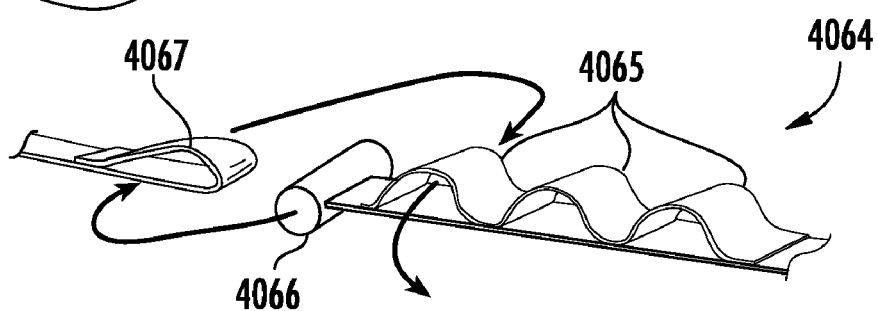
Figure 41:
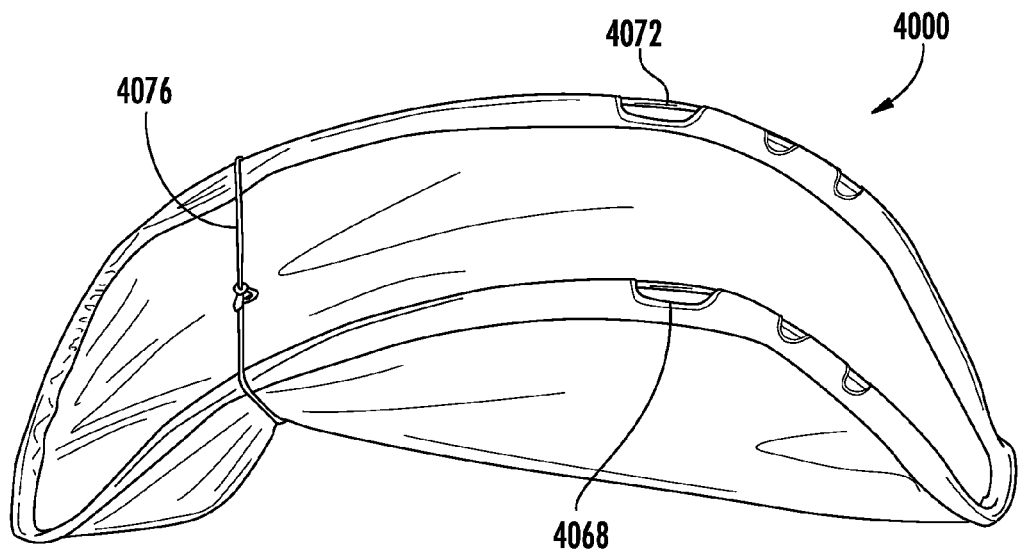
Figure 42:
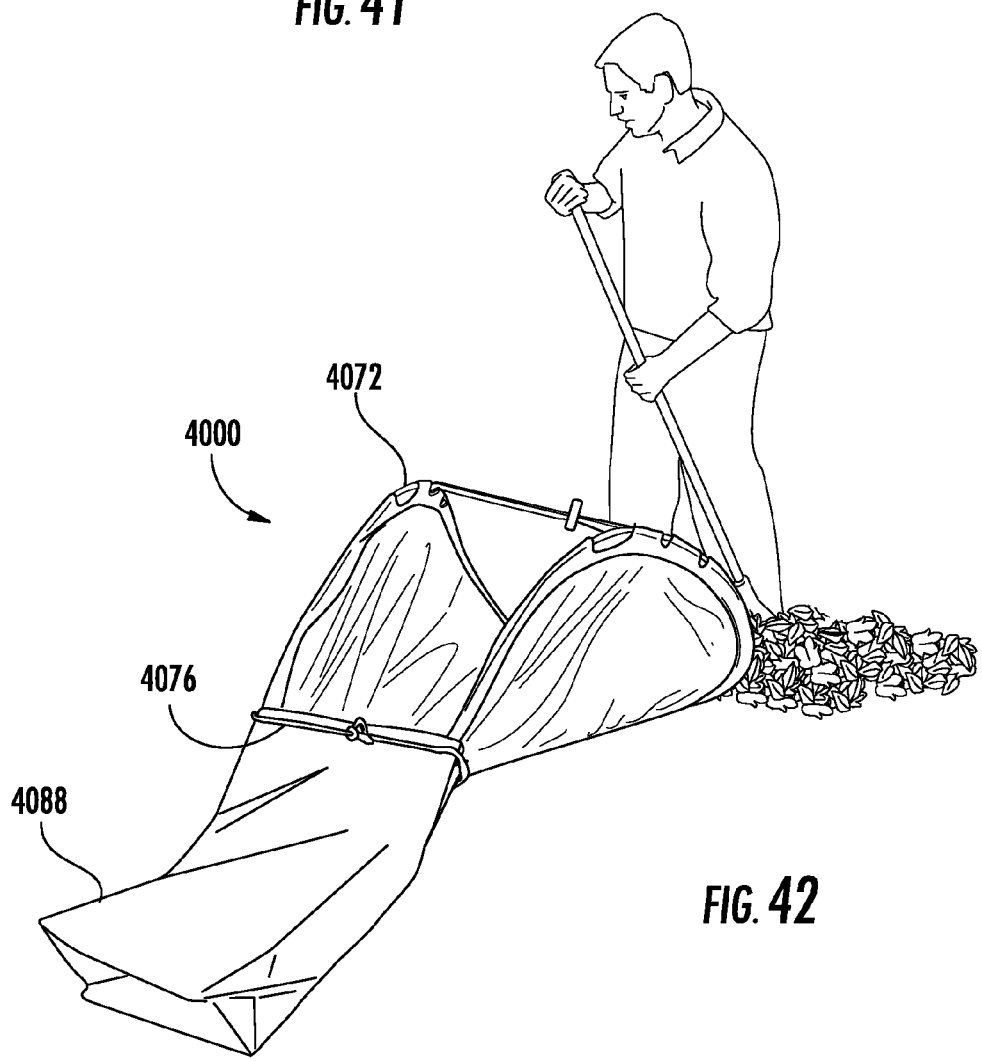
Figure 43:
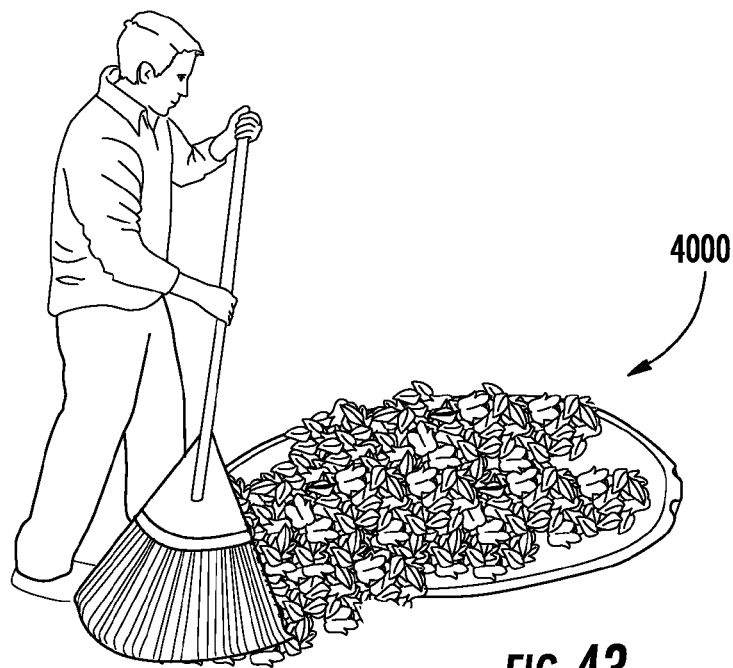
Figure 44:
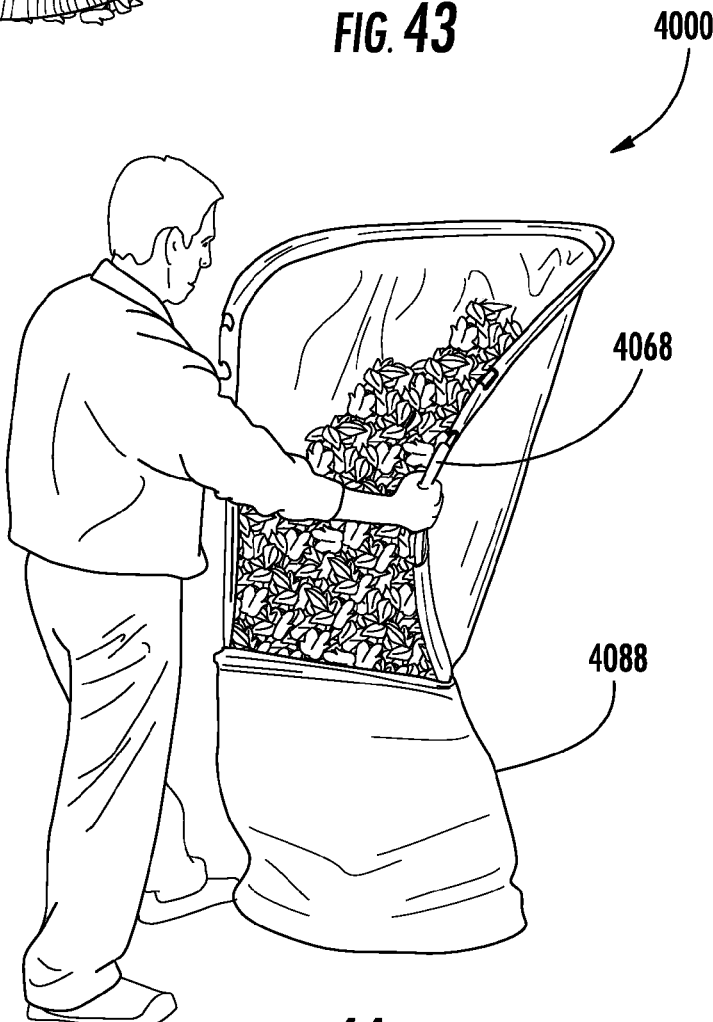

FIGS. 6A and 6B are side views of an edge device shown in an open position and a closed position, respectively, according to an exemplary embodiment in which the edge device may be attached to a tarp and held in a closed position by a spike or anchor having flexible locking fins or wings that are shown re-deployed and/or locked under the bottom member of the edge device in FIG. 6B, where the spike's wings are resiliently compressible for fitting through aligned holes in the edge device and tarp and then to redeploy after passing through the holes;

FIG. 7 is a side view of an edge device according to exemplary embodiments shown in the closed position, where the edge device includes a living hinge or live hinge section;

FIG. 8 is a perspective view of an exemplary embodiment of an edge device and a spike or anchor, whereby the edge device may be attached to the spike and to an edge portion of a tarp by a threaded carriage-type bolt inserted into a hole along the top of the edge device and a matching nut received in an opening in the neck of the spike;

FIG. 9 is another perspective view of the edge device and spike shown in FIG. 8;

FIG. 10 is another perspective view of the edge device and spike shown in FIG. 8, and also illustrating an exemplary threaded carriage-type bolt and matching nut that may be used for attaching the edge device to an edge portion of a tarp according to an exemplary embodiment;

FIG. 11 is a perspective view of an exemplary spike or anchor attachable to an edge device with a carriage-type bolt and matching nut according to an exemplary embodiment, and illustrating an opening in the neck of the spike for receiving the nut and the spike's aligned openings for receiving the threaded portion or stem of the bolt;

FIG. 12 is a side cross-sectional view of a spike or anchor having flexible locking fins or wings according to an exemplary embodiment;

FIG. 13 is a cross-sectional view illustrating the shaft and fins of the spike shown in FIG. 12;

FIG. 14 is a side view of a spike or anchor having an opening in the head of the spike for receiving a rope or other attachment to a tarp and edge device according to an exemplary embodiment;

FIG. 15A is a side view of an exemplary embodiment of a two-piece spike or anchor having an upper piece with an externally threaded portion that may be screwed into an internally threaded opening of a lower piece to attach the upper and lower pieces of the spike to each other on opposite upper and lower sides of an edge device for securing the spike and edge device to a tarp;

FIG. 15B is a side view of an exemplary embodiment of a two-piece spike or anchor having a lower piece with an externally threaded stem portion that may be threaded or screwed into an internally threaded opening of an upper piece to attach the upper and lower pieces of the spike to each other on opposite upper and lower sides of an edge device for securing the spike and edge device to a tarp;

FIG. 15C illustrates an underside of a head or cap of an exemplary embodiment of a two-piece spike or anchor, and showing a threaded nut in a rectangular opening in the underside of the spike's head into which may be threaded or screwed an externally threaded stem portion of a lower piece of the two-piece spike such as shown in FIG. 15B;

FIG. 15D is a perspective view showing an exemplary method for attaching a spike or anchor to an edge device with a carriage-type bolt and matching nut according to an exemplary embodiment;

FIG. 16 illustrates an exemplary embodiment of a funneling apparatus or funnel-type device having a plastic sheet construction shown in a substantially flat configuration, which allows, for example, the funneling apparatus to be readily stored in the flat configuration;

FIG. 17 illustrates the funneling apparatus of FIG. 16 configured into a funnel-like configuration in which the funneling apparatus may be clipped onto an edge of a container and used for funneling particulates or other materials into the container;

FIG. 18 illustrates a funneling apparatus according to an exemplary embodiment shown in a substantially flat configuration, which allows, for example, the funneling apparatus to be readily stored in the flat configuration;

FIG. 19 illustrates the funneling apparatus of FIG. 18 configured into a funnel-like configuration in which the funneling apparatus can be used for funneling particulates or other materials;

FIG. 20 illustrates an exemplary embodiment of a funneling apparatus in a substantially flat configuration, and also illustrating exemplary ribs and stays that provide structure and support to the funneling apparatus, exemplary handles in the form of a strap, openings/cutouts, and spikes installed to or on pads/grommets along an edge portion of the funneling apparatus;

FIGS. 21A through 21E are partial views of various exemplary embodiments of funneling apparatus shown in substantially flat configurations and with different alternative shapes and different exemplary locations for placement of one or more edge devices;

FIG. 22 illustrates an exemplary embodiment of a funneling apparatus in a substantially flat configuration, and also illustrating exemplary ribs and stays, exemplary handle cutouts, and edge devices installed along an edge portion of the funneling apparatus;

FIG. 23 illustrates an exemplary embodiment of a funneling apparatus shown in a substantially flat configuration, where the funneling apparatus includes stays for holding the funneling apparatus in a funneling configuration and a stay for helping maintain the funneling apparatus in an open configuration attached to a container;

FIG. 24 is a perspective view of an exemplary funneling apparatus shown as it is being held in a funneling configuration with at least one stay, and illustrating a forward end portion of the funneling apparatus inserted into a bag for filling the bag;

FIG. 25 is another perspective view of the exemplary funneling apparatus and bag shown in FIG. 24, and illustrating the exemplary manner by which the bag may be held open by a bag stay according to an exemplary embodiment;

FIG. 26 is a perspective view of an exemplary embodiment of a funneling apparatus shown as it is being held in a funneling configuration by a stay, and illustrating the funneling apparatus in a horizontal position with its end portion inserted into a garbage can for loading debris or leaves with a rake or other means into the garbage can via the funneling apparatus;

FIG. 27 is a perspective view of an exemplary embodiment of a funneling apparatus shown as it is being held in a funneling configuration by a stay, and illustrating the funneling apparatus in a vertical position with its end portion inserted into an upright garbage can, whereby the funneling apparatus may be used for compressing or transferring debris from the funneling apparatus to the garbage can and/or for placing leaves (e.g., dropping leaves while gutter cleaning, etc.) into the funneling apparatus to load the leaves into the garbage can;

FIG. 28 is a perspective view of a funneling apparatus shown in a ready-for-use funneling or carrying configuration, and also illustrating handle cutouts for carrying the funneling apparatus and an edge device and spikes for securing the edge portion of the funneling apparatus to the ground according to an exemplary embodiment;

FIG. 29 is a perspective view of a funneling apparatus shown in a ready-for-use funneling or carrying configuration, and also illustrating a removable strap for securing the two lateral edges of funneling apparatus to help maintain the funneling apparatus in the rolled-up/funneling/carrying configuration, handle cutouts for carrying the funneling apparatus, and spikes for securing the edge portion of the funneling apparatus to the ground according to an exemplary embodiment;

FIG. 30 is a perspective view of a funneling apparatus in a ready-for-use funneling or carrying configuration, and also illustrating handle cutouts for carrying the funneling apparatus and an edge device and spikes for securing the edge portion of the funneling apparatus to the ground according to an exemplary embodiment;

FIG. 31 is a perspective view of an exemplary embodiment of a funneling apparatus shown as it is being held in a funneling configuration by a stay and with its edge portion secured to the ground by spikes frictionally engaged within grommets of the funneling apparatus, and illustrating the funneling apparatus in a horizontal position with its forward end portion inserts into a garbage can for loading debris or leaves with a rake or other means into the garbage can via the funneling apparatus;

FIG. 32 illustrates an exemplary embodiment of a funneling apparatus being carried by the handle cutouts with the funneling apparatus in a folded configuration suitable for carrying leaves and debris loaded onto the funneling apparatus;

FIGS. 33 through 35 are perspective views illustrating exemplary embodiments having relatively flat and rigid platforms for mounting spikes along an edge portion of a tarp or funneling apparatus, so as to enable a spike to be inserted into an aperture and be held in place by friction according to an exemplary embodiment;

FIG. 36 illustrates exemplary embodiments of adjustable length straps suitable for connecting or securing the lateral edges of a funneling apparatus for maintaining the funneling apparatus in a ready-for-use funneling configuration;

FIG. 37 is a perspective view of an exemplary embodiment in which a collar is used to channel ropes connected to and threaded through holes in spikes or anchors, so as to better tighten the tarp's edges together when dragging/pulling the tarp by the ropes;

FIG. 38 is a perspective view of an exemplary edge device and spike or anchor that may be used for attaching the edge device to an edge portion of a tarp and for securing the tarp's edge portion to the ground according to exemplary embodiments;

FIGS. 39A through 39E are perspective view illustrated various stages of a process during which an exemplary embodiment of a funneling apparatus may be twisted into two or more smaller loops and folded flat into a storage configuration;

FIG. 40A is another perspective view of the exemplary funneling apparatus shown in FIG. 39, and illustrating the funneling apparatus being held in a funneling configuration by a strap having loops and a handle inserted or threaded into a selected one of the loops;

FIG. 40B is a perspective view showing a portion of the strap having loops and the handle shown in FIG. 40A, where the arrows help illustrate the exemplary manner in which the handle may be threaded or inserted through a looped end portion of the strap and then threaded or inserted through a selected one of the loops on the other side of the strap;

FIG. 41 is another perspective view of the exemplary funneling apparatus shown in FIG. 39, and also illustrating a bag stay according to an exemplary embodiment;

FIG. 42 is another perspective view of the exemplary funneling apparatus and bag stay shown in FIG. 41, and illustrating the exemplary manner by which the bag stay may help hold a bag in place while leaves are being raked onto the funneling apparatus;

FIG. 43 is another perspective view of the exemplary funneling apparatus shown in FIG. 39, and illustrating the exemplary manner by which leaves may be raked onto the funneling apparatus when in a substantially flat configuration; and FIG. 44 is another perspective view of the exemplary funneling apparatus shown in FIG. 43, and illustrating the exemplary manner by which the funneling apparatus may be configured into a funnel-like (or taco-shaped) configuration and inserted into a bag for funneling leaves into the bag.

DETAILED DESCRIPTION

Example embodiments will now be described more fully with reference to the accompanying drawings.

The Background section above sets forth various drawbacks associated with existing methods for cleaning up leaves, etc. that were recognized by the inventor hereof. In view of these drawbacks, the inventor hereof set out to develop methods and devices for cleaning up leaves, etc., which may provide improved efficiency, convenience, etc. Accordingly, various exemplary embodiments are disclosed herein of devices and methods that may help improve efficiency and convenience when cleaning up leaves and/or debris using tarps, garbage cans, bags, etc.

As disclosed herein, some exemplary embodiments may enable efficient loading of leaves onto a tarp by providing a readily attachable and detachable edge device. The edge device may secure and readily seal (and unseal) the tarp's edge portion to the ground to facilitate debris and leaf loading onto the tarp, such as with a rake or other tools/methods. The edge device may be relatively lightweight, flexible, and be securable to the ground just by stepping on the edge device in order to drive spikes or anchors (e.g., removably attached to or integral with the edge device, etc.) into the ground. With the edge device anchored into the ground, the edge device may thus hold the tarp's edge portion down against the ground, for example, to reduce both the tarp from being blown around in high wind gusts and/or to generally prevent leaves from being raked under the tarp (that, as mentioned above, would have to be re-raked later after the tarp is re-positioned).

According to various aspects of the present disclosure, there are provided various exemplary embodiments of leaf and debris cleanup tools. Further aspects relate to methods of cleaning up leaves and garden-related debris by loading onto a tarp to be moved and/or by loading or filling garbage cans, plastic or paper bags, other containers, etc. Additional aspects relate to methods of removing leaves and debris with a traditional rake to fill or load a tarp, garbage can, bag, etc. more efficiently (including compressing debris materials in cans or bags to more fully load them with materials or debris, especially when such materials are more readily compressed).

Aspects of the present disclosure also generally relate (but not exclusively) to devices and methods relating to the pickup or cleanup of leaves, debris, other materials, etc. and/or to pouring or filling non-liquids. For example, disclosed herein are exemplary devices that may be used in conjunction with tarps, garbage cans, garden bags, leaf bags, etc. used for yard cleanup and other large area debris cleanup, including the filling of garbage cans, bags, other containers or vessels, etc. As disclosed herein, exemplary devices and methods are designed to be used with a leaf rake (or other tools) to collect leaves and other debris and load into garbage cans or bags (or other containers), onto tarps for moving or loading (usually by dragging), or other loading/disposal methods.

Other aspects of the present disclosure generally relate (but not exclusively) to funneling apparatus or devices that can be reconfigured between a funnel-like configuration (e.g., for funneling leaves, debris, other materials, etc.) and a substantially flat configuration (e.g., for conveniently storing the funneling apparatus, etc.). As disclosed herein, exemplary funneling apparatus may include features for allowing the funnel size (e.g., diameter of either or both ends, etc.) to be selectively adjustable and tailored for a particular application to accommodate, for example, different types and sizes of garbage cans, garbage bags, leaf/garden bags, etc.

Disclosed herein are exemplary embodiments of devices attachable to generally flat materials (e.g., tarps, plastic sheets, and other similar structures). When attached to a tarp, for example, an edge device disclosed herein may help secure the tarp to the ground, for example, to prevent it from blowing or being moved or lifted when raking leaves or moving debris onto the tarp. Additional embodiments include such an edge device that may be clamped onto a tarp's edge portion edge by compressing two sides of the edge device (e.g., sides having a generally V-shaped cross section, etc.) about the tarp's edge portion and then securing the two sides together by spikes or anchors, which spikes are driven temporarily into the ground (e.g., by stepping on them, etc.). The spikes can then be removed from the ground by subsequently lifting or pulling, such as by pulling upwardly on the tarp or a rope attached to the tarp or spikes (securing directly to the tarp). In an exemplary embodiment, an edge device includes two sides connected by a thinner and/or more flexible section to enable this "V" shape to close and be secured closed with one or more locking spikes or anchors, which also function to secure the tarp and edge device to the ground. Such edge devices may be used in conjunction with rollable or adjustable size funneling apparatus or devices which can, likewise, be used to permit raking or pushing leaves onto such funneling apparatus.

An exemplary edge device may be hard or semi-rigid and be removably attachable to a tarp or similar device. The edge device may anchor the tarp securely to the ground during raking or otherwise moving leaves or debris onto the tarp (before dragging or otherwise moving leaves or debris from the tarp to a destination). The edge device may also be relatively flexible along its length, for example, to allow the edge device to be bent or formed into a generally "U" shape as disclosed herein. At least a portion of the edge device may have a cross section roughly shaped like the letter "V". The edge device may include a thin section at, adjacent, or remotely spaced apart from the apex of the "V", where the thin section allow for the opening and closing of the "V" and tightening or clamping about an edge portion of a tarp (or other flat material) to secure the edge device to the tarp's edge portion. Further, an edge device may be constructed to have numerous spikes or anchors as an integral component part of the edge device. That is, the edge device and spikes may be manufactured or formed (e.g., injection molding, etc.) so as to have a monolithic or single component construction. Alternatively, the spikes may be removably attachable to the edge device such that the spikes themselves or mechanical fasteners for attaching the spikes pass through openings (e.g., holes, etc.) in the edge device and/or in the tarp's edge portion that is captured between the portions of the edge device forming the "V" shape. The portions of an edge device forming the "V" shape may also be referred to herein as a "V-edge" for convenience only and not for purposes of limitation, so as to efficiently identify or distinguish the V-edge of an edge device form an edge or edge portion of a tarp or other item. The V-edge may be configured such that it has a cross-sectional curve to it so as it extends out from the tarp edge it also curves downward in its installed and "in-use" position. For example, the top portion of the V-edge may have a convex curvature so that it is less likely a leaf rake or other object would catch the edge device and lift the edge device and tarp during use. The convex curvature may also permit the edge device to seal against the ground more effectively, as it would touch the ground with an attack angle versus horizontal, which may thus compress, for example, less grass under the edge device and permit the edge device to sink deeper and generally, attach more securely. Thus, the installed edge device creates an outwardly looking convex surface when seen from above in its in-use position, and it is intended that, when anchored by spikes, the edge device and tarp edge portion to which it is secured will be more prone to remain secured to and sealed against the ground or lawn surface, reducing the amount of leaves and debris from getting under the tarp while raking debris and/or leaves onto the tarp. Alternatively, other exemplary embodiments include an edge device with a different cross-section or profile. For example, another exemplary embodiment includes an edge device that is single-sided or one-sided (e.g., edge device 3900 shown in FIG. 38, etc.). A further exemplary edge device is configured to have a profile resembling a "check mark," etc.

In various exemplary embodiments, an edge device is designed to be temporarily secured, along with the tarp, to the ground. But in some embodiment, the edge device is also intended to be readily lifted out by pulling up the tarp and/or edge device and/or a rope or other fastener attached to the tarp and/or edge device. This action of pulling up would also pull the spikes or anchor up and out of the ground. A rope may be secured to the tarp directly. But a rope may also be secured directly to an edge device attached to the tarp. In either case, the rope whether attached to the tarp, edge device, or both may facilitate and make it easier to pull and drag the tarp when filled with leaves.

An edge device disclosed herein may be sufficiently flexible such that it can flex when the tarp's edges are lifted and gathered after the spikes are released from the ground. The edge device may be made of a material that allows the edge device to be relatively easily bent from a straight section into a "U" shape (along its length) facilitating the tarp being able to be dragged through fence gates or through areas that are narrower than the length of the edge device in its straight position (assuming the edge device was installed straight across the leading edge of the tarp being dragged or pulled).

The spikes, stakes, nails, anchors, etc. that may be used to anchor or secure an edge device and tarp edge portion to the ground (while loading the leaves onto the tarp) may be configured to be received and accepted through openings (e.g., holes, etc.) in the edge device and/or in the tarp. For example, holes may be stamped, punched, or otherwise formed in the edge device and/or in the tarp for receiving the spikes.

Various exemplary embodiments may also include one or more spikes having have openings (e.g., holes, etc.) formed or molded into a rounded or other shape head of the spike to allow a rope to be threaded through the head of the spike through the opening. This would enable a rope to be attached to the spike(s) holding the edge device to the tarp. Alternative embodiment may include one or more spikes that have an exposed neck beneath the head (when installed just beneath an edge device) that could accept a rope, cord, etc. for pulling the tarp.

Also disclosed herein are funneling apparatus and devices. In an exemplary embodiment, a funneling apparatus includes a sheet of material having a first edge portion and a second edge portion. At least one attachment device is provided for removably attaching the first edge portion to the second edge portion (e.g., to form a funnel shape, etc.). The funneling apparatus includes a first configuration in which the sheet is rolled into a funnel-like configuration with the attachment device attaching the first edge portion to the second edge portion. The funneling apparatus can also be configured into a second configuration in which the sheet is substantially flat with the first and second edge portion detached from one another. The attachment device or other device (e.g., clip, etc.) may be provided for securing, hooking, or holding with friction (or other means) the funneling apparatus to the garbage can or bag. In some embodiments, the funnel shape might also be accomplished with a strap (e.g., fixed length strap, an adjustable length strap, etc.) or similar device to secure the funneling apparatus in the funnel shape without the two free edge portions touching or meeting. For example, one end portion of a strap may be fixedly attached or secured (e.g., adhesively bonded, stitched, mechanically fastened, etc.) to one side or edge portion of the funneling apparatus and the strap's other end portion is releasably attachable (e.g., via hook and loop fasteners, etc.) to the second side or edge portion of the funneling apparatus. The funneling apparatus may also be configured such that it may be placed into a sling-type shape more suitable for carrying smaller loads than dragging of heavier larger loads.

The funneling apparatus may include features that allow the funnel size to be selectively adjusted and tailored for a particular application. The funneling apparatus may be used, for example, as a leaf removal device with or without an edge device. For example, the funneling apparatus may be used in conjunction with an edge device when loading leaves onto the funneling apparatus in the flat configuration. Or, for example, the funneling apparatus in the funneling confirmation may be inserted into a garbage can or bag to facilitate a faster and easier way to more fully fill a garbage can or bag (especially when the debris, leaves etc. can be readily compressed in order to fit more into the garbage can or bag).

Additional exemplary embodiments of a funneling apparatus provide a rollable tarp or sheet that may be rolled into and held in a funneling configuration, such as by inserting into a garbage can, by one or more attachment devices (e.g., straps, etc.), by one or more stays (e.g., one or more rods, tubes, and/or dowels with a round or circular cross section, etc.). For example, a stay may be provided as a single piece stay that is disposed partially along a portion of the perimeter or along the entire perimeter of the funneling apparatus. Or, for example, a stay may be provided as multi-piece stay that includes two or more pieces the ends of which are connected by connectors. The rollable tarp or sheet may be rolled into the funneling configuration and inserted into and/or secured to a garbage can or leaf bag, to thereby provide a wider opening (e.g., having an adjustable size, etc.) and extension of the can and/or bag, for filling, much like a funnel. The rollable tarp or sheet may also be used alone for smaller quantities of debris in its flat configuration or otherwise). Funnel-type embodiments disclosed herein may be made from flat materials, such as canvas, standard tarp materials (e.g., woven and coated polypropylene, etc.), plastic, PVC (polyvinyl chloride), PET (polyethylene terephthalate), polyethylene, polypropylene, EPDM rubber (ethylene propylene diene Monomer (M-class) rubber), or other materials with similar flexibility and durability properties (in some cases similar to leaf and similar utility tarps) that allows the material to be rolled into a funnel-like shape from a generally flat configuration. In various exemplary embodiments, a funneling apparatus when in the flat configuration may have a generally oval or teardrop shape with the pointed tip section removed when viewed from above. Alternative shapes are also possible, including circular, trapezoidal, a shape with rounded or radiussed corners, etc. As disclosed herein, a funneling apparatus may be rolled then held into the rolled position to form a funnel-like adapter for garbage cans and bags, whereby the funneling apparatus is partially inserted into the bag or can then laid on the ground or surface. With the funneling apparatus secured into its funneling configuration and open at one end (the wider or insertion end), an edge portion of the funneling apparatus might be laying or secured to the ground. For example, an edge portion of the funneling apparatus may be secured to the ground by using an edge device and/or spikes as disclosed herein when the funneling apparatus and can/bag are laying on their side on the ground in a horizontal position. In this example, the funneling apparatus may thus enable a larger quantity of leaves, debris, etc. to be loaded, raked, or pushed into the can/bag by filling the funneling apparatus and unfilled portion of the can or bag more rapidly versus lifting or scooping leaves or debris in discrete amounts into an upright can or bag with or without the funneling apparatus. The leaves or debris after being raked or moved onto or into the funneling apparatus may fill the funneling apparatus with uncompressed leaves or debris even if the garbage can or bag is mostly full, thus permitting the can or bag (along with the funneling apparatus) to be uprighted if desired with a quantity of debris in the can or bag in combination with the funneling apparatus, and then be further compressed (and in total more leaves than normal would fit by volume in the can or bag). In comparison, filling and compressing leaves in a garbage can or bag tends to be a difficult and time-consuming process as it can only be done in small quantities with nearly full cans or bags. In a sense, the funneling apparatus when installed into the garbage can or bag can temporarily increase its capacity as well as the aperture size when gathering debris. The alternative method is generally loading a smaller quantity of debris at a time (up to or slightly over the rim of the bag or garbage can) and compressing the leaves to make room for another scoop or load. It is typical when filling garbage cans and leaf bags to fill them to near or just over the brim and then compress several times in order to fully load a can or bag. The ability to overfill the garbage can or bag by also filling the positioned funneling apparatus should improve efficiency of this process by enabling fewer "fill and compression cycles."

Efficiency may also be improved because the funneling apparatus and garbage can or bag may be both laid flat on the ground, which would allow leaves or debris to be raked into the funneling apparatus in bulk rather than lifting smaller quantities by hand or by other devices before compressing in smaller "batches." Raking is more efficient than scooping, lifting, or otherwise picking up leaves or debris in some manner to load an upright bag or garbage can in small "batches." Part of this efficiency comes from the use of gravity to refill the leaves as they are compressed. Specifically, as leaves in the bottom of the funneling apparatus (near the part that is inserted and overlapping the can or bag) are compressed into the can or bag, leaves in the top or widest part of the funneling apparatus naturally fall down towards or even into the can, displacing the leaves that were just compressed further down into the can or bag (in the bottom of the funneling apparatus). Likewise, using the funneling apparatus may also be more efficient than raking leaves onto a tarp then pouring the leaves off the tarp into a bags or garbage can, as that requires one or more extra steps of lifting the tarp to pour the leaves off the tarp and does not extend the fillable volume of the can or bag.

Other aspects of the present disclosure relate to methods. In an exemplary embodiment, a method generally includes rolling a sheet of material from a substantially flat configuration into a funnel-like configuration. The method also includes removably attaching first and second edge portions of the sheet. Particles can be funneled using the sheet in the funnel-like configuration with the first and second edge portions attached to one another. To conveniently store the funneling apparatus, the first and second edge portions can be detached from one another, and the sheet can be unrolled into the substantially flat configuration. In an exemplary embodiment, a funneling apparatus may be configured to be twisted into smaller loops (e.g., 2 loops, 3 loops, more than 3 loops, etc.) and folded flat into a storage configuration when not in use, and may pop open from storage configuration into a ready-for-use configuration when twisted in an opposite direction.

In another exemplary embodiment, a method generally includes rolling a sheet of material into a funnel-like configuration. The method also includes selectively adjusting the funnel size by selectively overlapping a specific amount of the first edge portion over the second edge portion and then removably attaching the first edge portion to the second edge portion.

Exemplary embodiments discussed below can be constructed to be used with or fit a wide range of tarps, garbage cans, bags, other containers or vessels, etc. having various configurations (e.g., different shapes, sizes, etc.). Disclosed herein are various exemplary embodiments of edge devices and funneling devices that may be used with each other or independently. The various aspects of the present disclosure may be used individually or in combination with any one or more of the other aspects of the present disclosure. Individual elements or features of a particular embodiment are generally not limited to that particular embodiment, but, where applicable, are interchangeable and can be used in a selected embodiment, even if not specifically shown or described. The same may also be varied in many ways. For example, some (but not necessarily all) embodiments of a funneling apparatus disclosed herein may be used with some means (e.g., an edge device disclosed herein, etc.) for securing an edge portion of a tarp, funnel or scoop to the ground temporarily and quickly (which is easily and readily removed and re-secured).

Figure 1:
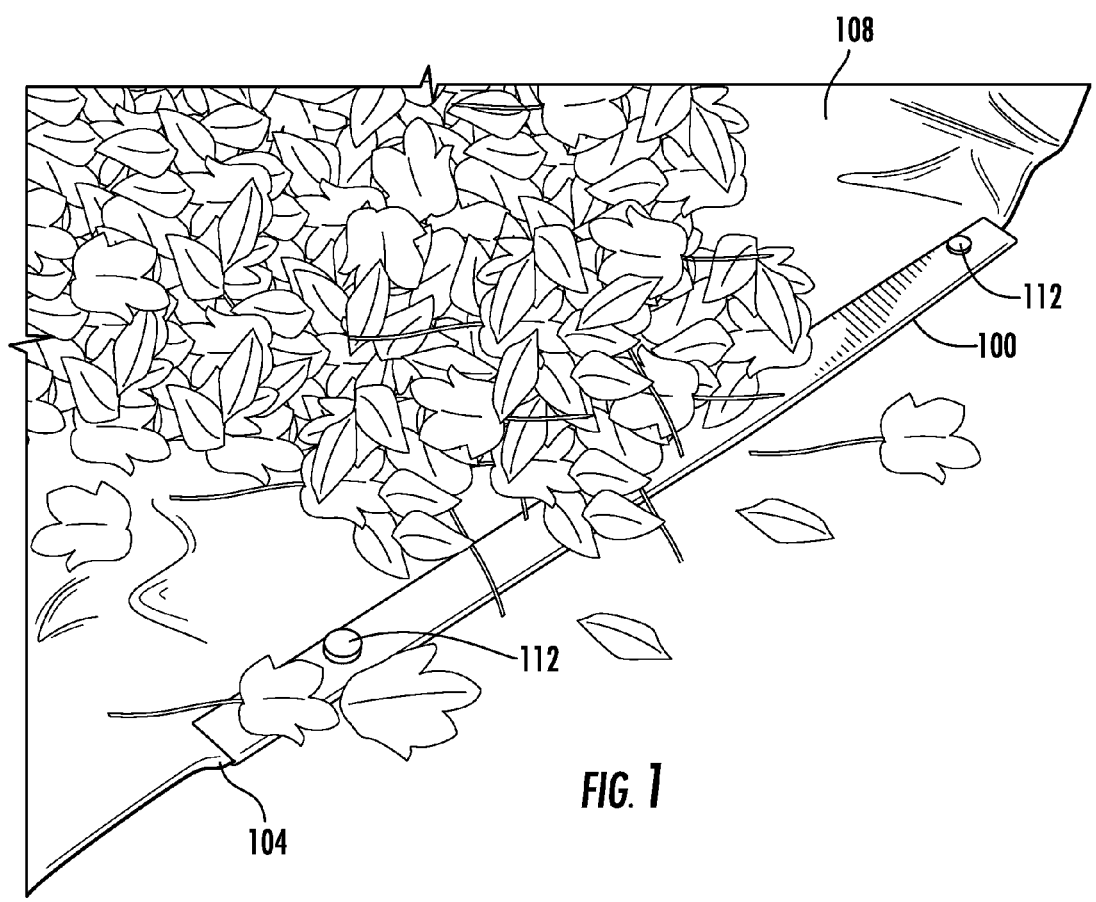
FIG. 1 illustrates an exemplary edge device along an edge portion of the tarp such that the tarp's edge portion is secured to the ground by spikes or anchors passing through openings in the edge device and into the ground according to an exemplary embodiment.
Figure 2:
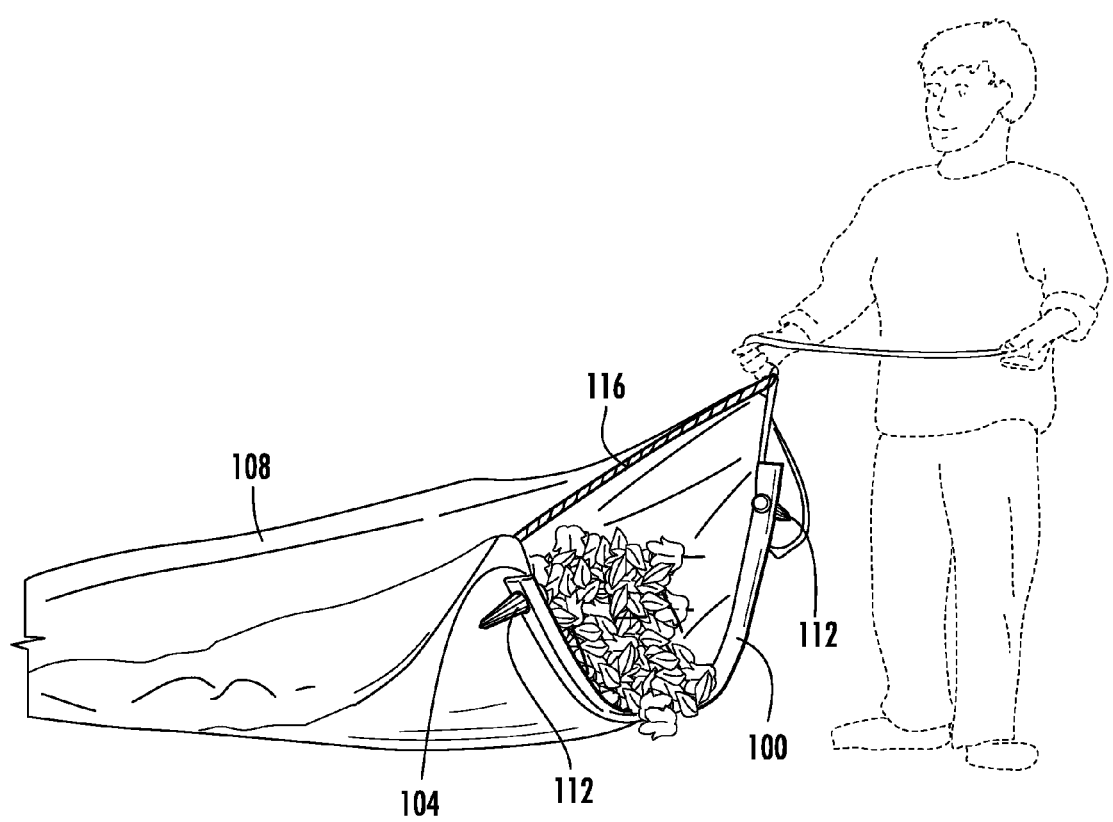
FIG. 2 illustrates the tarp with the edge device shown in FIG. 1 being lifted by ropes connected to the tarp such that the edge device, which is semi-rigid, is flexed so as to define a generally U-shape together with the tarp's edge portion according to an exemplary embodiment.
Figure 3:
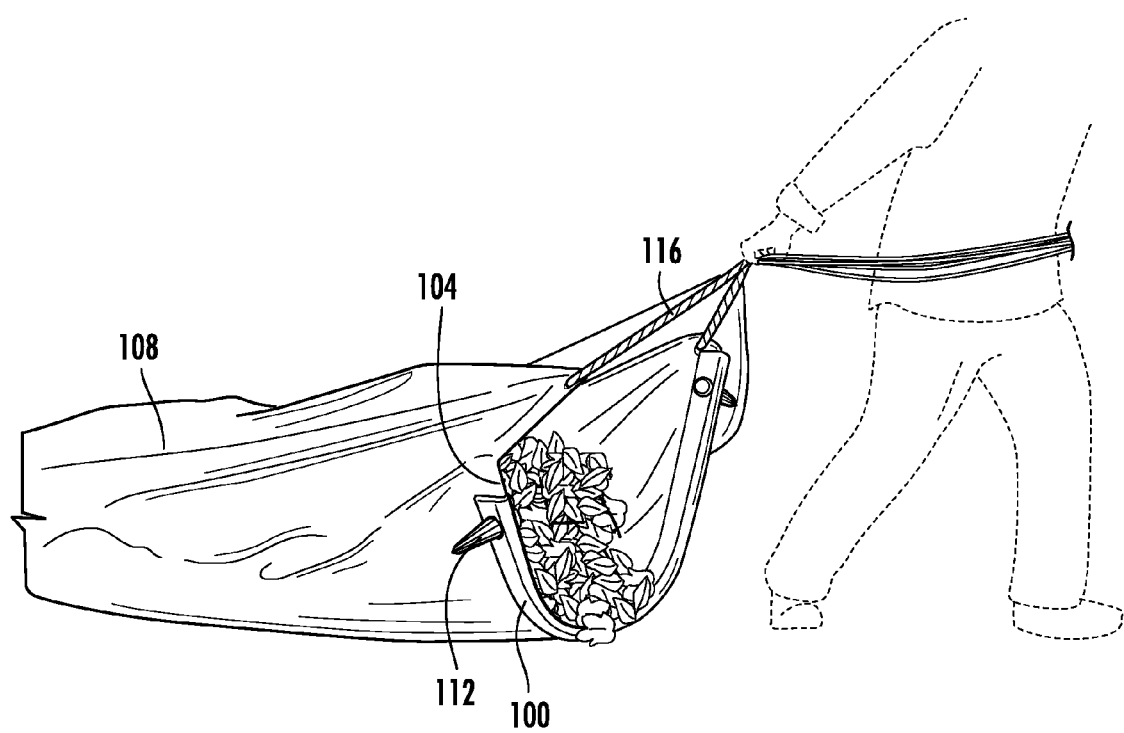
FIG. 3 illustrates the tarp with the edge device shown in FIG. 2 being dragged by the ropes connected to the tarp according to an exemplary embodiment.

With reference now to the figures, FIGS. 1 through 3 illustrate an exemplary embodiment of an edge device 100 attached to an edge portion 104 of a tarp 108. As shown in FIG. 1, spikes, stakes, anchors, etc. 112 are being used to secure the edge device 100 and tarp's edge portion 104 to the ground as the leaves are being piled onto the tarp 108. In this example, the spikes 112 pass through openings in the edge device 100 and tarp's edge portion 104 and extend into the ground.

FIG. 2 illustrates the tarp 108 with the edge device 100 being lifted by ropes 116 connected to the tarp 108 with the edge device 100 being flexed or bent so as to define a generally U-shape together with the tarp's edge portion 104. In this example, the user may also pull on the ropes 116 to remove the spikes 112 from the ground and/or pull on the ropes 116 to drag the tarp 108 as shown in FIG. 3. The edge device 100 may be formed from a wide range of materials, which are preferably semi-rigid or resiliently conformable so as to allow the edge device 100 to be bent or flexed into the generally U-shape (FIGS. 2 and 3) but return to a generally flat configuration (FIG. 1) after the user lets go of the ropes 116. The edge device 100 may also include a V-shaped profile and/or convexly curved upper portion as disclosed herein.

Figure 4:
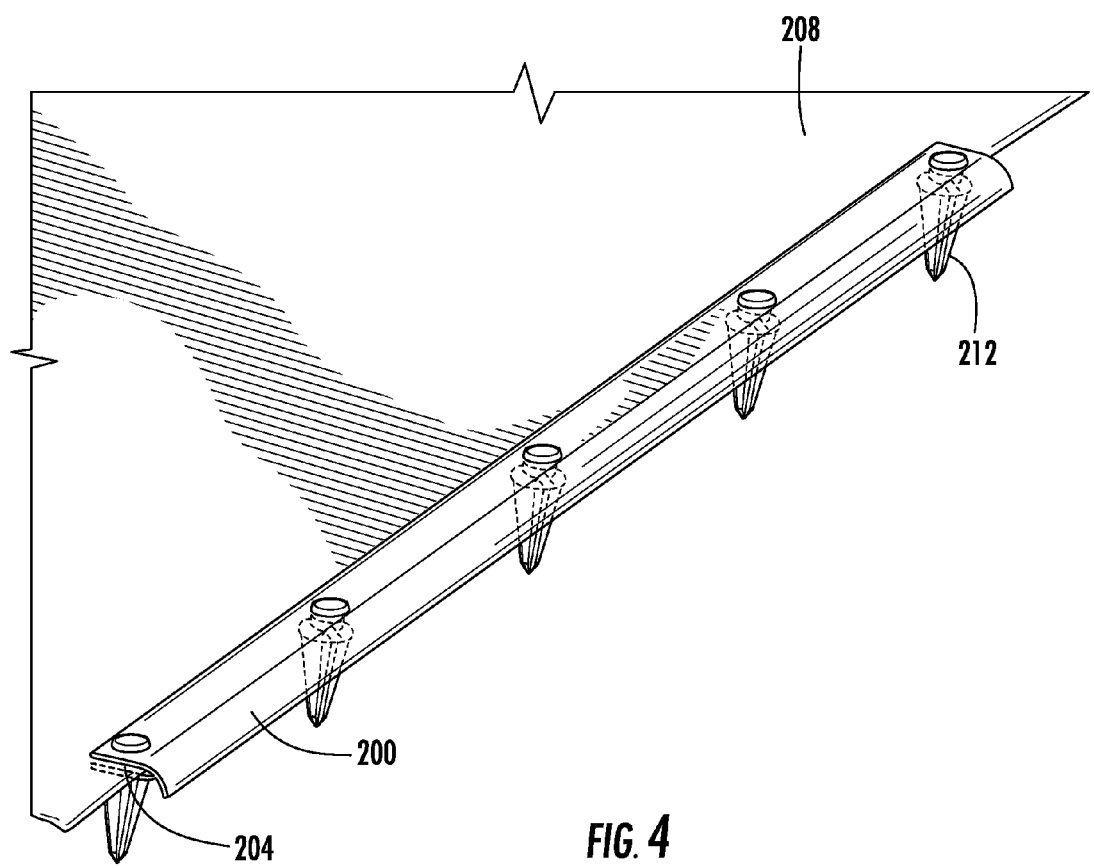
FIG. 4 is a perspective view of an edge device assembled and installed on an edge portion of a tarp with spikes or anchors in place according to an exemplary embodiment.

FIG. 4 illustrates an exemplary embodiment of an edge device 200 assembled and installed on an edge portion 204 of a tarp 208 (e.g., flat canvas or other material, etc.) with spikes or anchors 212. In this illustrated example, five spikes 212 are shown. Alternative embodiments may include more or less than five spikes and/or differently configured spikes.

With continued reference to FIG. 4, the edge device 200 may be formed from a rigid or semi-rigid material(s). The edge device 200 may include a generally "V" shaped profile for receiving the tarp's edge portion 204 within the "V." That is, the tarp's edge portion 204 may be positioned or fit into the open end of the V-shaped portion, and then the "legs" of the V shape may be secured, clamped, tightened, or closed onto the tarp's edge portion 204 to thereby attach or secure the edge device 200 to the tarp 208. In alternative embodiments, the edge device 200 may include a V-shaped portion configured in a closed position with very little space between the two legs forming the V shape. In which case, the V-shaped portion may be installed by first opening the V-shaped portion to allow for positioning of the tarp's edge portion into the V-shaped portion and then allowing the V-shaped portion to automatically close and clamp onto the edge portion of the tarp or other item.

FIG. 5 illustrates an exemplary embodiment of an edge device 500 having possible alternate hole patterns 514 and shapes for spikes or anchors to pass through to engage or secure the edge device 500 to the ground and to an edge portion of a tarp 508. The tarp's edge portion has been removed from FIG. 5 in order to illustrate the lower portion of the edge device 500. As shown in FIG. 5, the edge device 500 includes three different holes 514—specifically, a rectangular hole, circular hole, and a cross-shaped hole. Alternative embodiments may include more or less than three holes and/or differently configured holes (e.g., different sizes, shapes, locations, etc.). Also, an edge device may include all identically shaped holes or one or more holes that are differently shaped than one or more other hole(s) in the edge device.

The edge device 500 also has a curved upper portion 524. When the edge device 500 is installed on the tarp 508 and anchored to the ground, the curved upper portion 524 would be convex such that it is less likely a leaf rake or other object would catch the edge device 500 and lift the edge device 500 and tarp 508 during use. The convex curvature may also permit the edge device 500 to seal against the ground more effectively, as it would touch the ground with a more vertical angle versus horizontal, which may thus compress, for example, less grass under the edge device 500 and permit the edge device 500 to sink deeper and generally, attach more securely. Thus, the installed edge device 500 in this example creates an outwardly looking convex surface when seen from above in its in-use position, and it is intended that, when anchored by spikes, the edge device 500 and tarp edge portion to which it is secured will be more prone to remain secured to and sealed against the ground or lawn surface, reducing the amount of leaves and debris from getting under the tarp while raking debris and/or leaves onto the tarp. Alternatively, other exemplary embodiments include an edge device with a different cross-section or profile. For example, another exemplary embodiment includes an edge device that is one-sided instead of V-shaped. A further exemplary edge device is configured to have a profile resembling a "check mark," etc. Still other exemplary edge devices may have a straight upper portion instead of curved.

FIGS. 6A and 6B illustrate an edge device 600. As shown in FIG. 6A, the edge device 600 includes one or more holes 614 for receiving one or more spikes 612 (FIG. 6B) and legs 628 and 632. In FIG. 6A, the edge device 600 is shown in the open position such that the legs 628 and 632 define a generally V-shape.

FIG. 6B illustrates the edge device 600 attached to an edge portion 604 of a tarp 608 according to an exemplary embodiment. As shown in FIG. 6B, the edge device 600 is being held in a closed position by a spike or anchor 612. The legs 628 and 632 of the edge device 600 are being compressively held together in the closed position between the spike's head 636 and locking fins or wings 640. In this example, the locking fins 640 may be resiliently compressible for fitting through aligned holes in the edge device 600 and tarp 608, but the fins 640 may then redeploy or expand outwardly after passing through the holes and beyond the lower leg 628 of the edge device 600.

FIG. 7 illustrates an exemplary embodiment of an edge device 700 that includes legs 728 and 732 and a living hinge or live hinge section 744. In this example, the living hinge 744 comprises a thin section of leg 732 that may be configured to enable the legs 728 and 732 to better open for accepting an edge portion of a tarp and then closed down or pinch the tarp's edge portion to secure to it. In other embodiments, the edge device may include the upper leg without a hinged portion or lower leg, such that the edge device's upper leg may be secured to the top of a tarp or object regardless of tarp thickness.

The living hinge 744 may allow the edge device 700 to be fit securely to various thicknesses of tarps, etc. and/or more readily tighten on the tarp to clamp the tarp. This may also help prevent the spikes from tearing through the tarp when the tarp is being pulled by the edge device 700 or by ropes attached to the edge device 700, as compared to ropes connected directly to grommets or holes in the tarp.

As shown in FIG. 7, the living hinge 744 is on the point or apex of the V-shape defined by the legs 728, 732. Instead, the living hinge 744 is on the underside adjacent the apex. Locating the living hinge 744 on the underside helps protect the thinner walled section forming the living hinge 744 from a rake or other damage and also provide a stiff edge for sealing the tarp to the ground (reducing the wear or breakage that otherwise could occur if the live hinge was on top or directly at the point or tip of the "V"). This living hinge 744 of thinner, bendable material (e.g., plastic, rubber, etc.) connecting the upper and lower legs 728, 732 allows the edge to be made with less material (plastic, rubber, etc.), whereas not having this flexible section at the apex provides a solid and stiffer apex for a given amount of material.

Alternative embodiments may include a two-piece edge device where upper and lower pieces are not hinged together, but are attachable to each other such as by spikes (e.g., spikes 612, etc.), tabs, flanges, washer, nut, or other mechanical fasteners, clamping or securing devices, to secure the tarp to an edge device that only includes an upper piece. For example, the edge device may include an upper piece similar to the upper leg 732 of the edge device 700 and without the lower leg 732 and living hinge 744.

FIGS. 8 through 10 illustrate an exemplary embodiment of an edge device 800 and an exemplary spike or anchor 812. As shown in FIG. 10, the spike 812 may be removably attachable to the edge device 800 by a threaded carriage-type bolt 836 and nut 852. The bolt 836 may be inserted into holes 814 extending through the upper and lower legs 828, 832 that are hingedly connected by living hinge 844. The nut 852 may be inserted into an opening 848 in the neck of the spike 812. The legs 828, 832 may then be compressively forced towards each other for clamping onto an edge portion of a tarp, etc. by threading the bolt 836 into the nut 852. In some embodiments, the tarp may also include holes or grommets into which the bolt 836 is also inserted. In yet other embodiments, the edge device 800 and spike 812 may be constructed such that the spike 812 is an integral component part of the edge device 800. That is, the edge device 800 and spike 812 may be manufactured or formed (e.g., injection molding, etc.) so as to have a monolithic or single component construction.

In FIGS. 8 through 10, the edge device 800 is shown in a closed position for purposes of illustration as the edge device 800 would be in an open position without the bolt 836 and nut 852. In addition, the living hinge 844 is shown at the apex or point at which the upper and lower legs 828 and 832 are connected to each other. In other embodiments, the living hinge 844 may be spaced apart from the apex such as in the exemplary embodiment shown in FIG. 7. In still other embodiments, the edge device 800 may not include any living hinge such as an embodiment in which the edge device 800 is made of a flexible material (e.g., extruded rubber, EDPM rubber, etc.), which can readily flex and bend without the need for a thinner connecting section to accommodate such bending. Further EPDM or other similar property rubbers can be rolled to be packaged more compactly without dramatically altering the shape after unpacking and unrolling. In addition, EPDM and other rubbers can readily be cut and made into shorter sections as needed or desired for specific uses. Alternative materials may also be used besides rubber. Indeed, any of the various exemplary embodiments disclosed herein may be made by a wide range of manufacturing processes (e.g., extrusion, molding, etc.) and from a wide range of materials, including polypropylene, polyethylene, EPDM rubber, extrudable materials (e.g., extrudable plastics or rubbers, etc.), metals (e.g., aluminum, steel, etc.) fiberglass, other relatively strong but flexible materials, materials that are resistant to permanent deforming or permanent bending, etc.

Also, the edge device 800 is shown with straight legs 828, 832 to more easily accommodate the spikes 812 and attachment of the spikes 812 perpendicular to the legs 828, 832. Alternatively, other embodiments may include curved legs.

FIG. 11 illustrates an exemplary spike or anchor 912 that may be attached to an edge device (e.g., 100 (FIG. 1), 200 (FIG. 4), 500 (FIG. 5), 600 (FIG. 6) 700 (FIG. 7), 800 (FIG. 8), 1500 (FIG. 15D), 3900 (FIG. 38), etc.) with a carriage-type bolt 936 and matching nut 952. As shown, the spike 912 includes an opening 948 in the neck of the spike 912 for receiving the nut 952. The spike 912 also includes aligned openings 956 (which may be internally threaded in some embodiments) for receiving the threaded portion or stem of the bolt 936.

FIGS. 12 and 13 illustrate an exemplary spike or anchor 1012 that may be attached to an edge device (e.g., 100 (FIG. 1), 200 (FIG. 4), 500 (FIG. 5), 600 (FIG. 6) 700 (FIG. 7), 800 (FIG. 8), 1500 (FIG. 15D), 3900 (FIG. 38), etc.). As shown, the spike 1012 includes a head 1036 and four circumferentially spaced apart locking fins, wings, flanges, or tabs 1040 extending outwardly from the spike's stem or shaft 1042. In this example, the locking fins 1040 may be resiliently compressible for fitting through aligned holes in an edge device and tarp. But the fins 1040 may then redeploy or expand outwardly after passing through the holes and beyond the bottom part of the edge device. In operation, the fins 1040 may help increase the ability of the spike 1012 to remain stuck into the ground. The fins 1040 thus help to better anchor the spike 1012 to the ground and resist the spike 1012 from being pulled out inadvertently, such as when tugging or shaking of the tarp, when struck by the rake when moving leaves onto to the tarp. The fins 1040 may also allow for shorter spikes to be used.

The spike 1012 may be used, for example, with an edge device having a hole configured with a shape corresponding to the cross-sectional shape of the spike's lower portion shown in FIG. 13. For example, the spike 1012 may be used with an edge device having a cross-shaped hole as shown in FIG. 5.

By way of example, the spike 1012 may be pushed through holes in an edge device and an edge portion of a tarp, such that the wings 1040 compress as the spike 1012 is pushed through the holes. The wings 1040 redeploy to prevent the inadvertent removal of the spike 1012, until the wings 1040 are manually compressed to release the spike 1012 and enable it to be pulled back through the holes in the edge device and tarp's edge portion. This can help keep the edge device tightly secured on the tarp itself. Because the wings 1040 redeploy after being inserted, the wings 1040 keep the tarp secured between the cavity or gap in the V-shaped portion of the edge device. Thus, the tarp may be pulled by ropes to lift the tarp and simultaneously withdraw the spikes from the ground, as well as even pull the tarp by ropes secured to the edge device (as the tarp is clamped by the edge device with the spikes installed, reducing the problem of the holes created when installing the spikes from being torn out and the tarp edge portion and tarp being separated). Alternative methods are also disclosed herein to perform one or all of these various functions.

FIG. 14 illustrates an exemplary spike or anchor 1112. As shown, the spike 1112 includes a hole 1138 through a generally rounded head 1136 of the spike 1112. In operation, a rope, cord, etc. may be threaded through the hole 1138. See, for example, FIG. 37 illustrating a rope 3816 threaded through holes 3838 in the heads 3836 of the spikes 3812. In an exemplary embodiment, the hole 1138 may have a diameter of about one half inch. This dimension (as are all dimensions) is for purposes of illustration only and not for limitation, as embodiments disclosed herein may be configured differently, including different sizes, shapes, materials, etc.

FIG. 15A is an exemplary embodiment of a two-piece spike or anchor 1212. As shown, the spike 1212 includes an upper piece 1236 with an externally threaded portion 1237 that may be screwed into an internally threaded opening 1241 of a lower piece 1242 to attach the upper and lower pieces 1236, 1242 of the spike 1212 to each other on opposite upper and lower sides of an edge device (e.g., 100 (FIG. 1), 200 (FIG. 4), 500 (FIG. 5), 600 (FIG. 6) 700 (FIG. 7), 800 (FIG. 8), 1500 (FIG. 15D), 3900 (FIG. 38), etc.). The spike 1212 may be used for securing the edge device to a tarp and to the ground.

FIG. 15B is an exemplary embodiment of a two-piece spike or anchor 1312. As shown, the spike 1312 includes a lower piece 1342 with an externally threaded portion 1341 that may be screwed into an internally threaded opening 1337 of an upper piece 1342 to attach the upper and lower pieces 1336, 1342 of the spike 1312 to each other on opposite upper and lower sides of an edge device (e.g., 100 (FIG. 1), 200 (FIG. 4), 500 (FIG. 5), 600 (FIG. 6) 700 (FIG. 7), 800 (FIG. 8), 1500 (FIG. 15D), 3900 (FIG. 38), etc.). The spike 1312 may thus be used for securing the edge device to a tarp and to the ground.

FIG. 15C illustrates an underside of a head or cap 1436 of an exemplary embodiment of a two-piece spike or anchor. As shown, a threaded nut 1452 may be inserted into a opening (e.g., a slot, rectangular opening, etc) in the underside of the spike's head 1436 to which may be threaded or screwed an externally threaded stem portion of a lower piece of the two-piece spike (e.g., threaded portion 1341 shown in FIG. 15B, etc.).

FIG. 15D illustrates an exemplary embodiment of an edge device 1500 and spike 1512. As shown, the spike 1512 may be attached to the edge device 1500 by the carriage-type bolt 1536 and matching nut 1552. When the bolt 1536 is tightened, the spike body, bolt 1536, and nut 1552 are locked together, which also may tighten and clamp the edge device 1500 around a tarp or other material edge. Alternative embodiments may include a differently configured spike, bolt, or nut and/or different method of attaching a spike to the edge device.

The particular configuration (e.g., shape, size, number of spikes, etc.) for a particular embodiment may vary, depending, for example, on the end use. For example, disclosed herein are other means to create an edge to seal against the ground, such exemplary embodiments in which the spikes are not secured to a single edge device but the spikes are independently secured but structurally connected through a rigid stay or edge built into or added to the tarp along its outer edge. In addition, an edge device disclosed herein (e.g., 100 (FIG. 1), 200 (FIG. 4), 500 (FIG. 5), 600 (FIG. 6) 700 (FIG. 7), 800 (FIG. 8), 1500 (FIG. 15D), 3900 (FIG. 38), etc.) may be sized to have a length between about 36 inches to 84 inches and a width of between about 2 inches to 4 inches. Material thicknesses can vary depending, for example, on the types of materials used. In an exemplary embodiment, the thickness may range from about 1/8 inch to about 5/16 inch, but could be thinner or thicker if desired and depending on types of materials used. In addition, the material thickness of an edge device at the apex or point of the V-shaped portion may be slightly thicker and possibly more if the edge device were only one-sided and/or shaped like a check mark. As another example, the length of an edge device may be between about 48 inches to 60 inches, but may be less depending on commercial packaging and distribution constraints. In a further example, an edge device may have a length of between about 36 inches to 60 inches with holes punched or otherwise fabricated in the edge device to secure the edge device tightly to a tarp, where the holes for the spikes are spaced apart by a distance between about 12 inches to 24 inches. Also, multiple shorter length edge devices may be used (e.g., installed end-to-end in an abutting or spaced apart relationship, etc.) in some embodiments instead of using a single relatively long edge device. The dimensions set forth in this paragraph (as are all dimensions herein) are provided for purposes of illustration only and not for limitation, as embodiments disclosed herein may be configured differently, including different sizes, shapes, materials, etc.

As noted above, some embodiments include a live hinge construction incorporated into the edge device to enable the edge device to open to accept a tarp or other material for installation then tighten on that tarp edge or material to secure the apparatus (using one or more spikes as disclosed herein or other device to tighten or clamp the tarp between the upper and lower sides or legs of the edge device. In some embodiments, the living hinge (being the thinnest and weakest section of the edge device) is located on the bottom of the edge device in its installed and in-use position. This helps protect the living hinge from damage or wear from use, for example, from a rake repeatedly hitting the edge as leaves or debris are raked over it and onto the attached tarp or other device.

In other embodiments, a plurality of edge devices may be made in curved sections, rather than straight (along its length) such that the edge devices together could be secured in one or more sections to form a longer edge and possibly a non-straight edge to match or secure to a variety of tarp shapes.

Various exemplary embodiments of a funneling apparatus include a sheet of material having a first edge portion and a second edge portion. At least one attachment device is provided for removably attaching the first edge portion to the second edge portion. The funneling apparatus includes a first configuration in which the sheet is rolled into a funnel-like configuration with the attachment device attaching the first edge portion to the second edge portion. The funneling apparatus can also be configured into a second configuration in which the sheet is substantially flat with the first and second edge portion detached from one another (and possibly further folded, depending on materials and construction methods used).

Accordingly, various embodiments of this invention provide funneling apparatus that can be configured into a funnel-like configuration (e.g., for funneling yard debris, particulates or other materials, etc.) and a substantially flat configuration (e.g., for conveniently storing the funneling apparatus, etc.). The funneling apparatus can also include features that allow the funnel size (e.g., diameter of either or both open ends of the funnel, etc.) to be selectively adjusted and tailored for a particular application (e.g., size of particles being funneled, size of the mouth of the garbage can, garbage/leaf bag, or container into which the particles are being funneled, etc.).

In another aspect of the present disclosure, a method generally includes rolling a sheet of material from a substantially flat configuration into a funnel-like configuration. The method also includes removably attaching first and second edge portions of the sheet. Debris or particles can be funneled using the sheet in the funnel-like configuration with the first and second edge portions attached to one another. To conveniently store the funneling apparatus, the first and second edge portions can be detached from one another, and the sheet can be unrolled into the substantially flat configuration or folded, depending on the material and construction/design aspects that might permit folding or flat storing. The method can also include selectively adjusting the funnel size (e.g., diameter of either or both open ends of the funnel, etc.) by selectively overlapping a specific amount of the first edge portion over the second edge portion.

FIGS. 16 through 19 illustrate exemplary embodiments, which help show that with certain constructions from plastic or tarp-like material combined with stays or stiffeners—a funneling apparatus may be similarly rolled to form a funnel of various configurations and apertures. But then when detached from its rolled configuration for storage or non-use, the funneling apparatus may be further folded to reduce its not-in-use size. The stays or stiffeners may be flexible enough to be rolled for the intended forming of a funnel shape yet be spaced and employed in such a manner to be readily foldable as described, or readily foldable after removing one or more of the stays or stiffeners.

In a further aspect of the disclosure, a method generally includes rolling a sheet of material into a funnel-like configuration. The method also includes selectively adjusting the funnel size (e.g., diameter of either or both open ends of the funnel, etc.) by selectively overlapping a specific amount of the first edge portion over the second edge portion and then removably attaching the first edge portion to the second edge portion.

FIGS. 16 and 17 illustrate an exemplary funneling apparatus 1600 according to one exemplary embodiment of the disclosure. As shown, the funneling apparatus 1600 includes a relatively flat sheet or piece of material 1602 (FIG. 16) that can be configured (e.g., rolled, curved, bent, etc.) into a funnel-like configuration (FIG. 17). The sheet 1602 includes first and second edge portions 1604 and 1606 that are removably attachable to one another. The attachment of the edge portions 1604 and 1606 can help retain the sheet 1602 in the funnel-like configuration.

A wide range of materials can be used for the sheet 1602. In various embodiments, the sheet 1602 comprises a relatively flat piece of plastic or vinyl material, although other suitable materials can also be used, including canvas, sheet plastics etc, in combination with plastic, fiberglass, or other flexible, yet rigid, stays or supports. In various embodiments, the sheet 1602 is cut or otherwise formed into a generally bulbous shape, such as a generally teardrop shape without the pointed tip. In an example embodiment, the funneling apparatus in its flat configuration may be shaped like an oval (e.g., see shapes shown in FIGS. 20, 21, and 23, etc.) with one end narrower so as to better form the narrow end of the funnel, to fit into containers for filling and loading. This exemplary embodiment 1600 may also include a somewhat more pointed (but still rounded) tip on the leading and wide end of the funnel (as opposed to more straight), for example, to accommodate an outer stay design, where the more pointed (or extended) leading tip or edge facilitates permitting or allowing a wider section of the leading edge, for example, to more easily be held flat when laid on the ground horizontally.

The sheet 1602 can be provided in one or more various colors. The sheet 1602 can also be opaque, translucent, transparent, reflective, combinations thereof, etc. In one exemplary embodiment, the sheet 1602 is at least substantially transparent in order to allow the user to view the material as it is being funneled through the funneling apparatus 1600.

In various embodiments, the edge portions 1604 and 1606 of the sheet 1602 can be relatively quickly attached and detached from one another. Attaching the edge portions 1604 and 1606 to one another helps retain the sheet 1602 in the funnel-like configuration (FIG. 17). In the illustrated embodiment, each edge portion 1604 and 1606 includes a respective mating portion 1608 and 1610 (e.g., strips or patches, etc.) of a hook and loop closure system (e.g., Velcro hook and loop fasteners, etc.). Alternatively, a wide range of other suitable devices and methods can be employed for removably attaching the first edge portion 1604 with the second edge portion 1606, such as magnets, clasps, buttons, latches, adhesives, snaps, etc. In addition, the strips 1608 and 1610 can be attached to the sheet 1602 using adhesives, tape, glue, among other suitable methods.

The funneling apparatus 1600 can also include means for selectively adjusting the funnel size, such as the inner diameter of either or both open ends 1612, 1614 of the funneling apparatus 1600. For example, the inner diameter of the funneling apparatus 1600 may be increased to allow for more rapid funneling of larger more coarse particles and/or for pouring into a wider mouthed container. Or, for example, the outer diameter of the end 1602 of funneling apparatus 1600 may be decreased in order to allow the end 1602 to be inserted into a relatively small mouth of a container.

The size of the funneling apparatus 1600 is determined in part by the extent to which the first edge portion 1604 overlaps the second edge portion 1606. Increasing this overlap decreases the size of the funneling apparatus 1600, and vice versa. In one embodiment, the first edge portion can include a single generally continuous Velcro® strip extending inwardly from the first edge portion. In another embodiment, the first edge portion can include any suitable number of (one or more) discrete strips or portions of a hook and loop closure system spaced at different distances inwardly away from the first edge portion to allow varying lengths of the first edge portion to be overlapped over and then be attached to the second edge portion. Accordingly, the size of the funneling apparatus can be adjusted by choosing and then engaging one of the first edge portion's Velcro strips (or similar temporary or removable fasteners) with the mating Velcro portion on the second edge portion. Alternatively, or additionally, other suitable means can be employed to enable selective adjustment to the funnel size, such as elastic straps, adjustable straps, hook and loop closures, clasps, etc.

In the illustrated embodiment of FIGS. 16 and 17, the Velcro strips 1608 and 1610 allow the user to selectively overlap varying amounts of the first edge portion 1604 over the second edge portion 1606, and then removably attach the edge portions 1604 and 1606 to one another. The Velcro strips 1608, 1610 are thus configured (e.g., sized, positioned, etc.) in such a way so as to enable the funneling apparatus 1600 to be selectively adjusted into a variety of cone apertures or funnel sizes. The funnel size (e.g., inner or outer diameter, etc.) of the funneling apparatus 1600 can be selectively adjusted across a range of funnel apertures at either or both open ends 1612 and 1614 of the funneling apparatus 1600. Accordingly, the funneling apparatus 1600 allows a user to funnel dry powders, relatively small objects or particles, and other materials into a wide range of small to medium-sized aperture containers where it would be otherwise difficult to pour the material directly into the container without spilling at least some of the material as it is being poured. These particular aspects of the disclosure relating to selectively adjusting the funnel size (as can all other aspects of the disclosure) can be used individually or in combination with any one or more of the other aspects of the present disclosure.

As disclosed herein, FIGS. 20, 22-24, 28-30, and 32 show alternative means of securing and overlapping edge portions of a funneling apparatus formed of a tarp material, etc., for example, to enable the funneling apparatus to be more easily carried or lifted by hand such as when the rolled up tarp is being used to carry debris. As shown in FIGS. 24-27 and 31, means may be provided for holding or securing the funneling apparatus in position while in use in conjunction with a garbage can, bag, bin, or other container, etc. For example, FIGS. 24 through 27 illustrate exemplary methods of securing a tarp/funneling apparatus in a funneling configuration to a garbage can or bag, using outward pressure or spring tension applied against an interior portion of a container from one or more stays (e.g., fiberglass, steel or other metal, etc.), such as an outer stay in, along, or looped about an outer edge and/or perimeter of the tarp/funneling apparatus. When configured as a funnel and inserted into a garbage can (or bag slid over the funnel end), the outer stay can conform to the can shape (including square cans) or stretch out the bag, thus with friction and tension sufficiently secure the funnel-configured tarp to the inside of the can or bag. The outer stay may be operable for helping the sheet remain substantially flat for a first configuration of the funneling apparatus and/or for helping retain the funnel-like configuration for the second configuration of the funneling apparatus by applying outward pressure against an interior portion of a container (e.g., bag, can, etc.). The outer stay may be configured to tautly conform and apply spring tension outwardly against an internal portion of a container. The outer stay may be operable for helping hold at least a portion of the funneling apparatus against an interior portion of a container regardless of container shape (e.g., cylindrical, rectangular or box-shaped, etc.) and/or remain open in the funnel-like configuration.

A funneling apparatus may include a bag stay for better securing a bag to the funnel end. For example, a bag stay may extend at least partially across a portion of the funneling apparatus that will be adjacent the mouth of the bag when the funneling apparatus is inserted into the bag. The bag stay may be operable for applying outward pressure against a portion of the bag for helping keep the bag open. The bag stay (which, with the outer stay create a generally D shape when the tarp is in its flat configuration) may create a lip, over which to stretch and slip the end of a bag, in order to provide a more positive engagement (much like when a plastic garbage bag is inserted and stretched over the edge of a garbage can as a liner). In the funnel configuration when the bag is inserted over the funneling apparatus and in place (as shown in FIGS. 24 and 25), the bag opening is held in a generally D shape with the curved portion of the D formed by the bag stay. In some embodiments, a bag stay may comprise a section of string that is slid around a bag after an end portion of the funneling apparatus has been inserted into the bag.

With reference back to FIGS. 16 and 17, the funneling apparatus 1600 may be provided with a clip 1616 to allow the funneling apparatus 1600 to be clipped onto an edge of a container (e.g., box, bottle, can, etc.) into which particles or other material will be funneled. This clipping feature can help hold the funneling apparatus 1600 in place on the container if, for example, two hands are needed to hold and pour materials from a heavy container (e.g., dog food bag, etc.) into the funneling apparatus 1600. This can also be helpful in the kitchen while cooking, such as when funneling a powder or cut/chopped materials into a mixing bowl. Alternatively, other suitable devices can be employed to allow the funneling apparatus to be attached to the container (e.g., box, garbage bag, can, bottle etc.) into which debris, particles or other material can be funneled. In another embodiment, the funneling apparatus includes a strap configured (e.g., having sufficient length and/or flexibility, etc.) to be wrapped and secured around a portion of the container to thereby retain the position of the funneling apparatus relative to the container as material is being funneled into the container.

In the illustrated embodiment, the sheet 1602 includes a through-hole 1618 for hanging the funneling apparatus 1600 from a hook or tab. In other embodiments, the sheet 1602 can include other openings in different shapes (e.g., notches, cut-outs, etc.) for hanging the funneling apparatus 1600 from a hook or tab. Or, for example, a separate component attached to the sheet can define an opening that allows the funneling apparatus to be suspended from a hook or tab. In yet other embodiments, the funneling apparatus does not include an opening for hanging from a hook.

These particular aspects of the disclosure relating to the through-hole 1618 (as can all other aspects of the disclosure) can be used individually or in combination with any one or more of the other aspects of the present disclosure.

In addition to being used for funneling, the funneling apparatus 1600 can be used for other functions and/or purposes. For example, the funneling apparatus 1600 can also be used to clean or scoop spilled materials while the funneling apparatus 1600 is in the substantially flat configuration (FIG. 16). With the materials resting on the sheet 1602, the funneling apparatus 1600 can then be configured (e.g., rolled, curved, bent, etc.) into the funnel-like configuration (FIG. 17), thus allowing the materials t then be funneled back into a container for storage or disposal.

FIGS. 18 and 19 illustrate another embodiment of an exemplary funneling apparatus 1700. As shown, the funneling apparatus 1700 includes a relatively flat sheet or piece of material 1702 (FIG. 18) that can be configured (e.g., rolled, curved, bent, etc.) into a funnel-like configuration (FIG. 19). The sheet 1702 includes first and second edge portions 1704 and 1706 that are removably attachable to one another with Velcro strips 1708 and 1710, respectively. These Velcro strips 1708 and 1710 can allow the funnel size to be selectively adjusted and tailored to the particular application. For example, the inner diameter of either or both open ends 1712, 1714 (FIG. 15) of the funneling apparatus 1700 can be increased or decreased, as desired by selectively overlapping varying amounts of the first edge portion 1704 over the second edge portion 1706, and then removably attach the edge portions 1704 and 1706 to one another with the Velcro strips 1708, 1710.

In this particular embodiment of FIGS. 18 and 19, the funneling apparatus 1700 does not include a clip for attaching to an edge of a container. But the funneling apparatus 1700 does include a through-hole 1718 for hanging the funneling apparatus 1700 from a hook or tab.

The various funneling apparatus of the present disclosure (e.g., 1600, 1700, etc.) can be provided in various configurations and sizes depending, for example, on the particular application (e.g., size of particles being funneled, size of the mouth of the container into which the particles are being funneled, in the house, for the garden or garage, etc.) in which the funneling apparatus will be used. Accordingly, a funneling apparatus of the present disclosure should not be limited to a particular size or the particular configuration shown in the figures.

Additionally, a funneling apparatus disclosed herein (e.g., 1600 (FIGS. 16 and 17), 1700 (FIGS. 18 and 19), etc.) may be used to rake or move debris or leaves into garbage cans or bags. As another example, a funneling apparatus may also be used for carrying or transporting leaves that are piled or loaded onto the funneling apparatus, which may possibly be used in conjunction with one or more edge devices and/or spikes according to embodiments disclosed herein. Moreover, the funneling apparatus 1600 and 1700 are illustrated as being used without any edge devices, spikes, stays, or battens. As disclosed herein, other exemplary embodiments include funneling apparatus that may be used with one or more edge devices, spikes, stays, and/or battens.

FIGS. 20 through 27 illustrate various exemplary embodiments of funneling apparatus or devices, which may be constructed from relatively flexible, less rigid materials (e.g., canvas type sheet or fabric of woven polyethylene, polypropylene tarp or other similarly durable materials, etc.). The funneling apparatus may include stays or ribs to help hold the funneling apparatus in a funnel-type shape in its rolled configuration. The selectively foldable funneling apparatus may also have several means of holding or support or carrying it when in use and/or when loading leaves, debris, or other materials. Cutouts, stays, and/or inserted rods may be selectively used when various amounts of each of the first and second overlapping edges are overlapped, thus allowing for the funneling apparatus to be securely held or carried in various configurations, for example, to upright the funneling apparatus and garbage can or bag when they are attached and fully loaded. As an example, the funneling apparatus and garbage can or bag may be laying horizontally and loaded by raking leaves, with the cutout handles of the funneling apparatus secured with a removable cord (or similar device) or with the cutout handles overlapped and used to pull/lift upright the joined funnel and garbage can after filling with leaves or debris. The strap or handholds can also be used to further securely hold the funneling apparatus and garbage can or bag while compressing the leaves or debris so that it fits below the top of the can or bag.

With further reference to FIG. 20, there is shown an exemplary embodiment of a funneling apparatus 1800 in a substantially flat configuration. In this example, the funneling apparatus 1800 includes grommets or pads 1862 with holes 1814 for receiving spikes for holding the edge portion of the funneling apparatus 1800 down to the ground, such as when leaves are being raked onto the funneling apparatus 1800. In other embodiments, the funneling apparatus 1800 may include one or more edge devices as disclosed herein (e.g., 100 (FIG. 1), 200 (FIG. 4), 500 (FIG. 5), 600 (FIG. 6) 700 (FIG. 7), 800 (FIG. 8), 1500 (FIG. 15D), 3900 (FIG. 38), etc.).

Also shown in FIG. 20, the funneling apparatus 1800 includes a strap or cord 1864 with a handle 1866. The handle 1866 may be configured to be driven or inserted into the ground to help hold the funneling apparatus 1800 in place. Also, the strap 1864 and handle 1866 may be used (e.g., tied to the handle cutouts 1868, etc.) for holding the funneling apparatus 1800 in the funneling configuration in similar manner to that shown for the funneling apparatus 3000 (see strap 3064 in FIG. 29) and 3200 (see strap 3264 in FIG. 31).

FIG. 20 also illustrates stays that may be used for holding the edge portions 1804 and 1806 of the funneling apparatus 1800 together, to help retain the funneling apparatus 1800 in a funneling configuration in a manner similar to that shown above for the funneling apparatus 1600 in FIG. 17. By way of example, the stays may comprise portions 1808 and 1810 (e.g., strips or patches, etc.) of a hook and loop closure system (e.g., Velcro hook and loop fasteners, etc.). Alternatively, a wide range of other suitable devices and methods can be employed for removably attaching the edge portions 1804 and 1808 to each other, such as magnets, clasps, buttons, latches, adhesives, snaps, etc. In addition, the strips 1808 and 1810 can be attached to the funneling apparatus 1800 using stitches, adhesives, tape, glue, among other suitable methods.

The funneling apparatus 1800 may further include interior and exterior ribs 1870 and 1872 such as rods, tubes, or dowels with circular or round cross-sections, etc. In this illustrated example, the interior ribs 1870 may comprise relatively flexible ribs within pockets or sleeves that extend laterally across the funneling apparatus 1800. The exterior rib 1872 may be more stiff and less flexible than the interior ribs 1870. The exterior rib 1872 may be disposed within a pocket or sleeve and extend along the perimeter edge of the funneling apparatus 1800. In this example, the exterior rib 1872 may comprise a single rib or it may comprise a plurality of ribs.

FIGS. 21A through 21E are partial views of various exemplary embodiments of funneling apparatus 1900, 2000, 2100, 2200, 2300 shown in substantially flat configurations. As shown by FIGS. 21A through 21E, exemplary embodiments may include different shapes for the tarp or other material forming the funneling apparatus, differently configured (e.g., different shapes, sizes, locations, etc.) edge devices, pads and bases, and holes for spikes or anchors, etc.

FIG. 22 illustrates an exemplary embodiment of a funneling apparatus 2400 in a substantially flat configuration. As shown, the funneling apparatus 2400 includes exemplary interior and exterior ribs 2470 and 2472, exemplary handle cutouts 2468, and edge devices 2401. More specifically, there are two edge devices 2401 installed end-to-end along a front edge portion of the funneling apparatus 2400, and an edge device 2401 along each side edge portion of the funneling apparatus 2400. The edge devices 2401 may comprise any one or combination of the various exemplary embodiments of edge devices disclosed herein (e.g., 100 (FIG. 1), 200 (FIG. 4), 500 (FIG. 5), 600 (FIG. 6) 700 (FIG. 7), 800 (FIG. 8), 1500 (FIG. 15D), 3900 (FIG. 38), etc.). In other embodiments, the funneling apparatus 2400 may include more or less than four edge devices. For example, the funneling apparatus 2400 may include a single edge device or no edge device in other embodiments. In some embodiments, the funneling apparatus 2400 may include grommets or pads (instead of or in addition to edge devices) for receiving spikes or anchors.

The interior ribs 2470 may comprise relatively flat rectangular pieces of material that are attached (e.g., stitched, adhesively bonded, etc.) to and extend across the funneling apparatus 2400. Or, for example, the interior ribs 2470 may comprise a differently configured rib (e.g., rod, tube, or dowel with a circular or round cross section, etc.) and/or be disposed within sleeves or pockets of the funneling apparatus 2400. Continuing with this example embodiment, the exterior ribs 2472 may be more stiff and less flexible than the interior ribs 2470. The exterior ribs 1872 may each be disposed along a corresponding side edge portion of the funneling apparatus 2400. In this example, the exterior ribs 2472 comprise two ribs, but other embodiments may include more or less than two exterior ribs.

FIG. 23 illustrates an exemplary embodiment of a funneling apparatus 2500 shown in a substantially flat configuration. In this example, the funneling apparatus 2500 includes stays for holding the funneling apparatus 2500 in the funneling configuration in manner similar to that shown for the funneling apparatus 3000 (FIG. 29) and 3200 (FIG. 31). As shown in FIG. 23, the funneling apparatus 2500 includes a strap or cord 2564 with a handle 2566 which may be tied to handle cutouts 2568 on opposite sides of the funneling apparatus 2568 to hold the funneling apparatus 1800 in a first funneling configuration. The handle cutouts 2568 may also function as primary handholds for carrying the funneling apparatus 2500 when loaded with leaves, debris, etc. in a manner similar to that shown for the funneling apparatus 3300 of FIG. 32. But the exemplary embodiment of the funneling apparatus 2500 shown in FIG. 23 also includes another set of handle cutouts 2574. The strap 2564 and handle 2566 may be tied or otherwise secured to this second set of handle cutouts 2574 to hold the funneling apparatus 2500 in a second funneling configuration.

With continued reference to FIG. 23, the funneling apparatus 2500 also includes a stay 2574 (e.g., a flexible stay, etc.) for helping maintain the funneling apparatus 2500 in an open configuration attached to a container in a manner similar to that shown. For example, the stay 2574 may comprise a flexible stay (e.g., fiberglass, steel or other metal, etc.) that applies spring tension such that funneling apparatus 2500 conforms to the can shape (including square cans) or stretch out the bag, thus with friction and tension sufficiently secure the funnel-configured apparatus 2500 to the inside of the can or bag. Additionally, or alternatively, the stay 2574 may comprise an interior stay that creates a lip over which to stretch and slip the end of a bag or other soft container, in order to provide a more positive engagement (much like when a plastic garbage bag is inserted and stretched over the edge of a garbage can as a liner). For example, the stay 2576 when configured into a funnel shape to accept a bag (see, e.g., FIG. 25) may help the bag remain in an open position for loading and, roughly forming an aperture shape comparable to the letter D in this embodiment.

The funneling apparatus 2500 also includes grommets or pads 2562 for receiving spikes (e.g., spike 912 shown in FIG. 11, spike 1012 shown in FIGS. 12 and 13, spike 1112 shown in FIG. 14, etc.) for holding portions of the funneling apparatus 2500 down to the ground, such as when leaves are being raked onto the funneling apparatus 2500. In other embodiments, the funneling apparatus 2500 may include one or more edge devices as disclosed herein (e.g., 100 (FIG. 1), 200 (FIG. 4), 500 (FIG. 5), 600 (FIG. 6) 700 (FIG. 7), 800 (FIG. 8), 1500 (FIG. 15D), 3900 (FIG. 38), etc.).

The spike(s) used with the funneling apparatus 2500 may be configured or selected so as to be matched with the particular grommet configuration. Or, some embodiments may include spikes mounted permanently or built into the funneling apparatus. In the illustrated embodiment of FIG. 23, the grommets 2562 include generally round holes 2514. The spikes may be configured with fins whose diameter for their upper portion (just below the head or cap) have notches molded or fabricated into each fin to provide for a snap-in fit of the fin into the grommet. The fins may have one or more sets of such notches so that the fin may engage or removably lock into one or more height positions into the grommet or base of the funneling apparatus. The spike may terminate in a pointed end portion. But the spike may also accommodate having more than one set of notches by incorporating a non-tapering (or closely so) section for the fin sections between the notch sets. This would enable the spike fins to be inserted into the grommet and engage and snap into place, and if a second set of notches exist, allows the grommet to slide and snap into place (engaging the grommet edge) in another position or height.

The funneling apparatus 2500 shown in FIG. 23 may be configured differently (e.g., shaped, sized, etc.) depending, for example, on the particular end use (e.g., leaf cleanup, other debris cleanup, etc.). By way of example, the funneling apparatus 2500 may be configured for use in loading leaves and lawn type debris in garbage cans and bags, such that the funneling apparatus 2500 in its flat configuration may have a width dimension A from about 45 inches to about 65 inches in some embodiments, or from about 50 inches to about 60 inches in other embodiments. The width dimension B (the widest point where one of the primary set of handles 2568 is located in FIG. 23) may be from about 70 inches to about 80 inches in some embodiments, or from about 60 inches to about 90 inches in other embodiments, or about 77 inches in further embodiments. The length dimension C may be from about 72 inches to about 84 inches in some embodiments, or from about 60 inches to about 96 inches in other embodiments. The circumference or diameter of the funneling apparatus 2500 may be about 21 feet in some embodiments. These dimensions (as are all dimensions) is for purposes of illustration only and not for limitation, as embodiments disclosed herein may be configured differently, including different sizes, shapes, materials, etc.

FIGS. 24 and 25 illustrates an exemplary embodiment of a funneling apparatus 2600 in a horizontal position with its forward end portion inserted into a bag 2680 for filling the bag 2680. In this example, the funneling apparatus 2600 is being held in a funneling configuration by a stay 2664 (e.g., a removable strap, etc.) attached to the exposed portions of an outer stay or exterior rib 2672 at the handle cutouts 2668. A user may thus rake leaves into the open end of the funneling apparatus 2600 for loading leaves into the bag 2680. In some embodiments, the funneling apparatus 2600 may configured such that the open end is relatively wide (e.g., about four foot wide, etc.) for catching raked leaves from a relatively faraway distance (e.g., up to 10 feet away, etc.), thus eliminating the time-consuming steps of raking the leaves into piles and picking them up. In such embodiments, the funneling apparatus 2600 may be tipped up or up righted so that the leaves pour into the bag or other container from the funneling apparatus 2600. During this process, the edges or handles of a funneling apparatus may be squeezed together and the funneling apparatus may be shaken to help the leaves pour out of the funneling apparatus into the bag, which may thus be especially helpful in filling unwieldy bags.

As shown, the outer stay or exterior rib 2672 comprises a rod with a circular or round cross section disposed within sleeves or pockets 2673 extending along the perimeter edge of the funneling apparatus 2600. The outer stay 2672 may be operable for helping the funneling apparatus 2600 remain substantially flat, such as when lying on the ground without its end portion inserted into a can or bag, etc. The outer stay 2676 may also be operable for helping retain the funnel-like configuration of the funneling apparatus 2600 shown in FIGS. 24 and 25 by applying outward pressure against an interior portion of a container (e.g., bag, can, etc.). The outer stay 2676 may be configured to tautly conform and apply spring tension outwardly against an internal portion of a container. The outer stay may be operable for helping hold at least a portion of the funneling apparatus 2676 against an interior portion of a container regardless of container shape (e.g., cylindrical, rectangular or box-shaped, etc.) and/or for helping the funneling apparatus 2600 remain open in the funnel-like configuration.

As shown in FIG. 25, the funneling apparatus 2600 includes grommets or pads 2662 for receiving spikes for holding the edge portion of the funneling apparatus 2600 down to the ground, such that leaves are raked into and not under the funneling apparatus 2600. In other embodiments, the funneling apparatus 2600 may include one or more edge devices as disclosed herein (e.g., 100 (FIG. 1), 200 (FIG. 4), 500 (FIG. 5), 600 (FIG. 6) 700 (FIG. 7), 800 (FIG. 8), 1500 (FIG. 15D), 3900 (FIG. 38), etc.). In still further embodiments, a funneling apparatus (e.g., funneling apparatus 4000 shown in FIGS. 39 through 43, etc.) may be devoid of any such grommets, pads, or edge devices and still be configured such that leaves are raked into and not under the funneling apparatus. In such embodiments, the funneling apparatus may include a flexible but rigid-edged frame that keeps it firmly sealed to a surface, including lawns, paths, and driveways, so leaves and debris go directly into the funneling apparatus and don't slip underneath.

With continued reference to FIGS. 24 and 25, the funneling apparatus 2600 also includes a bag stay 2676 (e.g., a flexible stay, etc.), which may help maintain the funneling apparatus 2600 in an open configuration and/or help keep the mouth of the bag 2680. The bag stay 2676 extends at least partially across a portion of the funneling apparatus 2600 that is adjacent the mouth of the bag 2600 when the funneling apparatus is inserted into the bag 2680. The bag stay 2676 is operable for applying outward pressure against a portion of the bag 2680 for helping keep the bag open. For example, the top portions of the bag stay 2676 (as shown in FIG. 25) may apply outward pressure against two generally opposite portions of the bag 2680.

The bag stay 2676 may comprise a flexible stay (e.g., fiberglass, steel or other metal, etc.) that applies spring tension such that funneling apparatus 2600 conforms to the can shape (including circular or square cans, etc.) or stretches out the bag 2680. The friction, tension, and/or outward pressure applied by the bag stay 2676 and/or outer stay 2672 against the interior of the can or bag may sufficiently secure the funnel-configured apparatus 2600 to the inside of the can or bag. Additionally, or alternatively, the bag stay 2676 may comprise an interior stay that creates a lip over which to stretch and slip the end of a bag or other soft container, in order to provide a more positive engagement (much like when a plastic garbage bag is inserted and stretched over the edge of a garbage can as a liner). For example, the stay bag 2676 when the funneling apparatus is configured into a funnel shape to accept a bag may help the bag remain in an open position for loading and, roughly forming an aperture shape comparable to the letter D as shown in FIG. 25.

FIG. 26 illustrates an exemplary embodiment of a funneling apparatus 2700 in a horizontal position with its end portion inserted into a can 2780 for loading debris or leaves with a rake or other means into the can 2780 via the funneling apparatus 2700. In this example, the funneling apparatus 2600 is being held in a funneling configuration by a stay (e.g., a strap 2764 with handle 2766, etc.) attached to the exposed portions of the exterior rib 2772 at the handle cutouts 2768. The exterior rib 2772 comprises a rod with a circular or round cross section disposed within sleeves or pockets extending along the perimeter edge of the funneling apparatus 2700. Alternative embodiments may include a differently configuration or mounting arrangement for the exterior rib.

As shown in FIG. 26, the funneling apparatus 2700 includes an edge device 2701 and spikes 2712. The edge devices 2701 may comprise any one or combination of the various exemplary embodiments of edge devices disclosed herein (e.g., 100 (FIG. 1), 200 (FIG. 4), 500 (FIG. 5), 600 (FIG. 6) 700 (FIG. 7), 800 (FIG. 8), 1500 (FIG. 15D), 3900 (FIG. 38), etc.). The spikes 2712 may comprise any one or combination of the various exemplary embodiments of spikes disclosed herein. In other embodiments, the funneling apparatus 2700 may include more than one edge device. Or, for example, the funneling apparatus 2700 may include grommets or pads (instead of or in addition to edge devices) for receiving spikes or anchors. For example, FIG. 27 illustrates an exemplary embodiment of a funneling apparatus 2800 that includes grommets or pads 2862 for receiving spikes or anchors. In still further embodiments, a funneling apparatus (e.g., funneling apparatus 4000 shown in FIGS. 39 through 43, etc.) may be devoid of any such grommets, pads, or edge devices and still be configured such that leaves are raked into and not under the funneling apparatus. In such embodiments, the funneling apparatus may include a flexible but rigid-edged frame that keeps it firmly sealed to a surface, including lawns, paths, and driveways, so leaves and debris go directly into the funneling apparatus and don't slip underneath.

Also shown in FIG. 27, the funneling apparatus 2800 is being held in a funneling configuration by a stay (e.g., removable strap 2866, etc.). The funneling apparatus 2800 is in a vertical position with its end portion inserted into an upright garbage can 2880. For example, the funneling apparatus 2800 and garbage can 2880 may have first been horizontal (see, e.g., FIG. 26) during loading (e.g., raking leaves into, etc.) of the funneling apparatus 2800 and can 2880. Then, the funneling apparatus 2800 and garbage can 2880 may be tipped and up righted to the position shown in FIG. 27. When upright, the funneling apparatus 2800 may be used for compressing or transferring debris from the funneling apparatus 2800 to the garbage can 2880. Accordingly, an exemplary process for using the funneling apparatus 2800 may include raking leaves into the funneling apparatus 2800 while horizontal and then tipping the funneling apparatus 2800 and garbage can 2880 up right to transfer and compress the leaves into the garbage can 2880. This process may be repeated for different areas of the yard being raked. As another example, the funneling apparatus 2800 may also be used while cleaning out gutters. In such example, a person standing on a ladder may pull leaves out of a gutter and drop the leaves into the funneling apparatus 2800 while it is in the vertical position shown in FIG. 27.

In addition, the funneling apparatus 2800 as shown in FIG. 27 also includes a side slot or gap 2882 separating or defined by the edge portions of the funneling apparatus 2800. The slot or gap 2882 may allow a user to more easily compress the leaves and/or debris down further with his/her hands, thereby allowing greater access to reach lower into the can or bag to compress debris further into such container, before ultimately removing the funneling apparatus 2800 from the can or bag when the can or bag is full or sufficiently full.

FIGS. 28 and 29 illustrate exemplary embodiments of respective funneling apparatus 2900, 3000 shown in ready-for-use funneling or carrying configurations. Each funneling apparatus 2900, 3000 includes handle cutouts 2968, 3068 for carrying the funneling apparatus 2900, 3000. The funneling apparatus 3000 also includes a strap 3064 (e.g., an elastic band, etc.) that may be tied to the exposed portions of the outer loop stay at the handle cutouts 3068 on opposite sides of the funneling apparatus 3000 to hold the funneling apparatus 3000 in the funneling configuration shown.

As shown in FIG. 28, the funneling apparatus 2900 also includes an edge device 2901 and spikes 2912 for securing the edge portion of the funneling apparatus 2900 to the ground according to an exemplary embodiment. The edge device 2901 may comprise any one or combination of the various exemplary embodiments of edge devices disclosed herein (e.g., 100 (FIG. 1), 200 (FIG. 4), 500 (FIG. 5), 600 (FIG. 6) 700 (FIG. 7), 800 (FIG. 8), 1500 (FIG. 15D), 3900 (FIG. 38), etc.).

By comparison, the funneling apparatus 3000 shown in FIG. 29 includes grommets or pads 3062 and spikes 3012 engaged therewith for securing the edge portion of the funneling apparatus 3000 to the ground according to an exemplary embodiment. Also shown in FIG. 29, the funneling apparatus 3000 includes a removable strap 3068 for securing the two lateral edges of funneling apparatus 3000 to help maintain the funneling apparatus 3000 in the rolled-up/funneling/carrying configuration.

FIG. 30 illustrates an exemplary embodiment of a funneling apparatus 3100 shown in a ready-for-use funneling or carrying configuration. The funneling apparatus 3100 includes handle cutouts 3168 for carrying the funneling apparatus 3100. In this example, there are three handle cutouts 3168 on each side of the funneling apparatus 3100. The handle cutouts 3168 may be used for carrying the funneling apparatus 3100. Also, the handle cutouts 3168 may also be used in conjunction with a stay (e.g., a strap 3264 with handle 3266 shown in FIG. 32, etc.) for holding the funneling apparatus 3200 in a funneling configuration.

The funneling apparatus 3100 also includes an edge device 3101 and spikes 3112 for securing the edge portion of the funneling apparatus 3100 to the ground according to an exemplary embodiment. The edge device 3101 and spikes 3112 may comprise any one or combination of the various exemplary embodiments of edge devices and spikes disclosed herein.

In this example, the funneling apparatus 3100 also includes stays that may be used for holding the edge portions 3104 and 3106 of the funneling apparatus 3100 together, to help retain the funneling apparatus 3100 in a funneling configuration in a manner similar to that shown above for the funneling apparatus 1600 in FIG. 17. By way of example, the stays may comprise portions 3108 and 3110 (e.g., strips or patches, etc.) of a hook and loop closure system (e.g., Velcro hook and loop fasteners, etc.). Alternatively, a wide range of other suitable devices and methods can be employed for removably attaching the edge portions 3104 and 3108 to each other, such as magnets, clasps, buttons, latches, adhesives, snaps, etc. In addition, the strips 3108 and 3110 can be attached to the funneling apparatus 3100 using stitches, adhesives, tape, glue, among other suitable methods.

FIG. 31 illustrates an exemplary embodiment of a funneling apparatus 3200 in a horizontal position with its forward end portion inserts into a garbage can 3280 for loading debris or leaves with a rake or other means into the garbage can 3280 via the funneling apparatus 3200. In this example, the funneling apparatus 3200 is being held in a funneling configuration by a stay (e.g., a strap 3264 with handle 3266, etc.) attached to the exposed portions of the exterior rib 3272 at the handle cutouts 3268. The exterior rib 3272 comprises a rod with a circular or round cross section disposed within sleeves or pockets 3273 extending along the perimeter edge of the funneling apparatus 3200. Alternative embodiments may include a different configuration or mounting arrangement for the exterior rib. In some embodiments, the stay may be attached to the exterior rib 3272 at a position so as to more evenly balance the portion of the funneling apparatus 3200 inserted into the can 3280 and the corresponding loaded section not inserted inside the garbage can 3280, thus inhibiting the can 3280 from tipping over during use.

FIG. 31 shows one exemplary embodiment of the adjustable strap or stay 3264 that may be used for securing the two edges of the funneling apparatus 3200 to hold it in the funnel shaped configuration. This exemplary strap 3264 may be rope or webbing (nylon or other weather and sun resistant material), and it may have a relative flat or less round cross section. The rope or webbing may be secured to a tubular handle 3266 or other shaped handle and formed into a loop, and subsequently knotted at intervals to provide a variable means to secure and attach the loop to one handle cutout in the funneling apparatus and through the other before passing through one of the smaller loop sections created by the knots. Thus, by selectively choosing different loops to insert or thread the handle 3266 through, the effective length can be adjusted, thus altering the funnel shape and size.

As shown in FIG. 31, the edge portion of the funneling apparatus 3200 is being secured to the ground by spikes 3212 frictionally engaged within grommets or pads 3262 of the funneling apparatus 3200. The spikes 3212 may comprise any one or combination of the various exemplary embodiments of spikes disclosed herein. For example, the spikes 3212 may include fins with notches so as to engage the corresponding grommets 3262 at one or more discreet points and keep the spikes 3212 in place (prevent it from inadvertently falling out). In other embodiments, the spikes 3212 may not include fins or notches, but the spikes 3212 may be secured within the grommets 3262 by a friction fit. In other embodiments, the funneling apparatus 3200 may include one or more edge devices.

After the funneling apparatus 3200 and can 3280 are loaded with leaves or debris, the spikes 3212 may be removed from the ground and the can 3280 may be uprighted (see, e.g., FIG. 27). This also repositions the funneling apparatus 3200 from horizontal to vertical. In the vertical position, the funneling apparatus 3200 may then be used for compressing or transferring debris from the funneling apparatus 3200 to the garbage can 3280 and/or for placing leaves into the funneling apparatus 3200 to load the leaves into the garbage can 3280.

FIG. 32 illustrates an exemplary embodiment of a funneling apparatus 3300 being carried by the exposed portions of the exterior rib 3372 at the handle cutouts 3368 with the funneling apparatus 3300 in a folded configuration suitable for carrying leaves and debris loaded onto the funneling apparatus 3300.

FIGS. 33 through 35 illustrate exemplary embodiments having relatively flat and rigid platforms for mounting spikes along an edge portion of a tarp, sheet of material, or funneling apparatus. The spikes 3412, 3512 may be removably inserted into corresponding apertures 3414, 3614 in the pads or bases 3462, 3562, 3662 and be held in place by friction at particular points along a relatively rigid edge of the tarp, sheet of material, or funneling apparatus having an outer perimeter edge stay or rib 3472, 3572 in a sleeve or pocket 3473, 3573. The attachment points near the edge portion of the tarp, sheet of material, or funneling apparatus provide the means to removably secure a spike to keep the tarp, sheet, or funneling apparatus from rolling, tipping, or blowing while being used in the funnel configuration. The exemplary embodiments also may be used as alternatives to an edge device disclosed herein, where the stay in combination with the pads and spikes together form a relatively rigid edge with accompanying spikes to seal either the flat tarp, sheet of material, or funneling apparatus to the ground. FIG. 33 illustrates relatively rigid pads or bases 3462 having holes 3414 through which the spikes 3412 may be inserted and held in place with friction. The holes 3414 are shown with a cross or t-shape, but other shapes may also be used for frictionally or positively engaging the spikes 3412 within the holes 3414. FIG. 34 illustrates pads or bases 3562 that have generally round or oval holes such that the spikes 3512 could be secured with friction or with corresponding notches on the fins of the spikes to positively engage the holes in the pads 3562 at a predetermined point on the spikes, such as at a point that would provide the spikes to be mostly or fully inserted. FIG. 35 illustrates an exemplary embodiment for providing a base or pad 3662 to secure a spike, where the base or pad 3662 would wrap around the outer stay/rib and positively engage (e.g., snap together, etc.) to itself through the tarp, sheet of material, or funneling apparatus in a manner similar to how a grommet might be secured. These exemplary pads, based, or grommets shown in FIGS. 33 through 35 may be constructed from a wide range of materials, such as steel, aluminum, plastics, polypropylene, polyethylene, among other suitable materials.

FIG. 36 illustrates exemplary embodiments of adjustable length straps 3764A and 3764B with handles 3766A and 3766B. The straps 3764A and 3764B and handles 3766A and 3766B may be used for connecting or securing the lateral edges of a tarp or funneling apparatus for maintaining the tarp or funneling apparatus in a ready-for-use funneling configuration. As shown, the strap 3764B may be secured or tied (e.g., sheep heads knot, etc.) to a stay or rib 3772 of a tarp or funneling apparatus at a handle cutout 3768. The strap 3764B may then be relatively easily and removably secured to the stay or rib 3772 along the second edge of the tarp or funneling apparatus by looping the handle 3766B back through one of the smaller loops of the strap 3764B created with the knots 3769 (which knots may be added to the strap 3764A to form the strap 3764B). Other embodiments may include the strap 3764A without any knots 3769 being used to secure or hold the lateral edges of a tarp or funneling apparatus for maintaining a ready-for-use funneling configuration.

The exemplary embodiment illustrated in FIG. 36 may provide reduced simplicity, product longevity, and commercial costs for providing a removable and adjustable strap with just two parts: the strap (e.g., rope, etc.) and the handle. As shown by the strap 3764B, knots 3769 may be added to the strap 3764A to create additional adjustment points into which the handle 3766A, 3766B may be inserted like a button through a button hole (after being wrapped around the second stay or exposed rib portion as shown in FIG. 26). Alternative embodiments, however, may include different means for securing the sides of a funneling apparatus to each other, including Velcro or other hook and loop fasteners, webbing, sewn parts, combinations thereof, etc. that may in some embodiments also provide length adjustability and relatively quick attachment/removal.

FIG. 37 shows an exemplary embodiment of a funneling apparatus 3800 including an edge device 3801 and spikes 3812. The edge devices 3801 may comprise any one or combination of the various exemplary embodiments of edge devices disclosed herein (e.g., 100 (FIG. 1), 200 (FIG. 4), 500 (FIG. 5), 600 (FIG. 6) 700 (FIG. 7), 800 (FIG. 8), 1500 (FIG. 15D), 3900 (FIG. 38), etc.). The spikes 3812 may comprise any one or combination of the various exemplary embodiments of spikes disclosed herein, such as spike 1112 shown in FIG. 14.

As shown in FIG. 37, the spikes 3812 include holes 3838 through the heads 3836 of the spikes 3812. Ropes 3816 are threaded through the holes 3838 in the heads 3836 of the spikes 3812. The ropes 3816 are also threaded through a collar device 3890 (e.g., an O-ring, etc.) tethered or attached by tethers 3892 (e.g., rope, cord, etc.) to the spikes 3812 and/or to the tarp or funneling apparatus. Channeling the ropes 3816 through the collar device 3890 and through the holes 3838 in the heads 3836 of the spikes 3812 allows the edges of the tarp or funneling apparatus to be better tightened together when dragging/pulling by the ropes 3816. The collar device 3890 may also help more readily cause the edge device 3801 to form a generally U-shaped configuration for dragging or transport (as also shown in FIGS. 2 and 3).

FIGS. 39 through 43 illustrate another exemplary embodiment of a funneling apparatus 4000. In this example, the funneling apparatus 4000 includes a flexible but rigid-edged frame 4072 that helps keep the funneling apparatus 4000 firmly sealed to a surface (e.g., lawns, paths, driveways, etc.) so that leaves and debris go directly into the funneling apparatus 4000 and don't slip underneath. Also, the illustrated funneling apparatus 4000 does not include any grommets, pads, spikes, or edge devices as disclosed above for securing the funneling apparatus 4000 to the ground.

The frame 4072 may comprise or be formed from an outer stay or exterior rib having a circular or round cross section disposed within sleeves or pockets extending along the perimeter edge of the funneling apparatus 4000. The frame 4072 may comprise a single piece stay that is disposed partially along a portion of the perimeter or along the entire perimeter of the funneling apparatus 4000. Or, for example, the frame 4072 may comprise a multi-piece stay that includes two or more pieces the ends of which are connected by connectors.

The frame 4072 may be operable for helping the funneling apparatus 4000 remain substantially flat as shown in FIG. 43, such as when lying on the ground without its end portion inserted into a can or bag, etc. The frame 4072 may also be operable for helping retain the funnel-like configuration of the funneling apparatus 4000 by applying outward pressure against an interior portion of a container (e.g., bag, can, etc.). The frame 4072 may be configured to tautly conform and apply spring tension outwardly against an internal portion of a container. The outer stay may be operable for helping hold at least a portion of the funneling apparatus 4000 against an interior portion of a container regardless of container shape (e.g., cylindrical, rectangular or box-shaped, etc.) and/or for helping the funneling apparatus 4000 remain open in the funnel-like configuration.

FIGS. 39A through 39E illustrate the funneling apparatus 4000 in various stage of an exemplary process for converting the funneling apparatus 4000 into a storage configuration. During this process, the user may gently step on an edge of the funneling apparatus 4000 and begin twisting the funneling apparatus 4000 (e.g., only once, etc.) into smaller loops as shown in FIGS. 39A and 39B. Then, the twisted funneling apparatus 4000 may then be folded flat as shown in FIG. 39C into the compact, flat storage configuration shown in FIGS. 39D and 39E. The funneling apparatus 4000 may also be configured such that when twisted in the opposite direction, the frame 4072 causes the funneling apparatus 4000 to pop open from the storage configuration shown in FIGS. 39D and 39E into a ready-for-use configuration shown in FIG. 43.

FIG. 40B shows an exemplary embodiment of an adjustable strap or stay 4064 that may be used for securing the two edges of the funneling apparatus 4000 to hold it in the funnel shaped configuration as shown in FIG. 40A. The strap 4064 may be rope or webbing (nylon or other weather and sun resistant material), and it may have a relative flat or less round cross section. In this illustrated example, the stay or strap 4064 includes loops 4065 and a tubular handle 4066 along one side of the strap 4064. The other side of the strap 4064 includes a looped end portion 4067. As shown in FIG. 40A, the strap 4064 may be secured or attached to opposite sides of the funneling apparatus 4000. As shown by the arrows in FIG. 40B, the handle 4066 may be threaded or inserted through the looped end portion 4067 of the strap 4064. The handle 4066 may then threaded or inserted through a selected one of the loops 4065 on the other side of the strap 4064, to thereby secure the two end portions of the strap 4064 together. Thus, by selectively choosing different loops to insert or thread the handle 4066 through, the effective length of the strap 4064 can be adjusted, thus altering the funnel shape and size.

The funneling apparatus 4000 also includes a bag stay 4076 as shown in FIGS. 41 and 42. In operation, the bag stay 4076 helps better secure a bag 4088 to a funnel end of the funneling apparatus 4000. The bag stay 4076 also helps to keep the bag 4088 in an open position as leaves or other debris is being raked or loaded into the bag 4088. In this particular example, the bag stay 4076 comprises a section of string that may be installed around a paper bag 4088 as shown in FIG. 41. The bag stay 4076 may be saved and reused for other bags.

FIGS. 43 and 44 illustrate an example of how the funneling apparatus 4000 may be used for raking and loading leaves into a bag. As shown in FIG. 43, the funneling apparatus 4000 may be laid on the ground in a substantially flat configuration and leaves may be raked thereon. During this time, the frame 4072 helps keep the funneling apparatus 4000 firmly sealed to the ground so that the leaves being raked onto the funneling apparatus 4000 go onto the funneling apparatus 4000 and don't slip underneath. When the funneling apparatus 4000 has been loaded with leaves, the edges of the funneling apparatus 4000 may be squeezed together to convert the funneling apparatus 4000 into a funnel-like or taco-shaped configuration as shown in FIG. 44. This may be accomplished by the user grasping the exposed portions of the frame 4072 at the handle cutouts 4068. One end of the funneling apparatus 4000 may then be inserted into the bag 4088. The funneling apparatus 4000 may be shaken to help the leaves pour out of the funneling apparatus 4000 into the bag 4088.

The inventor hereof has recognized that the frame or outer edge 4072 applies a spring tension that helps to hold the funneling apparatus 4000 flat and open as shown in FIG. 43. When the funneling apparatus 4000 is loaded, the spring tension helps to offset the weight of the load from causing the funneling apparatus 4000 to close when the funneling apparatus 4000 is being used to pour or funnel debris into a container.

As disclosed herein, various exemplary embodiments of a funneling apparatus may include stays in the funneling apparatus, such as a loop stay (e.g., straight length configured as a loop and secured together at the ends, etc.) fabricated in, along, or near the outer edge of the funneling apparatus. In an exemplary embodiment, a loop stay may be fixed inside a sleeve, pocket, etc. or sewn into or along the border or edge of the funneling apparatus. A flexible stay may be provided that would conform to the outer shape of the flat, folded, or rolled funneling apparatus.

In various exemplary embodiments, a funneling apparatus may be used with one or more spikes, one or more edge devices, or other elements (e.g., pads or bases, etc.) that may be removably secured or integral to the funneling apparatus, such as adjacent (e.g., centered along, etc.) an edge of the funneling apparatus. In various exemplary embodiments, one or more spikes may be configured to be matched to fit with friction or positive engagement within a grommet or other matched pad, base, or plate in order to hold the spikes in place and in a vertical orientation (perpendicular to the surface and edge of a tarp or funneling apparatus). In various exemplary embodiments, a funneling apparatus may include individually adapted and mounted spikes to enable it to more easily be anchored to the ground while filling with a rake or filling/loading by other means. In some embodiments, the edge devices and/or spikes may be located along the widest edge of the funneling apparatus, which would thus provide a wider entrance for receiving leaves, debris, etc. thus making filling more efficient, quicker, and easier to accomplish.

In still further embodiments, a funneling apparatus may be devoid of any such grommets, pads, spikes, or edge devices and still be configured such that leaves are raked into and not under the funneling apparatus. In such embodiments, the funneling apparatus may include a flexible but rigid-edged frame that keeps it firmly sealed to a surface, including lawns, paths, and driveways, so leaves and debris go directly into the funneling apparatus and don't slip underneath.

In various exemplary embodiments, a funneling apparatus may include a strap, cord, rope, etc. and/or variable overlapping handles. In various exemplary embodiments, handles (e.g., cutouts, etc.) may be located at about the lowermost and widest section of the funneling apparatus when being carried by the handles. Handles (e.g., cutouts, etc.) may be located opposite the widest funnel section (the section designed to be, and shown, in contact with the ground when filling or loading) so as to provides greater loading capacity, such as when in a horizontal orientation, such as when having its end portion inserted into a horizontal garbage can as shown in FIG. 26 and/or when lifting and carrying debris in the funneling apparatus by the handles as shown by FIGS. 28 through 32.

Exemplary embodiments of a funneling apparatus disclosed herein may improve the manner in which leaves and/or debris are filled and compressed (by alternatively filling then compressing). In some embodiments, the funneling apparatus may be configured such that when rolled into the funnel shape, there may be a gap separating the sides of the funneling apparatus, and the sides may be held in place by virtue of being inserted into a can or bag. In addition, the funneling apparatus may include a strap to connect and secure the sides in the funnel configuration yet leave room between the side edges to facilitate moving of the leaves or debris from the funneling apparatus into a can or bag being loaded. A strap (adjustable length or otherwise) may provide a lifting point to more easily enable righting the loaded funneling apparatus and can. A lower point of a funneling apparatus may be configured such that the gap between the sides varies creating a roughly V-shaped gap or slot (in such embodiments the funnel shape would not comprise a 360 degree full funnel). The V-shaped gap may enable the user to more easily compress the leaves and/or debris down further with his/her hands, thereby allowing greater access to reach lower into the can or bag to compress debris further into such container, before ultimately removing the funneling apparatus from the can or bag when the can or bag is full or sufficiently full. Exemplary embodiments are illustrated in FIGS. 27 and 31 that include features relating to a gap or slot, which gap or slot is determined, at least in part, by the shape of the funneling apparatus in the flat configuration.

Also disclosed herein are various exemplary embodiments (e.g., FIGS. 23, 27, and 29, etc.) that provide for spikes to be secured to or along an edge of a funneling apparatus or tarp. For example, instead of a continuous length (e.g., an edge device which may be used in some embodiments), spikes may be secured and attached at specific points along or on the edge of the tarp or funneling apparatus. In various exemplary embodiments (e.g., FIG. 23, etc.) one or more stays (e.g., ribs, etc.) may be along an outer edge of a tarp or funneling apparatus to reinforce and make the edge more rigid. This, in turn, also helps better maintain the spike positioning and separation, as the semi-rigid outer rim stay would, in combination with the spikes form a spiked edge, which would function together similar to an edge device as disclosed herein. Spikes could be attached in a variety of means to the edge of the tarp or funneling apparatus, such as by a friction fit, positive interference or even tightened on (e.g., two-piece spikes such as shown in FIG. 15, etc.). In an exemplary embodiment (e.g., FIG. 23, etc.), the stay in the outer edge of the tarp or funneling apparatus (when the spikes are removed and not securing the tarp or funneling apparatus to the ground) can facilitate the folding, storing, or packaging of the tarp or funneling apparatus in a variety of methods, including twisting (e.g., once, etc.) and folding the funneling apparatus into smaller loops to reduce the overall width or diameter. For example, a funneling apparatus (e.g., FIG. 39) may be configured to be twisted into smaller loops (e.g., 2 loops, 3 loops, more than 3 loops) and folded flat into a storage configuration when not in use, and may pop open from storage configuration into a ready-for-use configuration when twisted in an opposite direction. This exemplary method of storage might be inhibited or prevented if a relatively long, rigid edge device were used. Also, a stay along the outer edge of the tarp or funneling apparatus might also be configured for providing some degree of tautness to the tarp or funneling apparatus. This tautness, in turn, might tend to help keep the spikes in the vertical position when the tarp or funneling apparatus is laying flat on the ground. The tarp or funneling apparatus with an outer stay may also be augmented with various larger or extended grommet type elements near the outer stay or edge (and even secured to the outer stay) to ensure the spikes tend to stay more vertical, to ease insertion into the ground by stepping on the spike to insert it into or engage the ground and, thus, removably or temporarily secure the edge while loading leaves or debris.

Having a loop stay in the outer edge in various exemplary embodiments (e.g., FIGS. 23 through 32, etc.) may provide the means to not only keep the tarp or funneling apparatus taught in its various configurations. But the outer edge loop stay may also provide variability in its funnel configuration to adapt to various sized garbage cans and bags, and still provide spring-like tension (and thus friction) to the inside of the can or bag to keep the funneling apparatus or tarp in place during loading or transport. The outer edge loop stay may be constructed of fiberglass (including, epoxy or polyester resin, etc.), tempered steel, or other relatively rigid but flexible materials. In various exemplary embodiments, the outer edge loop stay comprises a rod, tube, or dowel with circular or round cross sectional shape, which is configured for keeping outward tension in order to retain the funnel shape and to fit securely with friction fit into garbage cans and bags thus providing a wide range of funnel sizes in order to adapt to a wide range of sized cans and bags. Various exemplary embodiments may include more than one stay along the edge to create a rigid but flexible outer edge onto which to secure spikes and adapters such as standard (or specialized) grommets to accept spikes (which more readily would be held in their perpendicular position relative to the tarp or funneling apparatus).

In some exemplary embodiments, (e.g., FIGS. 23 through 25, etc.), one or more additional straight stays are provided that extend across the tarp or funneling apparatus, which may be configured to ease the securing and loading/filling of garbage bags. These one or more stays may be relatively lighter gauge stays capable of being bent or curved into a generally U shape when the tarp or funneling apparatus is rolled into a funnel. The stay(s) may also provide an edge over which the bag can be slid and held in place while loading. The combined result is the garbage bag when installed will stay in place as the bag can be pulled up into place and secured much like garbage bags are pulled over the lip or edge of a garbage can when used as garbage can liners for filling. The stay(s) may be removably inserted or removed but generally the stay(s) does not impede the other functions of the tarp or funneling apparatus in its flat or funnel configurations, though it may be removed for twisting (e.g., once, etc.) or folding into smaller configurations for storage or packaging.

Various exemplary embodiments include stays, battens, stiffening ribs, etc. that help keep the funneling apparatus in its funnel configuration by inhibiting it from collapsing or folding on itself in operation, while also importantly keeping open a wider aperture or mouth. The wider mouth or aperture may make it easier for leaves, debris, etc. to be poured or received into and/or to pass through the funneling apparatus. The wider mouth may also make it easier for leaves, debris to be compressed through the funneling apparatus and into the can, bag, bin, or other container attached to or being filled or loaded by the funneling apparatus. This wide mouth may be especially important for some debris, especially wet leaves, which tend to not pour very easily.

In various exemplary embodiments, a funneling apparatus may have a generally trapezoidal shape with rounded surface/corners when in the flat configuration, which may permit an outer stay design to be used. A leading edge of the funneling apparatus may be more pointed and at least one set of the handles (e.g., cutouts, openings, etc.) may be located more forward, such that when the funneling apparatus is installed, for example, in a garbage can and laying flat on the ground and filled with debris or leaves, a strap may be secured at the two handle openings and be used to lift the debris and funneling configuration to its upright position for full loading into the can or bag. The off-center positioning of the handles may enable the funneling apparatus to be better supported or more evenly supported for the portion not inserted into, for example, the garbage can being filled. Various exemplary embodiments may include no handles, only one set of handles, or more than one set of handles.

In some exemplary embodiments, there may be provided various means of securing a funneling apparatus to a bag or garbage can, such as hooks, clamps, clips, or other means of securing the funneling apparatus to a garbage can or bag to keep the assembly together while filling or moving the device or apparatus along with a can or bag to which it is inserted or secured.

In various exemplary embodiments, spikes may be retracted from the ground by pulling on a rope, which may be attached directly to the tarp or funneling apparatus (e.g., via grommets in the tarp, etc.) or to the spikes, etc. In various exemplary embodiments, a collar-like device may be used to more readily close the tarp or funneling apparatus into a more U-Shape to gather the ropes through a smaller aperture and pull them more directly in towards the center of the tarp or funneling apparatus. Pulling the rope may also bend an edge device into a U-shape. The tarp or funneling apparatus may be dragged by the ropes, whereby the U-shape decreases the width of the funneling apparatus and edge device making it easier to pass through fence gates, narrow areas, etc., and generally enable the moving width of the tarp edge to be narrower and more manageable than its width or running length (as when loading the leaves and/or when anchored to the ground or otherwise spread out and flat). The collar device may be tethered to the funneling apparatus or spikes. Or, for example, the collar device may be part of threaded through a larger opening or aperture in a spike's head. For example, the collar device may comprise a relative large opening in the head of a centrally located spike. In this example, the opening may be sized large enough not only to accept more than one rope therethrough, but the opening may be large enough such that the ropes may slide relatively easily through the opening, such as when the ropes are being pulled through the opening to retract the edge device into a U-shape and when the ropes are released such that the ropes pass through the opening in the opposite direction to allow the edge device to flatten out and be re-anchored to the ground.

Exemplary embodiments of a funneling apparatus are disclosed herein that may be slipped into a bag, can, or bin and that may have a relatively wide mouth (e.g., four feet wide, etc.) for catching raked leaves from a relatively faraway distance (e.g., up to 10 feet away, etc.), thus eliminating the time-consuming steps of raking the leaves into piles and picking them up. In such embodiments, the forcing action of a funnel helps to compress the leaves and debris relatively easy (e.g., in a single step, etc.) thus making repeated pressing and compacting of the leaves unnecessary. With a simple tipping action, leaves and debris pour into the bag or other container from the funneling apparatus, thereby allowing for over-stuffing or filling bags more fully, thus allowing fewer bags to be used and reducing collection time. A funneling apparatus disclosed herein may include a flexible but rigid-edged frame that keeps it firmly sealed to a surface, including lawns, paths, and driveways, so leaves and debris go directly into the funneling apparatus and don't slip underneath.

A funneling apparatus disclosed herein may also save time with other non-yard projects such as gutter cleaning and worksite clean-up. Additionally, a funneling apparatus may be configured to be twisted into smaller loops (e.g., 2 loops, 3 loops, more than 3 loops, etc.) and folded flat into a storage configuration when not in use, and may pop open from storage configuration into a ready-for-use configuration with a simple twist without any tools or assembly being required.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The term "V-edge" or reference to "V" or "V-shaped" is a general reference to components or designs that contain a V portion to the design and not necessarily always a literal "V." Further, the "V" shape may be a very narrow space between the two sides of the "V" or even touching (or closed), but able to be opened, even if its natural or rest position is closed in this way or manner. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Disclosure of values and ranges of values for specific parameters are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention. The following description of various embodiments is merely exemplary in nature and is in no way intended to limit the invention, its applications, or uses.

The invention claimed is:

1. A funneling apparatus comprising:
   a sheet having edges defining a perimeter;
   a stay disposed along at least one of the edges and along the substantial entirety of the perimeter of the sheet, the stay having a generally rounded or generally circular cross section;
   the funneling apparatus reconfigurable between a first configuration in which the sheet is substantially flat and a second configuration in which the sheet is rolled into at least one funnel-like configuration having a funnel size that is selectively variable as defined by the relative rolled positioning of the generally opposing edges of the sheet;
   whereby the stay is operable for helping the sheet remain substantially flat for the first configuration of the funneling apparatus and for helping retain the funnel-like configuration for the second configuration of the funneling apparatus by applying outward pressure against an interior portion of a container;
   wherein the funneling apparatus further comprises a strap releasably securable to opposing edge portions of the funneling apparatus for helping retain the funnel-like configuration for the second configuration of the funneling apparatus and operable as a handle for lifting and tilting the funneling apparatus and the container when the funneling apparatus is inserted into the container to thereby funnel debris into the container from the funneling apparatus.

2. The funneling apparatus of claim 1, wherein the stay is configured to tautly conform and apply spring tension outwardly against an internal portion of a container, whereby the stay is operable for helping hold at least a portion of the funneling apparatus against an interior portion of a container adapting to a variety of container shapes and/or remain open in the funnel-like configuration.

3. The funneling apparatus of claim 1, wherein the funnel size is selectively variable between a plurality of funnel sizes as determined by the size of a gap separating the generally opposing edges of the sheet or the amount by which the generally opposing edges are overlapped.

4. The funneling apparatus of claim 1, wherein the stay has a circular cross section.

5. The funneling apparatus of claim 1, wherein the stay is disposed along the entire perimeter of the sheet of the funneling apparatus.

6. The funneling apparatus of claim 1, wherein:
   the sheet includes at least one sleeve at least partially along the perimeter of the sheet, the stay being disposed within the at least one sleeve; and
   the stay comprises a single-piece stay that substantially forms a continuous loop at or near the perimeter of the sheet, or a multi-piece stay that includes two or more pieces connected to each other so as to substantially form a continuous loop at or near the perimeter of the sheet.

7. A funneling apparatus comprising:
   a sheet having edges defining a perimeter;
   a stay disposed along at least one of the edges and along the substantial entirety of the perimeter of the sheet, the stay having a generally rounded or generally circular cross section;
   the funneling apparatus reconfigurable between a first configuration in which the sheet is substantially flat and a second configuration in which the sheet is rolled into at least one funnel-like configuration having a funnel size that is selectively variable as defined by the relative rolled positioning of the generally opposing edges of the sheet;
   whereby the stay is operable for helping the sheet remain substantially flat for the first configuration of the funneling apparatus and for helping retain the funnel-like configuration for the second configuration of the funneling apparatus by applying outward pressure against an interior portion of a container;
   wherein the funneling apparatus further comprises:
     a first pair of handle cutouts adjacent respective side edges of the sheet, and configured for handling the funneling apparatus in a first funnel-like configuration in which the sheet is rolled about a first axis such that the side edges are adjacent or overlapped; and
     a second pair of handle cutouts adjacent respective forward and rearward edges of the sheet and configured for handling the funneling apparatus in a second funnel-like configuration in which the sheet is rolled about a second axis generally perpendicular to the first axis such that the forward and rearward edges are adjacent or overlapped; and
     at least one attachment device removably attachable to:
       the first pair of handle cutouts for maintaining the funneling apparatus in the first funnel-like configuration; and
       the second pair of handle cutouts for maintaining the funneling apparatus in the second funnel-like configuration.

8. The funneling apparatus of claim 1, wherein at least one of the edges of the sheet is securable to the ground when the funneling apparatus is in the first configuration in which the sheet is substantially flat.

9. The funneling apparatus of claim 1, further comprising at least one or more of at least one grommet and/or at least one edge device configured to accept at least one spike for securing at least a portion of the sheet to the ground.

10. A funneling apparatus comprising:
    a sheet having edges defining a perimeter;
    a stay disposed along at least one of the edges and along the substantial entirety of the perimeter of the sheet, the stay having a generally rounded or generally circular cross section;
    the funneling apparatus reconfigurable between a first configuration in which the sheet is substantially flat and a second configuration in which the sheet is rolled into at least one funnel-like configuration having a funnel size that is selectively variable as defined by the relative rolled positioning of the generally opposing edges of the sheet;
    whereby the stay is operable for helping the sheet remain substantially flat for the first configuration of the funneling apparatus and for helping retain the funnel-like configuration for the second configuration of the funneling apparatus by applying outward pressure against an interior portion of a container;

wherein the funneling apparatus further comprises at least one bag stay extending at least partially across a portion of the sheet that will be adjacent the mouth of a bag when the funneling apparatus is inserted into the bag, whereby the at least one bag stay is operable for helping keep the bag open and/or for helping to hold the bag in place.

11. The funneling apparatus of claim 1, wherein a gap is defined along the length of the side defined by the generally opposing edges when the sheet is rolled into the funnel-like configuration, whereby the gap facilitates a user compressing debris by reaching into the gap to push debris down into or out of the funneling apparatus.

12. The funneling apparatus of claim 1, wherein the substantially flat sheet has a generally round shape.

13. A funneling apparatus comprising:
a sheet having edges defining a perimeter;
a stay disposed along at least one of the edges and along the substantial entirety of the perimeter of the sheet, the stay having a generally rounded or generally circular cross section;
the funneling apparatus reconfiqurable between a first configuration in which the sheet is substantially flat and a second configuration in which the sheet is rolled into at least one funnel-like configuration having a funnel size that is selectively variable as defined by the relative rolled positioning of the generally opposing edges of the sheet;
whereby the stay is operable for helping the sheet remain substantially flat for the first configuration of the funneling apparatus and for helping retain the funnel-like configuration for the second configuration of the funneling apparatus by applying outward pressure against an interior portion of a container;
wherein the funneling apparatus further comprises a looped rope or webbing knotted at intervals to provide for additional loops in the rope or webbing and a handle portion, whereby the rope or webbing and handle portion may be releasably secured to opposing edge portions of the funneling apparatus for helping retain the funnel-like configuration for the second configuration of the funneling apparatus, with the handle portion being selectively inserted or threaded into different loops to selectively adjust the effective length and alter the funnel shape and size.

14. The funneling apparatus of claim 1, wherein the funneling apparatus is configured to be twisted into two or more smaller loops and folded flat into a storage configuration when not in use, and to pop open from storage configuration into a ready-for-use configuration when twisted in an opposite direction.

15. A funneling apparatus comprising a sheet of material having a perimeter, a first edge portion and a second edge portion, a frame disposed along the substantial entirety of the perimeter of the sheet, and at least one attachment device for removably attaching the first edge portion to the second edge portion, wherein the funneling apparatus is configurable between at least a first configuration in which the sheet is rolled into a funnel-like configuration with the attachment device attaching the first edge portion to the second edge portion, and a second configuration in which the sheet is substantially flat with the first and second edge portion detached from one another.

16. The funneling apparatus of claim 15, wherein:
the funneling apparatus is configured to allow selective adjustment to the funnel size; and
the at least one attachment device allows the first edge portion to be attached to the second edge portion such that the first and second edge portions are separated by a gap or overlapped by a selectively variable amount; and
a gap is defined along the length of the side defined by the first and second edge portions when the sheet is rolled into the funnel-like configuration, whereby the gap facilitates a user compressing debris by reaching into the gap to push debris down into or out of the funneling apparatus.

17. The funneling apparatus of claim 15, wherein the at least one attachment device includes a looped rope or webbing knotted at intervals to provide for additional loops in the rope or webbing and a handle portion, whereby the rope or webbing and handle portion may be releasably secured to the first and second edge portions with the handle portion being selectively inserted or threaded into different loops to selectively adjust the effective length and alter the funnel shape and size.

18. The funneling apparatus of claim 15, wherein the frame comprises a single-piece stay that forms a continuous loop at or near the perimeter of the sheet of the funneling apparatus, or a multi-piece stay that includes two or more pieces connected to each other so as to form a continuous loop at or near the perimeter of the sheet of the funneling apparatus.

19. A funneling apparatus comprising:
a sheet having edges defining a perimeter;
a stay disposed along at least one of the edges and along the substantial entirety of the perimeter of the sheet, the stay having a generally rounded or generally circular cross section;
the funneling apparatus reconfiqurable between a first configuration in which the sheet is substantially flat and a second configuration in which the sheet is rolled into at least one funnel-like configuration having a funnel size that is selectively variable as defined by the relative rolled positioning of the generally opposing edges of the sheet;
whereby the stay is operable for helping the sheet remain substantially flat for the first configuration of the funneling apparatus and for helping retain the funnel-like configuration for the second configuration of the funneling apparatus by applying outward pressure against an interior portion of a container;
wherein the funneling apparatus further comprises an apparatus attachable along an edge portion of the sheet for adding rigidity to the edge portion and/or for securing the edge portion to the ground, the apparatus comprising an edge device including resilient upper and lower portions configured for receiving and compressively clamping onto the edge portion of the sheet of material to releasably attach the edge device to the sheet.

20. The funneling apparatus of claim 15, wherein the at least one attachment device includes a strap releasably securable to the first and second edge portions.

21. The funneling apparatus of claim 10, further comprising a strap releasably securable to opposing edge portions of the funneling apparatus for helping retain the funnel-like configuration for the second configuration of the funneling apparatus and operable as a handle for lifting and tilting the funneling apparatus and the container when the funneling apparatus is inserted into the container to thereby funnel debris into the container from the funneling apparatus.

22. The funneling apparatus of claim 15, wherein the frame is configured to tautly conform and apply spring tension outwardly against an internal portion of a container, whereby the frame is operable for helping hold at least a portion of the funneling apparatus against an interior portion of a container.

23. The funneling apparatus of claim 15, wherein the frame is operable for helping the sheet remain substantially flat for the first configuration of the funneling apparatus and for helping retain the funnel-like configuration for the second configuration of the funneling apparatus by applying outward pressure against an interior portion of a container.

24. The funneling apparatus of claim 15, wherein the frame is operable for helping hold at least a portion of the funneling apparatus against an interior portion of a container regardless of container shape thereby helping the funneling apparatus remain open in the funnel-like configuration and helping keep a mouth of the container open which facilitates funneling into the container from the funneling apparatus.

25. The funneling apparatus of claim 15, wherein the frame has a generally rounded or generally circular cross section.

26. The funneling apparatus of claim 15, wherein the frame is disposed along the entire perimeter of the sheet.

27. The funneling apparatus of claim 15, wherein:
the substantially flat sheet has a generally round shape; and
the frame forms a substantially continuous loop along the entire perimeter of the sheet.

28. A funneling apparatus comprising:
a sheet having edges defining a perimeter;
a frame disposed along the substantial entirety of the perimeter of the sheet, the frame having a generally rounded or generally circular cross section;
the funneling apparatus reconfigurable between a first configuration in which the sheet is substantially flat and a second configuration in which the sheet is in a funnel-like configuration;
whereby the frame is operable for helping the sheet remain substantially flat for the first configuration of the funneling apparatus and for helping retain the funnel-like configuration for the second configuration of the funneling apparatus;
wherein the funneling apparatus further comprises a strap releasably securable to opposing edge portions of the funneling apparatus for helping retain the funnel-like configuration for the second configuration of the funneling apparatus and operable as a handle for lifting and tilting the funneling apparatus and the container when the funneling apparatus is inserted into the container to thereby funnel debris into the container from the funneling apparatus.

29. The funneling apparatus of claim 19, further comprising a strap releasably securable to opposing edge portions of the funneling apparatus for helping retain the funnel-like configuration for the second configuration of the funneling apparatus and operable as a handle for lifting and tilting the funneling apparatus and the container when the funneling apparatus is inserted into the container to thereby funnel debris into the container from the funneling apparatus.

30. The funneling apparatus of claim 28, wherein the frame is configured for applying outward pressure or spring tension outwardly against an internal portion of a container, whereby the frame is operable for helping hold at least a portion of the funneling apparatus against an interior portion of a container adapting to a variety of container shapes and/or remain open in the funnel-like configuration.

31. The funneling apparatus of claim 28, wherein the frame is operable for helping hold at least a portion of the funneling apparatus against an interior portion of a container regardless of container shape thereby helping the funneling apparatus remain open in the funnel-like configuration and helping keep a mouth of the container open which facilitates funneling into the container from the funneling apparatus.

32. The funneling apparatus of claim 28, wherein the frame is disposed along the entire perimeter of the sheet.

33. The funneling apparatus of claim 28, wherein:
the substantially flat sheet has a generally round shape; and
the frame forms a substantially continuous loop along the entire perimeter of the sheet.

* * * * *